(12) United States Patent
Pardo et al.

(10) Patent No.: US 11,222,329 B2
(45) Date of Patent: Jan. 11, 2022

(54) ELECTRONIC WALLET APPARATUS, METHOD, AND COMPUTER PROGRAM PRODUCT

(71) Applicant: MasterCard International Incorporated, Purchase, NY (US)

(72) Inventors: David Pardo, Singapore (SG); Anand Shekaran, Singapore (SG); Jose A. Alba, Long Island City, NY (US); Michael J. Shaon, Fayetteville, AR (US); Aimee G. Musil, O'Fallon, MO (US); Michael S. Ameiss, O'Fallon, MO (US); Eric R. Kitchen, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 171 days.

(21) Appl. No.: 13/836,326

(22) Filed: Mar. 15, 2013

(65) Prior Publication Data

US 2014/0129435 A1 May 8, 2014

Related U.S. Application Data

(60) Provisional application No. 61/722,294, filed on Nov. 5, 2012.

(51) Int. Cl.
*G06Q 20/36* (2012.01)
*G06Q 20/22* (2012.01)
(Continued)

(52) U.S. Cl.
CPC .......... *G06Q 20/36* (2013.01); *G06Q 20/227* (2013.01); *G06Q 20/3572* (2013.01); *G06Q 20/363* (2013.01); *G06Q 20/385* (2013.01)

(58) Field of Classification Search
CPC ...... G06Q 40/02; G06Q 20/10; G06Q 20/385; G06Q 20/36; G06Q 20/3223; G06Q 20/40; G06Q 20/326
(Continued)

(56) References Cited

U.S. PATENT DOCUMENTS 4,825,045 A 4/1989 Humble
4,833,308 A 5/1989 Humble
(Continued)

FOREIGN PATENT DOCUMENTS

JP 2000322486 A 11/2000
JP 2002298055 A 10/2002
(Continued)

OTHER PUBLICATIONS

Johnson, A. (2010). Real-time rewards closer to reality in MasterCard program. Cardline, 10(19), 3. Retrieved from https://search.proquest.com/docview/215442906?accountid=14753 (Year: 2010).*

(Continued)

*Primary Examiner* — Richard C Weisberger
(74) *Attorney, Agent, or Firm* — Otterstedt, Wallace & Kammer, LLP

(57) ABSTRACT

Registration information for a plurality of consumers is obtained at an electronic wallet platform. A mechanism is provided to integrate the electronic wallet platform with a plurality of merchants. Via the electronic wallet platform, a given one of the consumers is afforded an option to select from multiple methods to pay for a transaction with a given one of the merchants. The multiple methods are based, at least in part, on the registration information. At least one of the multiple methods includes a virtual card number. Further steps include obtaining, from the given one of the consumers, a selection of the virtual card number for payment for (Continued)

the transaction; and providing the given one of the merchants with the virtual card number.

14 Claims, 56 Drawing Sheets

(51) Int. Cl.
  *G06Q 20/34* (2012.01)
  *G06Q 20/38* (2012.01)
(58) Field of Classification Search
  USPC .................................................. 705/35–40
  See application file for complete search history.

(56) References Cited

U.S. PATENT DOCUMENTS

| | | | |
|---|---|---|---|
| 5,173,851 A | 12/1992 | Off | |
| 5,350,906 A * | 9/1994 | Brody | G06Q 20/04 |
| | | | 235/379 |
| 5,537,314 A | 7/1996 | Kanter | |
| 5,612,868 A | 3/1997 | Off | |
| 5,621,812 A | 4/1997 | Deaton | |
| 5,644,723 A | 7/1997 | Deaton | |
| 5,649,114 A | 7/1997 | Deaton | |
| 5,687,322 A | 11/1997 | Deaton | |
| 5,857,175 A | 1/1999 | Day | |
| 5,883,810 A * | 3/1999 | Franklin et al. | 700/232 |
| 6,012,038 A | 1/2000 | Powell | |
| 6,035,280 A | 3/2000 | Christensen | |
| 6,055,513 A | 4/2000 | Katz | |
| 6,067,526 A | 5/2000 | Powell | |
| 6,076,075 A | 6/2000 | Teicher | |
| 6,138,911 A | 10/2000 | Fredregill | |
| 6,223,163 B1 | 4/2001 | Van Luchene | |
| 6,292,786 B1 | 9/2001 | Deaton | |
| 6,307,958 B1 | 10/2001 | Deaton | |
| 6,334,108 B1 | 12/2001 | Deaton | |
| 6,424,949 B1 | 7/2002 | Deaton | |
| 6,484,146 B2 | 11/2002 | Day | |
| 6,601,036 B1 | 7/2003 | Walker | |
| 6,601,761 B1 | 8/2003 | Katis | |
| 6,636,833 B1 * | 10/2003 | Flitcroft | G06Q 20/00 |
| | | | 235/380 |
| 6,748,365 B1 | 6/2004 | Quinlan | |
| 6,847,935 B1 | 1/2005 | Solomon | |
| 6,925,441 B1 | 8/2005 | Jones, III | |
| 6,937,995 B1 | 8/2005 | Kepecs | |
| 7,111,789 B2 | 9/2006 | Rajasekaran | |
| 7,136,835 B1 | 11/2006 | Flitcroft | |
| 7,155,411 B1 * | 12/2006 | Blinn et al. | 705/40 |
| 7,424,435 B1 | 9/2008 | Yamagami et al. | |
| 7,555,444 B1 | 6/2009 | Wilson | |
| 7,580,856 B1 | 8/2009 | Pliha | |
| 7,992,773 B1 | 8/2011 | Rothschild | |
| 8,229,852 B2 | 7/2012 | Carlson | |
| 8,364,522 B1 | 1/2013 | Gevelber | |
| 8,424,752 B2 | 4/2013 | Rothschild | |
| 8,442,914 B2 | 5/2013 | Killian | |
| 8,608,061 B2 * | 12/2013 | Krajicek | G06Q 20/12 |
| | | | 235/380 |
| 8,651,369 B2 | 2/2014 | Rothschild | |
| 8,812,396 B2 | 8/2014 | Alba | |
| 2001/0032878 A1 | 10/2001 | Tsiounis et al. | |
| 2002/0062278 A1 | 5/2002 | Ingram | |
| 2002/0120527 A1 | 8/2002 | Lam | |
| 2002/0159436 A1 | 10/2002 | Adachi | |
| 2003/0018579 A1 | 1/2003 | Litster | |
| 2003/0042301 A1 | 3/2003 | Rajasekaran | |
| 2003/0212595 A1 | 11/2003 | Antonucci | |
| 2004/0024638 A1 | 2/2004 | Restis | |
| 2004/0093271 A1 | 5/2004 | Walker et al. | |
| 2004/0143491 A1 | 7/2004 | Steinberg | |
| 2004/0260607 A1 | 12/2004 | Robbins et al. | |
| 2006/0003295 A1 | 1/2006 | Hersch | |
| 2006/0006236 A1 | 1/2006 | Von Fellenberg | |
| 2006/0118611 A1 | 6/2006 | Michelsen et al. | |
| 2007/0162337 A1 | 7/2007 | Hawkins et al. | |
| 2007/0198432 A1 | 8/2007 | Pitroda | |
| 2007/0282687 A1 | 12/2007 | Laves | |
| 2008/0021772 A1 | 1/2008 | Aloni | |
| 2008/0120155 A1 | 5/2008 | Pliha | |
| 2008/0208693 A1 | 8/2008 | Milstein et al. | |
| 2009/0037326 A1 | 2/2009 | Chitti | |
| 2009/0050686 A1 | 2/2009 | Kon | |
| 2009/0119194 A1 | 5/2009 | Chau | |
| 2009/0138379 A1 | 5/2009 | Scheman | |
| 2009/0171777 A1 | 7/2009 | Powell | |
| 2009/0254930 A1 | 10/2009 | Lo | |
| 2009/0271263 A1 | 10/2009 | Regmi | |
| 2009/0271282 A1 | 10/2009 | Pool | |
| 2009/0288012 A1 | 11/2009 | Hertel | |
| 2010/0088188 A1 * | 4/2010 | Kumar | G06Q 20/10 |
| | | | 705/17 |
| 2010/0110514 A1 | 5/2010 | Houha | |
| 2010/0122274 A1 | 5/2010 | Gillies | |
| 2010/0280896 A1 | 11/2010 | Postrel | |
| 2011/0208656 A1 * | 8/2011 | Alba | G06Q 20/12 |
| | | | 705/65 |
| 2011/0289014 A1 | 11/2011 | Shroff | |
| 2012/0130839 A1 | 5/2012 | Koh et al. | |
| 2012/0150669 A1 | 6/2012 | Langley et al. | |
| 2012/0143752 A1 | 7/2012 | Wong et al. | |
| 2013/0218723 A1 | 8/2013 | Masud | |
| 2014/0036744 A1 | 2/2014 | Zeng | |
| 2014/0052638 A1 | 2/2014 | Chung et al. | |
| 2015/0019313 A1 | 1/2015 | Alba et al. | |

FOREIGN PATENT DOCUMENTS

| | | |
|---|---|---|
| JP | 2004334444 A | 11/2004 |
| JP | 2008-204248 A | 9/2008 |
| JP | 2011-209861 A | 10/2011 |
| WO | WO01/88805 | 11/2001 |
| WO | WO2012/128514 A2 | 9/2012 |

OTHER PUBLICATIONS

Market Watchm,Visa enters new territory in the online payments sector with V.me 2012.*
3-D Secure, downloaded from http://en.wikipedia.org/wiki/3-D_Secure on Sep. 29, 2011.
PayPal, downloaded from http://en.wikipedia.org/wiki/Paypal on Sep. 29, 2011.
FIPS 140, downloaded from http://en.wikipedia.org/wiki/FIPS_140 on Oct. 21, 2011.
FiftyOne can help fast-track your global online expansion . . . , downloaded from http://www.fiftyone.com/ on Jul. 4, 2011.
Erica Harvill, MasterCard and Borderlinx Collaborate to Enhance E-Commerce Experience Around World, downloaded from http://www.mastercard.com/us/company/en/newsroom/pr_mc_borderlinx_collaborate.html on Jun. 28, 2011.
Borderlinx—create your own US and UK address and shop online, downloaded from https://www.borderlinx.com/m/ on Aug. 1, 2011.
Google Wallet—mobile app payments, downloaded from http://www.google.com/wallet/how-it-works-payments.html on Apr. 19, 2012.
Blaine R. Copenheaver, USPTO as ISA, International Search Report and Written Opinion for PCT Patent Application PCT/US2013/020679, dated Mar. 20, 2013.
Lee W. Young, USPTO as ISA, International Search Report and Written Opinion for PCT Patent Application PCT/US13/68383, dated May 16, 2014.
Korean INtellectual Property Office, Korean Patent Application 10-2015-7015095, Office Action dated May 30, 2017, English Translation pp. 1-8.
PRC (China) Pat. Appln. No. 201380069533.9, State Intellectual Property Office (SIPO) of the People's Republic of China, first office action dated Aug. 1, 2017, pp. 1-8 in Chinese, cites US2012/0143752A1 as "X" category.

(56) References Cited

OTHER PUBLICATIONS

Japanese Patent Office, Japanese Patent Application 2015-541840, Reasons for Refusal, pp. 1-7 including English translation, dated Feb. 9, 2017.

Canadian Intellectual Property Office, Office Action dated Jan. 11, 2017, Canadian Patent Application 2890335, pp. 1-4.

IP Australia, Patent Examination Report No. 1, Australian Patent Application No. 2013337340, dated Nov. 1, 2016, pp. 1-4.

Anonymous, "Coupons". downloaded from www.coupons.com on Jan. 8, 2010, pp. 1-3.

Anonymous, "Digital wallet" downloaded from http://en.wikipedia.org/wiki/Digital_wallet on May 7, 2013, pp. 1-4.

Business Editors, MasterCard Debuts Rewards Program for Small and Medium-Sized Financial Institutions, Business Wire, Jun. 30, 2003, pp. 1-3.

IP Australia, Patent Examination Report No. 2, Australian Patent Application No. 2013337340, dated Jul. 4, 2017, pp. 1-4.

Canadian Intellectual Property Office, Office Action dated Dec. 14, 2017, Canadian Patent Application 2890335, pp. 1-3.

Japanese Patent Office, Japanese Patent Application 2015-541840, Decision of Rejection, pp. 1-6 including English translation, dated Jun. 6, 2017.

IP Australia, Patent Examination Report No. 3, Australian Patent Application No. 2013337340, dated Oct. 24, 2017, pp. 1-4.

FirstData, "Data encryption and tokenization", downloaded from https://www.firstdata.com/downloads/thought-leadership/fd_encrypt_token_pci_whitepaper.pdf (Year: 2009) pp. 1-22.

Japanese Patent Office, Japanese Patent Application 2017-194926, Reasons for Refusal, pp. 1-4 including English translation, dated May 23, 2019.

Japanese Patent Office, Notice of Reason for Refusal dated Jan. 26, 2021 in counterpart Japanese Patent Application 2019-209232, pp. 1-3 (Japanese language) plus English translation pp. 1-3, total 6 pages.

Canadian Intellectual Property Office, Office Action dated Feb. 25, 2021 in counterpart Canadian Application 3,044,977, pp. 1-5.

\* cited by examiner

FIG. 1
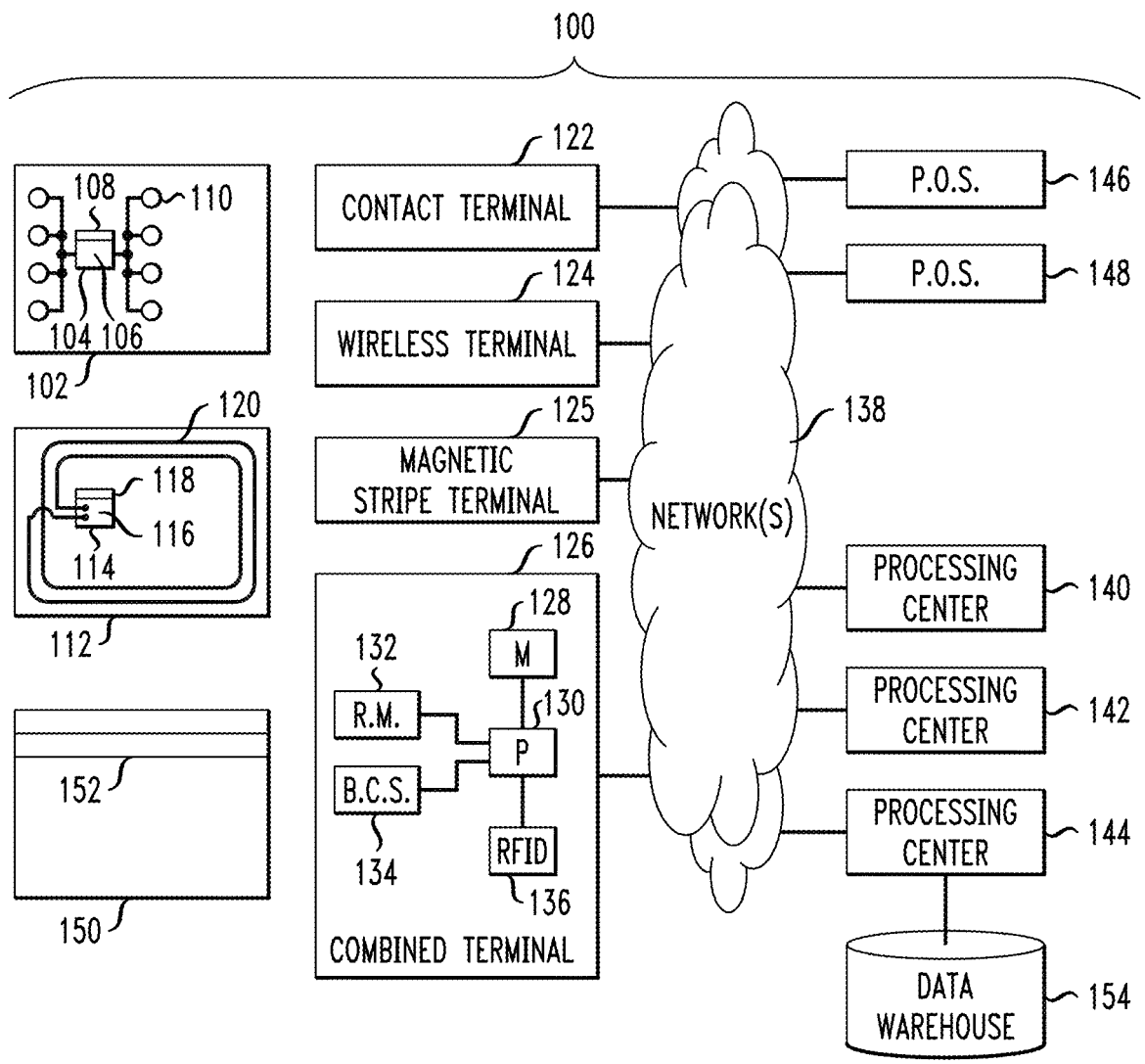
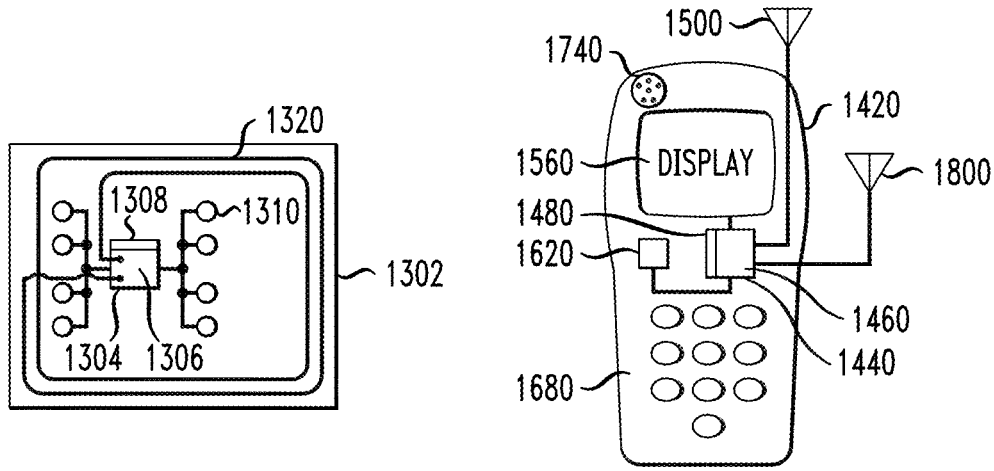

Secure Checkout

Shipping & Pickup | Payment Method | Review & Place Order

Return to cart

Choose Payment Method

☐ Use a  Gift Card

| | |
|---|---|
| Payment Method | Mastercard ▼ |
| Card Number | [VISA] [MC] [AMEX] [DISC] [PayPal] [DebitMC Later] |
| Expiration Date | 1 ▼  2011 ▼ |
| Security Code (What's this?) | |
| Name | |
| Billing Address Line 1 | |
| Billing Address Line 2 | (optional) |
| City | |
| State | Choose a State ▼ |
| ZIP Code | Example: 12345 |
| Phone Number | |

You won't be charged until you've placed your order on the next page.

Back  Continue

Order Summary

Store Pickup

Atlanta Store - Supercenter Store # 3775  Change
1801 Howell Mill Rd Nw, Atlanta, GA 30318
Pickup person: John Smith Edit
Item arrives at store 12/20-12/23

| | Qty | Total |
|---|---|---|
| Viore 24" Class 1080p LCD HDTV 60Hz - Choose Your Color: Blue | 1 | $179.00 |

Subtotal (1 item)  $179.00
Tax  $14.32

Order Total  $193.32

Return to cart

Payment & Account

Billing Address Change

John Smith
123 Elm Street
Singapore 228242

Payment Options

⦿ Online Payment Option A Change
xxxx-xxxx-xxxx-xxxx    Exp. mm/yy

Order Summary

Subtotal         $2774.50 USD
Shipping             $5.00 USD

TOTAL        $2779.50 USD

Submit Order

FIG. 15
PRIOR ART

Review your information

Payment methods ⟋ Change

Credit/Debit Card : Visa XXXX-XXXX-XXXX-9891

If funds are added to your balance before this transaction completes, the additional balance may be used for this transaction.   Learn more Conversion Rate as of 13 Dec 2011: Singapore Dollar = 0.748678 US Dollars
Other Conversion Options
This transaction will appear on your bill as Wallet*retailer.com

Contact information   Change
John.smith@email.com
+65 12345678

To process this transaction, Walmart.com requires your billing address and phone number.

[ Continue ]— 8005

You're almost done. You will confirm your payment on Retailer.com

Cancel and return

Your order summary

Descriptions
Current purchase

You'll be able to see your order details before you pay

FIG. 16
PRIOR ART

Payment & Account

Billing Address Change

John Smith
123 Elm Street
Singapore 228242

Payment Options
● Online Payment Option C  Change

Order Summary

Subtotal $2774.50 USD
Shipping $5.00 USD

TOTAL $2779.50 USD

Submit Order

FIG. 18
PRIOR ART

Secure Checkout

Shipping & Pickup › Payment Method › Review & Place Order

Return to cart

Choose Payment Method                                    Return to cart

☐ Use a    Gift Card [xxx-xxx]

Payment Method  [Mastercard ▼]    [VISA] [MC] [AmEx] [Discover]
                                  [PayPal]
                                  [☐ BillMeLater]

Card Number     [_____]

Expiration Date [1 ▼] [2011 ▼]

Security Code   [____]
(What's this?)

Name            [_____]

Billing Address Line 1  [_____]

Billing Address Line 2  [_____] (optional)

City            [_____]

State           [Choose a State ▼]

ZIP Code        [_____] Example: 12345

Phone Number    [_____]

You won't be charged until you've placed your order on the next page.

[Back]  [Continue]

Order Summary

Store Pickup

Atlanta Store - Supercenter Store # 3775
1801 Howell Mill Rd Nw, Atlanta, GA 30318  Change Pickup person: John Smith Edit
Item arrives at store 12/20-12/23

Qty    Total
Viore 24" Class 1080p LCD HDTV 60Hz -          1    $179.00
Choose Your Color: Blue Subtotal ( 1 item)                                  $179.00
Tax                                                  $14.32

Order Total                                     $193.32

Secure Checkout | Shipping & Pickup | Payment Method | Review & Place Order | Return to cart

Choose Payment Method

☐ Use a  Gift Card [____*]

Payment Method [E-wallet ▼]
8009

[VISA] [○○] [DISCOVER] [★]
[PayPal] [☐BillMe Later]

[Back] [Checkout with E-wallet]

Order Summary — Return to cart

Store Pickup

Atlanta Store - Supercenter Store # 3775
1801 Howell Mill Rd Nw, Atlanta, GA 30318   Change Pickup person: John Smith Edit

| | Qty | Total |
|---|---|---|
| Item arrives at store 12/20-12/23 | | |
| Viore 24" Class 1080p LCD HDTV 60Hz - Choose Your Color Color: Blue | 1 | $179.00 |

Subtotal ( 1 item)   $179.00
Tax ☐                $14.32

Order Total       $193.32

| Account Home | About Us | My Account | Products and Services |
|---|---|---|---|
| >Account Summary | >SecurePay | >Bill Payment | >Rewards |

Get a Virtual Card
What is a Virtual Card?

FAQS | View Demo

| SecurePay | View Numbers | Reports | Alerts |

Generate Number                                    Cancel | Generate VCN

Send Alerts To  ☐ Email: Jerry.jones@email.com
                ☐ Mobile: 12121234567

SecurePay Numbers offer you increased security when providing an account number for ecommerce purchases your actual credit or debit card information is never revealed. SecurePay Numbers are subject to the spending control profile of the linked card number.

VCN linked to:        Jerry's Card (Owner) xxxx xxxx xxx 0160
Nickname for VCN:     [            ]
Start Date:           25 Oct 2011
Expiration Date:      24 Nov 2011

∨ Transaction Controls

💲   If a single transaction exceeds        $[      ]              SEND   DECLINE
                                                                   ALERT  TRANSACTION
                                                                    ☐      ☐
🔲   If  ▶ Daily   spending exceeds         $[      ]               ☐      ☐

∨ Category Controls

💳   If  ▶ Daily   spending on  (Category) exceeds  $[      ]       SEND   DECLINE
                                                                   ALERT  TRANSACTION
                                                                    ☐      ☐
⊕ Add Category Control

FIG. 24

| Payment & Account | Order Summary |
|---|---|
| Billing Address Change | Subtotal $2774.50 USD |
| John Smith | Shipping $5.00 USD |
| 123 Elm Street | TOTAL $2779.50 USD |
| Singapore 228242 | (Submit Order) |
| Payment Options | |
| ● Online Payment Option A Change | |
| xxxx-xxxx-xxxx-xxxx    Exp. mm/yy | |

| items | | thanks | your order is complete. | | |
|---|---|---|---|---|---|
| | | availability | price | quantity | total |
| [img] | iPad 2 32GB with Wi-Fi<br>color: white | in stock and ready to ship. | $ 599.00 | 1 | $ 599.00 |
| [img] | iPad Smart Cover - Leather<br>color: Navy | in stock and ready to ship. | $ 69.00 | 1 | $ 69.00 | thanks for shopping with us.
you will receive your order by Wednesday, June 12.

if you have questions about your order, please email customer service

| | |
|---|---|
| cart subtotal | $ 737.00 |
| shipping | $ 0.0 |
| tax | $ 53.90 |
| order total | $ 789.90 |

Send Alerts To ☐ Email: john.smith@email.com
☐ Mobile: 1212234567

SecurePay Numbers offer you increased security when providing an account number for ecommerce purchases your actual credit or debit card information is never revealed. SecurePay Numbers are subject to the spending control profile of the linked card number.

VCN linked to: John's Card (Owner) xxxx xxxx xxx 0160

Nickname for VCN: New Shoes

Start Date: 12 Jul 2011

Expiration Date: 11 Aug 2012

― 8047

∨ Transaction Controls

If a single transaction exceeds $ [ ]  SEND ALERT  ☐ ☐  DECLINE TRANSACTION ☐

If ▶ Daily spending exceeds $ [ ]  SEND ALERT  ☐ ☐  DECLINE TRANSACTION ☐

― 8048

∨ Category Controls

If ▶ Daily spending on ▶ Category exceeds $ [ ]   ☐

⊕ Add Category Control

FIG. 38 confirm
▼ return to your cart

| items | | availability | price | quantity | total |
|---|---|---|---|---|---|
| | iPad 2 32GB with Wi-Fi<br>color: white | in stock and ready to ship. | $ 599.00 | 1 | $ 599.00 |
| | iPad Smart Cover - Leather<br>color: Navy | in stock and ready to ship. | $ 69.00 | 1 | $ 69.00 | payment method

MasterCard
xxxx - xxxx - xxxx - 3456 change payment method shipping to:
Steve M. Cardholder
100 Main Street, #PH1
New York, NY 10018 change address cart subtotal    $ 737.00
shipping         $ 0.0
tax              $ 53.90 order total      $ 789.90

Cancel Order    Submit Order

FIG. 39 thanks your order is complete.

| items | availability | price | quantity | total |
|---|---|---|---|---|
| iPad 2 32GB with Wi-Fi<br>color: white | in stock and ready to ship. | $ 599.00 | 1 | $ 599.00 |
| iPad Smart Cover - Leather<br>color: Navy | in stock and ready to ship. | $ 69.00 | 1 | $ 69.00 |

| | |
|---|---|
| cart subtotal | $ 737.00 |
| shipping | $ 0.0 |
| tax | $ 53.90 |
| order total | $ 789.90 | thanks for shopping with us.
you will receive your order by Wednesday, June 12.

if you have questions about your order, please email customer service

FIG. 40
PRIOR ART

All set to go!

Your U.S. Shipping Address

6789 Tulip Avenue
c/o Able Enterprises
Portland
OREGON 97230
Tel 503-555-1234

— 8049

Don't worry about noting this down. You can retrieve this address on our shopping bar.

FIG. 41
PRIOR ART

ENTER BILLING ADDRESS

* Required Fields

| Field | Value | |
|---|---|---|
| Title | Mr ▼ | |
| First Name* | James | |
| Last Name* | Jones | |
| Address* | 12345 Central Boulevard | |
| Address Line 2 | | |
| Address Line 3 | | |
| City* | Singapore | APO/FPO ⓘ |
| State/Region/Province* | Singapore | |
| Zip/Postal Code* | 546827 | |
| Country* | Singapore ▼ | |
| Telephone* | 12345678 | Why? ⓘ |
| Email* | James.Jones@email.com | Why? ⓘ |

FIG. 42
PRIOR ART

SELECT A SHIPPING OPTION

○ Use the above address as my Shipping Address

⦿ Add a new Shipping Address (We currently ship to the United States only.)

| | |
|---|---|
| Title | Please Select ▼ |
| First Name* | James |
| Last Name* | Jones |
| Address* | 6789 Tulip Avenue |
| Address Line 2 | c/o Able Enterprises |
| Address Line 3 | |
| City* | Portland       APO/FPO ⓘ |
| State/Region/Province* | OR |
| Zip/Postal Code* | 97230 |
| Country* | United States ▼ |
| Telephone* | 503-555-1234   Why? ⓘ |

} 8050

CONTINUE CHECKOUT

FIG. 44
PRIOR ART

SELECT PAYMENT METHOD

○ CREDIT CARD          VISA [MasterCard] [DISCOVER] [AmEx]

○ BILL ME LATER®   See Terms
Special offers on qualifying purchases -- quick, easy, secure!     ☑ BillMeLater ◉ E-wallet   What's this? ⓘ          E-wallet 1. If you select this as your payment method, you will continue through the standard checkout process then automatically proceed to E-Wal.com complete your payment. 2. Once you have been redirected to E-Wal.com you will have 25 minutes to complete the payment. 3. Returns of products purchased with E-Wal are accepted only by mail at store.com, not at our stores. 4. Returns of products purchased with E-Wal may take longer.

PROMOTION CODE
Entering a code below may void existing promotions that have already been applied.   Details ⓘ

Promo Code [      ]

GIFT CARDS
You may apply more than one Gift Card, Online Gift Certificate or Merchandise Credit to your order, but they must be entered one at a time. (Add additional numbers after clicking "Apply").

Card/Certificate Number [          ]    Check Balance

Pin Number [  ] [Apply]   Where's my pin? ⓘ

[CONTINUE CHECKOUT]

FIG. 45
PRIOR ART

| QTY. | ITEM DESCRIPTION | MAKE IT A GIFT | AVAILABILITY | PRICE | TOTAL |
|---|---|---|---|---|---|
| 1 | FLEECE ARROWHEAD SWEAT SHIRT<br>STYLE: 12099744<br>COLOR: Deep Red<br>SIZE: MEDIUM | Not Selected<br>[EDIT GIFT OPTION] | Ships in 1 - 3 business days [Details ⓘ] | $44.99 | $44.99 |

SHIPPING INFORMATION

SHIPPING ADDRESS    SHIPPING METHOD

Mr. James Jones    Standard Ground: arrives within 5-7 business days of shipping - $8.00 ▼
6789 Tulip Avenue
c/o Able Enterprises
Portland, OR 97230 US
Tel 503-555-1234

[EDIT SHIPPING ADDRESS]

BILLING INFORMATION

BILLING ADDRESS    PAYMENT METHOD    PROMOTION CODE
                                                    Details ⓘ

Mr. James Jones    E-Wal
12345 Central Boulevard
Singapore 546827    [EDIT PAYMENT METHOD]    [USE PROMOTION CODE]
12345678

[EDIT BILLING ADDRESS]

ORDER DETAILS

| | |
|---|---|
| SUBTOTAL | $44.99 |
| SHIPPING | $8.00 |
| Receive Free Shipping On Your Order \| Details ⓘ | -$8.00 |
| SALES TAX ⓘ | $0.00 |
| TOTAL COST | $44.99 |

8051 — [SUBMIT ORDER]

ACME LOGISTICS PROVIDERS

Shipping Options

Choose shipping speed

| | |
|---|---|
| ○ Super Saver Shipping (5-8 business days) | $10 USD |
| ○ Standard Shipping (3-5 business days) | $20 USD |
| ● Two-Day Shipping (within 2 business days) | $30 USD |
| ○ One-Day Shipping (within 1 business day) | $40 USD |

Confirm My Shipping Options

FIG. 47

SELECT PAYMENT METHOD

○ CREDIT CARD                                         VISA 〇〇 ▭

○ BILL ME LATER® See Terms ⊡                          ☑ BillMeLater
Special offers on qualifying purchases – quick, easy, secure!

○ E-Wal        What's this? ⊙                         E-Wal

1. If you select E-Wal as your payment method, you will continue through the standard checkout process then automatically
proceed to E-Wal.com complete your payment. 2. Once you have been redirected to E-Wal.com you will have 25 minutes
to complete the payment. 3. Returns of products purchased with E-Wal are accepted only by mail at RalphLauren.com, not at
our stores. 4. Returns of products purchased with E-Wal may take longer.

⦿ E-Wallet                                            E-Wallet

Powered by
                                                      MASTER CARD

1. If you select E-Wallet as your payment method, you will continue through the standard
checkout process then automatically proceed to E-Wallet.com to complete payment. 2. Once
you have been redirected to E-Wallet.com you will have 25 minutes to complete the payment.

GIFT CARDS
You may apply more than one Gift Card, Online Gift Certificate or Merchandise Credit to your order, but they must be
entered one at a time. (Add additional numbers after clicking "Apply").

Card/Certificate Number [            ]         Check Balance ⊡

Pin Number [    ]  [Apply]
           Where's my pin? ⊙

[CONTINUE CHECKOUT]

Your Payment Gateway

Hello, Jerry
Please review your Payment Method and Shipping Address to complete purchase.

Payment Method　　　　　　　　　　　　　　　　　　　　Shipping Address

[ + Add Card ]　　　　　　　　　　　　　　　　　　　　　　　[ + Add Address ]

Bank X Credit Card　　　　　　　　　　　　　　Home (Default)
Ending 9012　Expires Mar-2014　　　　　　　　　Jerry Jones　　　　Notes:
[ Edit | Delete ]　　　　　　　　　　　　　　　　　1289 Main Street　 Default address cannot be selected
　　　　　　　　　　　　　　　　　　　　　　　　　Australia 1123　　　for your current purchase.

Bank Y Credit Card　　　　　　　　　　　　　　Jerry Jones
Ending 3456　Expires Dec-2014　　　　　　　　　Baker Logistics
[ Edit | Delete ]　　　　　　　　　　　　　　　　　8888 Any Street
　　　　　　　　　　　　　　　　　　　　　　　　　Cleveland, Ohio 43210 US

Bank Z Credit Card　　　　　　　　　　　　　　Your Shipping Options and Cost
Ending 6308　Expires Mar-2017
[ Edit | Delete ]　　　　　　　　　　　　　　　　　Local Shipping　　　　　　　　　　　$5.00 USD
　　　　　　　　　　　　　　　　　　　　　　　　　ACME Shipping
　　　　　　　　　　　　　　　　　　　　　　　　　Two-Day Shipping　　　　　　　　　$30.00 USD
　　　　　　　　　　　　　　　　　　　　　　　　　(within 2 business days)

Total shipping and handling　　　　　$35.00 USD

8060 —[ Review Your Order ]

Help | Privacy Policy | Terms of Use　　　　　　　　　　　　　　　　　© 2001 All Rights Reserved

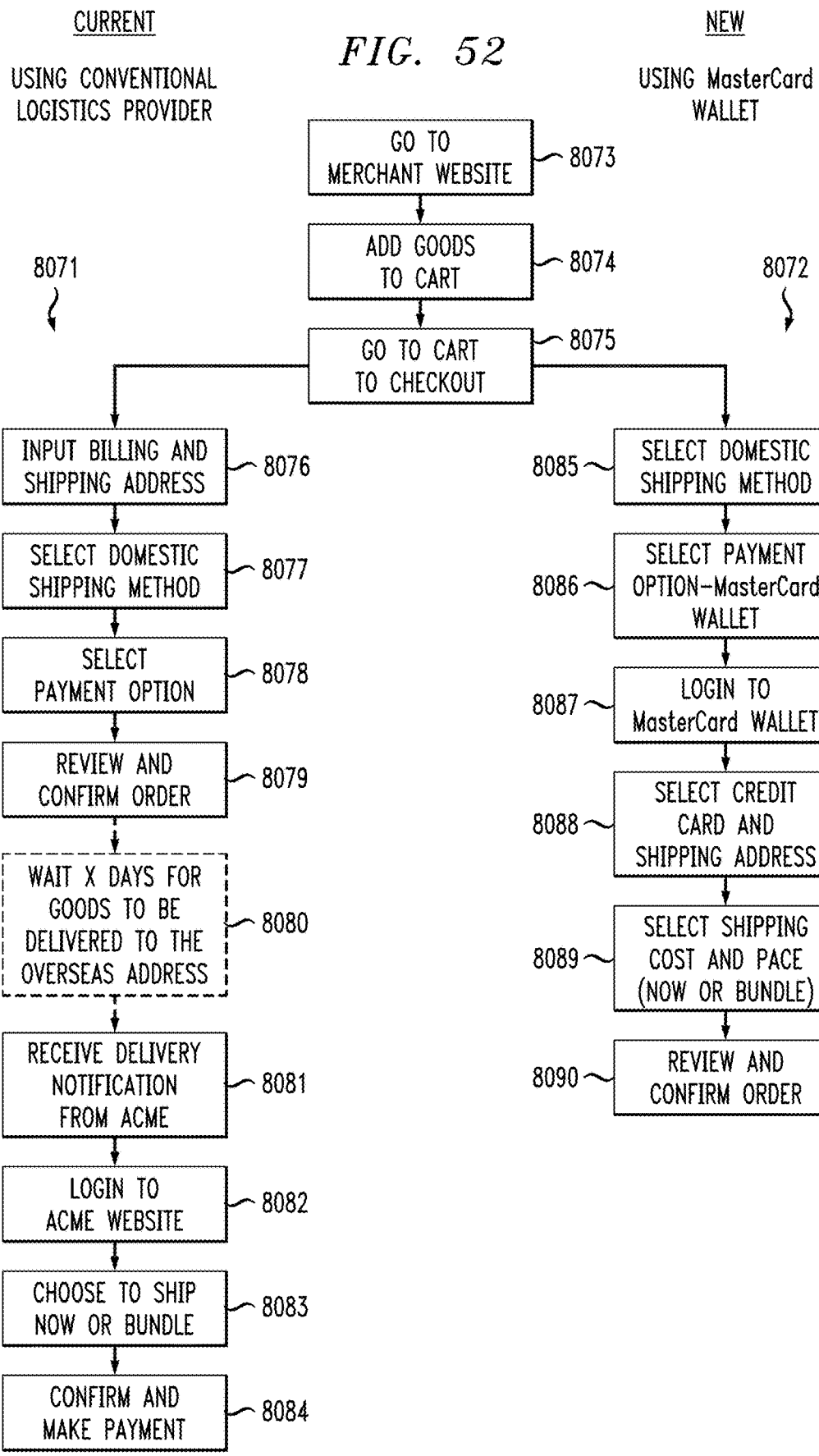

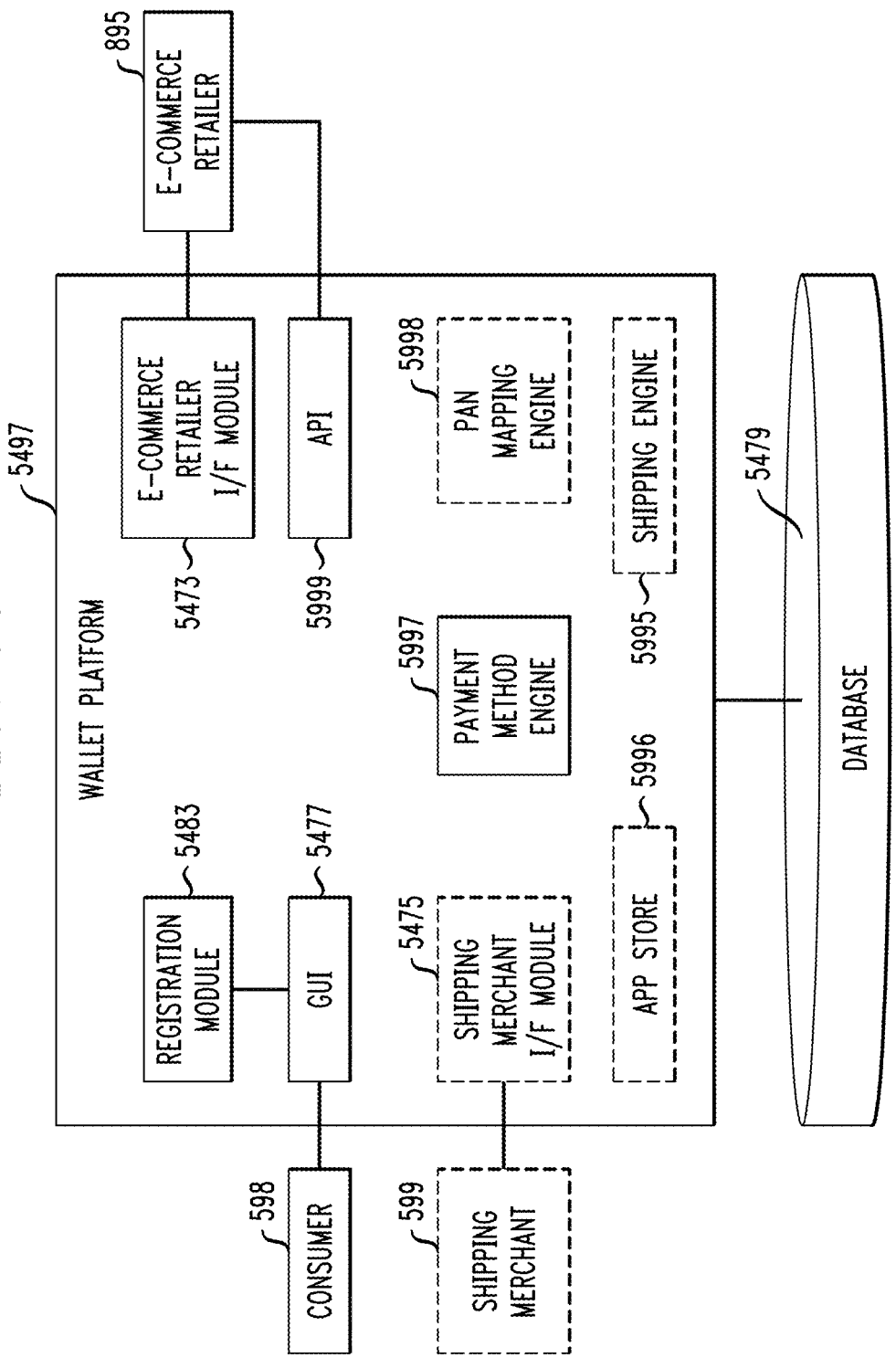

ELECTRONIC WALLET APPARATUS, METHOD, AND COMPUTER PROGRAM PRODUCT

CROSS-REFERENCE TO RELATED APPLICATIONS

This application is a non-provisional of U.S. Provisional Patent Application Ser. No. 61/722,294, filed Nov. 5, 2012, ELECTRONIC WALLET APPARATUS, METHOD, AND COMPUTER PROGRAM PRODUCT, of David Pardo et al., and claims the benefit thereof. The complete disclosure of the aforementioned U.S. Provisional Patent Application Ser. No. 61/722,294 is expressly incorporated herein by reference in its entirety for all purposes.

FIELD OF THE INVENTION

The present invention relates generally to electronic commerce, and, more particularly, to electronic payment systems.

BACKGROUND OF THE INVENTION

With the growth of Internet commerce, the electronic wallet (e-wallet), also known as a digital wallet, has been developed. An e-wallet provides consumers with a secure and convenient way to pay for purchases from accepting on-line merchants. Upon registration, consumers may store their card, billing and shipping information on a site hosted by a suitable entity, and may access that information to pay conveniently and securely across participating merchants.

SUMMARY OF THE INVENTION

Principles of the present invention provide techniques for an electronic wallet apparatus, method, and computer program product. An exemplary embodiment of a method, according to one aspect of the invention, includes obtaining, at an electronic wallet platform, registration information for a plurality of consumers; providing a mechanism to integrate the electronic wallet platform with a plurality of merchants; and, via the electronic wallet platform, affording a given one of the consumers an option to select from multiple methods to pay for a transaction with a given one of the merchants. The multiple methods are based, at least in part, on the registration information. At least one of the multiple methods includes a virtual card number. Further steps include obtaining, from the given one of the consumers, a selection of the virtual card number for payment for the transaction; and providing the given one of the merchants with the virtual card number.

In another aspect, another exemplary method includes obtaining, at an electronic wallet platform, registration information for a plurality of consumers; and making available to the consumers a secure application for portable devices of the consumers which affords the consumers an option to select from multiple methods to pay for transactions with merchants. The multiple methods are based, at least in part, on the registration information. At least one of the multiple methods includes a virtual card number. A further step includes intercepting an authorization request, from a given one of the merchants, for an amount of a given one of the transactions to be charged against a given one of the virtual card numbers. The given one of the transactions includes a given one of the consumers presenting a given one of the portable devices, having the secure application thereon, at a point-of-sale terminal of the given one of the merchants. The virtual card number had been provided to the merchant via communication between the given one of the portable devices and the point-of-sale terminal of the given one of the merchants. Further steps include translating the given one of the virtual card numbers into an actual card number which is not provided to the given one of the merchants; and passing the authorization request to an issuer, with the actual card number therein.

In a further aspect, another exemplary method includes obtaining, at an electronic wallet server, product information in connection with an on-line shopping session of a consumer with an e-commerce retailer; dispatching, from the electronic wallet server, shipping option information, destined for the consumer, providing at least two options for shipping goods, associated with the product information, from the e-commerce retailer to the consumer; and obtaining, at the electronic wallet server, in connection with the on-line shopping session, an indication of a desired form of shipping from the e-commerce retailer to the consumer, the indication being based on the shipping option information.

In a still further aspect, another exemplary method includes obtaining, by an electronic wallet platform, transaction data pertaining to a transaction between a consumer and a merchant for provision of at least one of goods and services. The electronic wallet platform has at least first and second funding sources available. A further step includes dispatching, from the electronic wallet platform, based on the transaction data, a first cost scenario for the transaction based on use of the first one of the funding sources and a second cost scenario for the transaction based on use of the second one of the funding sources. The first and second cost scenarios are destined for the consumer. Further steps include obtaining, at the electronic wallet platform, from the consumer, a selection, from among the at least first and second funding sources, based on the first and second cost scenarios; and providing the merchant an account number associated with the selected funding source.

In an even further aspect, another exemplary method includes obtaining, by an electronic wallet mobile application, transaction data pertaining to a transaction between a consumer and a merchant for provision of at least one of goods and services. The electronic wallet mobile application has at least first and second funding sources available. Further steps include determining, by the electronic wallet mobile application, based on the transaction data, a first cost scenario for the transaction based on use of the first one of the funding sources and a second cost scenario for the transaction based on use of the second one of the funding sources; obtaining, at the electronic wallet mobile application, from the consumer, a selection, from among the at least first and second funding sources, based on the first and second cost scenarios; and providing the merchant an account number associated with the selected funding source.

In yet a further aspect, an exemplary wallet platform server apparatus includes a memory; and at least one processor, coupled to said memory. Said at least one processor is operative to: obtain registration information for a plurality of consumers; integrate with a plurality of merchants; and afford a given one of said consumers an option to select from multiple methods to pay for a transaction with a given one of said merchants. Said multiple methods are based, at least in part, on said registration information. At least one of said multiple methods comprises a virtual card number. Said at least one processor is operative to obtain, from said given one of said consumers, a selection of said virtual card number for payment for said transaction; and provide said given one of said merchants with said virtual card number.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. For example, the computer readable program code, when executed on one or more processors, cerates the platform 5497. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. The means are defined to exclude a transmission medium per se or a disembodied signal per se.

One or more embodiments of the invention can provide substantial beneficial technical effects, including, for example, Creating a process flow wherein a pass-through is provided between the merchant and logistics provider Creating one or more shipping functions in a merchant account that allow merchants to select their preferences Creating a comparison function in a transaction flow that permits comparison of the consumer's data with the merchant's preferences Allowing small or medium-sized merchants to more accurately determine volumetric data regarding products to be shipped, to thereby allow, for example, more accurate estimation of shipping times and/or costs Reducing time expended and/or likelihood of errors in determining which payment vehicle offers the best terms for a given transaction Permit enhanced security of a virtual card number while allowing consumer to obtain benefit of offers, discounts, and the like linked to a real card number.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 shows a general example of a payment system, which is an exemplary context within which one or more embodiments of the invention can be implemented;

FIGS. 11-18 show exemplary screen shots for a payment process in accordance with the prior art;

FIGS. 19-24 show exemplary screen shots for a payment process in accordance with an aspect of the invention, wherein an electronic wallet utilizes virtual card numbers;

FIGS. 26-31 show exemplary screen shots for a payment process in accordance with the prior art;

FIGS. 32-39 show exemplary screen shots for a payment process in accordance with an aspect of the invention, wherein an electronic wallet utilizes virtual card numbers;

FIGS. 40-46 show exemplary screen shots for cross-border online shopping in accordance with the prior art;

FIGS. 47-51 show exemplary screen shots for cross-border online shopping in accordance with an aspect of the invention;

FIG. 52 is a flow chart comparing the processes if FIGS. 40-46 and 47-51;

FIG. 54 is another exemplary software architecture diagram.

DETAILED DESCRIPTION OF PREFERRED EMBODIMENTS

Figure 2:
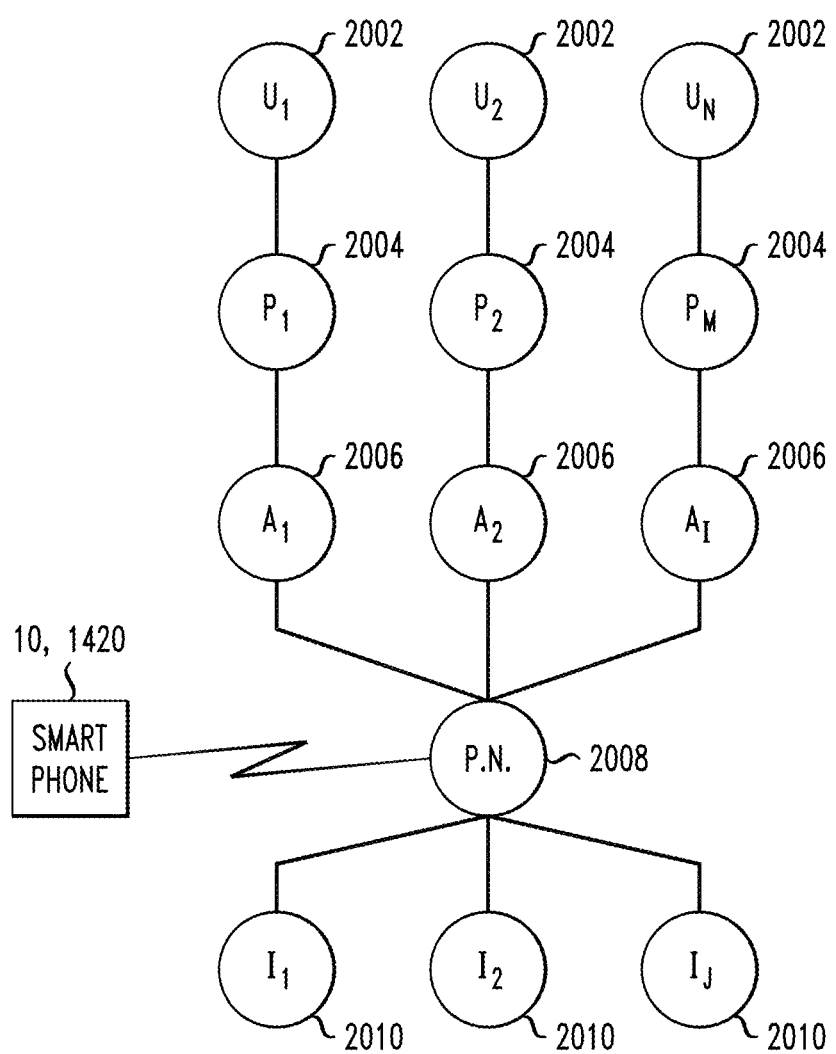
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

Attention should now be given to FIG. 1, which depicts an exemplary embodiment of a system 100, according to an aspect of the invention, and including various possible components of the system. In this regard, one or more embodiments of the invention involve the operator of a payment network; e.g., an entity such as MasterCard International Incorporated, operator of the BANKNET® network, or Visa International Service Association, operator of the VISANET® network. This should be kept in mind in connection with the description of FIGS. 1 and 2. It should be noted that some aspects of the invention are directed to card-not-present Internet commerce, while other embodiments of the invention involve presentation (for example, via near-field communications (NFC)) of a payment device, such as an appropriately configured "smart" cellular phone, at a point of sale terminal of a merchant.

System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate approach, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets that implement aspects of the invention. Such devices could include cards having a conventional form factor, smaller or larger cards, cards of different shape, key fobs, personal digital assistants (PDAs), appropriately configured cell phone handsets, or indeed any device with the capabilities to implement aspects of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1. Again, some aspects of the invention are directed to card-not-present Internet commerce, while other embodiments of the invention involve presentation (for example, via near-field communications (NFC)) of a payment device, such as an appropriately configured "smart" cellular phone, at a point of sale terminal of a merchant.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps described herein. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 1420 (discussed below). The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

A dual-interface device 1302 is sometimes employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

Figure 4:
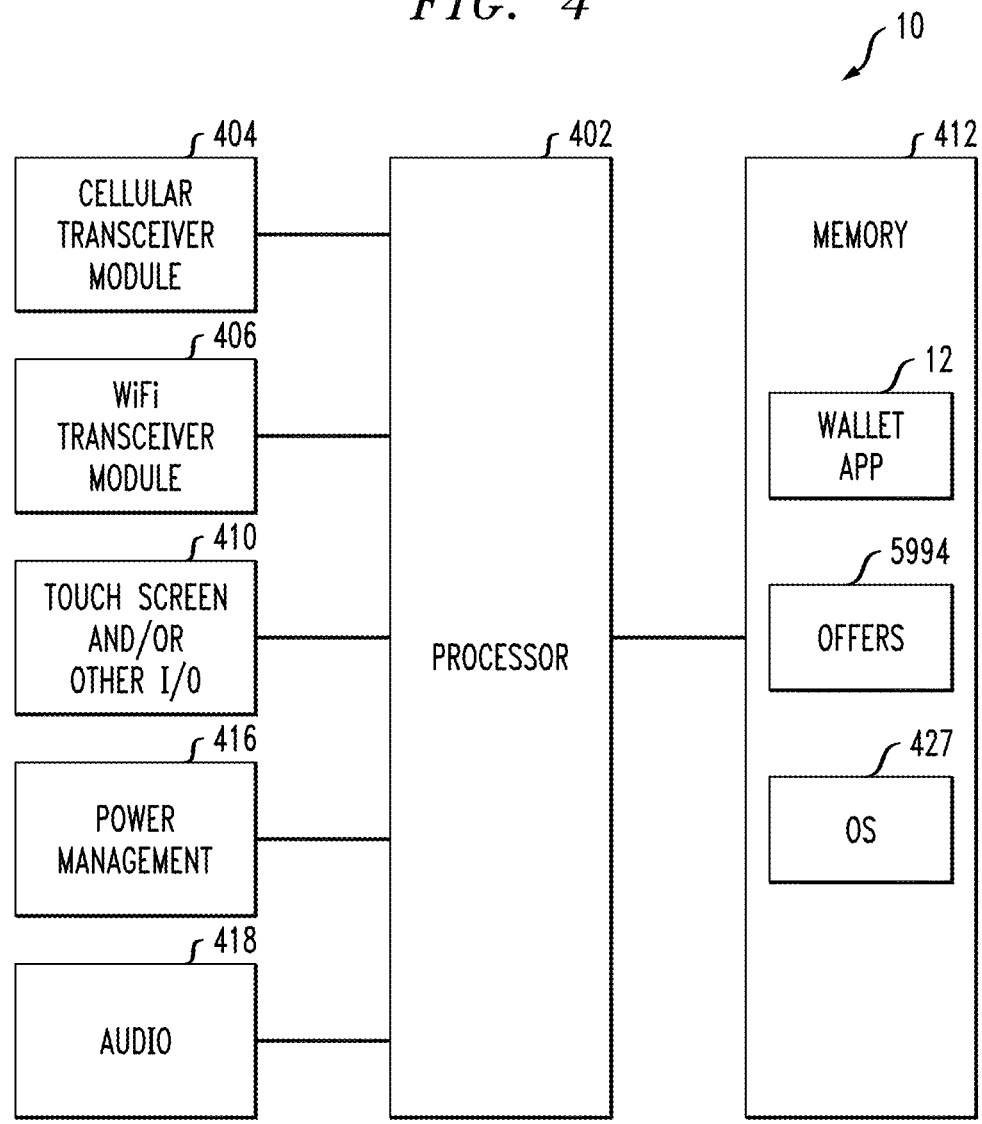
FIG. 4 is a block diagram of a "smart" phone or tablet computer configured in accordance with an aspect of the invention.

An appropriately configured cellular telephone handset 1420 can also be employed in a number of embodiments. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided. Many current devices omit keypad 1680 and employ a touchscreen instead; a more modern device of this type is shown in FIG. 4.

The description of devices, elements, or components 102, 104, 106, 108, 110, 112, 114, 116, 118, 120 throughout this document are equally applicable to the corresponding items in the dual interface card 1302 and cellular telephone handsets 10, 1420.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the aforementioned BANKNET® network, or Visa International Service Association, operator of the aforementioned VISANET® network. In general, N, M, I, and J are integers that can be equal or not equal.

In some cases, network 2008 uses ISO 8583 messaging. ISO 8583, Financial transaction card originated messages—Interchange message specifications, is the International Organization for Standardization standard for systems that exchange electronic transactions made by cardholders using payment cards. It has three parts: Part 1: Messages, data elements and code values; Part 2: Application and registration procedures for Institution Identification Codes (IIC); and Part 3: Maintenance procedures for messages, data elements and code values, all of which are expressly incorporated herein by reference in their entirety for all purposes. The skilled artisan in the payments processing field will be thoroughly familiar with ISO 8583 in any case.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. A wide variety of other types of payment networks can be used. For example, in some instances, a payment network configured to facilitate transactions between multiple issuers and a single acquirer could be used. Some embodiments of the invention may be employed with other kinds of payment networks, for example, proprietary or closed payments networks with only a single issuer and acquirer; with mobile networks; and/or with various types of electronic wallet services in conjunction with a suitable payment network. Furthermore, one or more embodiments employ payment gateways, payment service providers, and/or payment facilitators.

As seen in FIG. 2, in some instances, the owner or user of a smart phone 10, 1420 or similar device configured in accordance with one or more embodiments of the invention accesses a web site or the like of the payment network operator 2008 to download a suitable wallet application 12 (see FIG. 4) to the phone 10, 1420 or similar device. This feature is optional. Note that the connection between phone 10, 1420 and payment network operator 2008 may very well be indirect; for example, payment network operator 2008 may provide a "golden copy" of the application 12 to a third party and phone 10, 1420 downloads over the web from such third party. The link shown between phone 10, 1420 and payment network operator 2008 also represents the flow of data between phone 10, 1420 and payment network operator 2008, and may be direct or indirect; for example, via a cellular network and possibly with one or more intermediate parties.

Figure 3:
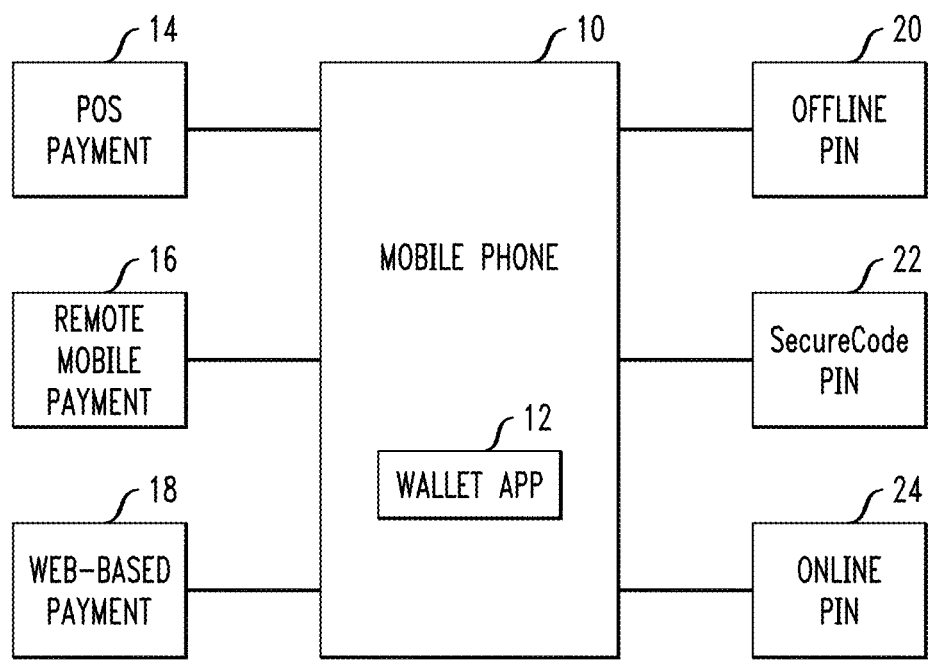
FIG. 3 is a schematic representation of a mobile phone-based payment/authentication system in accordance with an aspect of the invention.

Referring now to FIG. 3, a mobile phone 10 can be associated with a payment card, e.g., a credit card, debit card or prepaid card. The mobile phone is preferably capable of storing and/or running a wallet application 12, which is preferably a browser-based mobile application capable of storing selected information such as a cardholder name, card alias, billing/shipping address, etc., locally on the phone or in a cloud server. In one preferred embodiment, the mobile phone is a "smart phone", and the wallet application is stored in a memory device located in the phone. The arrangement of FIG. 3 enable payments across multiple channels of commerce, e.g., a POS payment 14 by, for example, a PayPass® terminal (registered mark of MasterCard International Incorporated, Purchase, N.Y., USA), a remote mobile payment 16 initiated by a mobile phone, and/or a web-based payment 18.

As further described in FIG. 3, some embodiments use various authentication tools including an offline PIN 20, a SecureCode PIN 22, and/or an online PIN 24. It will be recognized that the foregoing mentioned PINs are currently in use in the marketplace and, accordingly, the use of such already existing PINs can facilitate the implementation of the present system. Of course, it is contemplated herein that a new independent PIN (apart from the mentioned PINs) can be created specifically for use with one or more embodiments.

Offline PIN 20 preferably utilizes an offline personal identification number (PIN) verification process whereby the PIN entered by the consumer is verified by a secure element located on phone 10. In this process, the wallet plays the role of a "virtual terminal," interacting with the secure element, and upon verification of the PIN, passes the CHIP token (Authorization Request Cryptogram or ARQC) to the merchant for authorization. In this "virtual terminal", the secure element serves the role as the "card." Offline PIN 20 can, for example, be used in connection with a PayPass® payment. The skilled artisan will be familiar with the terminology used in the description of FIG. 3 from the aforementioned EMV interoperable payments specification. Versions 4.0 through 4.3 of the EMV Specifications, including Book 1, Book 2, Book 3, Book 4; version 1 of the EMV Common Payment Application Specification (CPA) plus bulletins; and version 1.1 of the EMV Card Personalization Specification plus bulletins, are all expressly incorporated herein by reference in their entireties for all purposes. MasterCard PayPass® is a non-limiting example of an EMV compatible, "contactless" payment feature based on the ISO/IEC 14443 standard that provides cardholders with a simpler way to pay by tapping a payment card or other payment device, such as a phone or key fob, on a point-of-sale terminal reader rather than swiping or inserting a card.

Secure Code PIN 22 is a PIN associated with a card enrolled in the MasterCard SecureCode® system (registered mark of MasterCard International Incorporated, Purchase, N.Y., USA). It is contemplated herein that the SecureCode system could also utilize a password and/or code, rather than a PIN.

Online PIN 24 is used in an online PIN verification process whereby the wallet application 12 plays the role of a "virtual terminal," interacting to encrypt the PIN for transmission to the merchant. The use of an online PIN verification process may provide greater flexibility in authenticating transactions by, for example, allowing an issuing bank to authenticate the transactions associated with its cardholders without the need for the issuing bank to enroll/register its cardholders and/or adopt new infrastructure.

Users may have different instances of wallet application 12 on different phones. A sync service can maintain the various instances synchronized with an online server (similar to how browser bookmarks can be stored offline in different instances of an internet browser and can be synchronized between various machines.) Merchants can add a piece of code to their checkout button that invokes the wallet application. During checkout, users select card and shipping address (if needed). The authentication PIN is entered into the phone in response to a prompt from the mobile application. The wallet passes back the information to the merchant who submits this information through existing channels (internet gateway or payment processor), i.e., no changes are required to existing processes or integration.

In a non-limiting example, the wallet application may be a browser HTML 5 application (not a native application) that self-installs in the mobile phone or computer browser on the first use. In a non-limiting example, the wallet application is downloaded to the smart phone or the like from an "app store" or the like on a server.

In another aspect, the wallet application can securely store information on the phone (shipping address, card alias, secure token if used, virtual and/or real card number(s), etc.). This information can be used for a number of purposes; in some cases, to authenticate to the remote server. This also enables offline transactions. The mobile application can preferably "talk" to the secure element on the phone (which may be on the subscriber identity module (SIM card) of the phone, for example). In this regard, the mobile application could play the role of a virtual POS terminal in initiating card present CHIP plus PIN transactions. On the other hand, in some cases, the smart phone or the like is only used as an actual payment device at a POS.

In some instances, a consumer may use his or her phone or computer to shop at a web-based retailer. When the consumer is ready to check out, he or she will preferably have the option of clicking a checkout button associated with some aspects of the present system. Clicking the button prompts the consumer to provide his or her username and password to log-in, and to confirm both the payment card to be used and the shipping address to which the item is to be sent. Thereafter, the system will prompt the consumer to enter the authenticating PIN, and the transaction is then completed. At that point, the consumer is preferably returned to the merchant's site. This is a non-limiting example. Some embodiments are directed to card-not-present Internet commerce with one or more virtual card numbers in an electronic wallet on a server, and some embodiments are directed to a downloadable electronic wallet application on a smart phone or the like for use in transactions with the smart phone at brick and mortar retailers.

One or more embodiments provide one or more benefits to the consumer. Some embodiments provide easy and convenient checkout through a form fill or pass through function, which is preferably part of the wallet application 12. Some embodiments provide secure payments via a PIN, or other biometric parameters such as a voice print or fingerprint. In this regard, the smart phone may be provided with a biometric reader and/or analyzer. Some embodiments omit one, some, or all of these features.

One or more embodiments provide one or more benefits to the merchant. Some embodiments include a potential liability shift from the merchant to the authorizing bank for all wallet-based transactions. More particularly, the use of an authentication process for remote transactions reduces the risk of fraud associated with such transactions, and may limit and/or reverse the shifting of fraud liability from the authorizing bank to the merchant. The use of the authentication process may also provide more attractive economics to the merchant through access to lower fee structures, depending on the consumer authentication method. One or more embodiments also provide limited integration impact in that a simple wallet application program interface (API) is provided to pass card details, shipping information and security tokens, and does not require any new contractual relationships (i.e., existing card acceptance is leveraged). One or more embodiments are backwards compatible, (i.e., native support is provided for SecureCode® technology) thus resulting in better consumer experience and/or ergonomics. Again, these details are exemplary, optional, and non-limiting; some embodiments are directed to card-not-present Internet commerce with one or more virtual card numbers in an electronic wallet on a server, and some embodiments are directed to a downloadable electronic wallet application on a smart phone or the like for use in transactions with the smart phone at brick and mortar retailers.

The wallet application 12 as described with respect to FIG. 3 provides a comprehensive solution to financial transactions conducted across multiple channels of commerce. The wallet application 12 provides a simple and winning proposition to consumers, and in some instances provides a form fill option. One or more embodiments can use existing payment networks 2008 and the like which are already accepted by merchants, thereby eliminating the need for heavy integration, while providing more security and better economics. One or more embodiments do not require issuing banks to implement new requirements since they can function with existing authorization techniques, e.g., SecureCode® technology, CHIP and PIN and/or online PIN. Some embodiments contemplate the long term convergence path of the three commerce platforms—retail, e-commerce and mobile—towards a mobile phone centric system. Other embodiments, as noted, involve a server-based wallet, and optionally a downloadable wallet application, and may omit some or all of the enhanced authorization features described herein.

Some aspects can be employed in applications where the consumer owns a "dumb phone." For example, in applications where the consumer is conducting an e-commerce transaction through his or her computer, or has initiated a call to a call center, and the consumer does not own a smart phone, the system in FIG. 3 can utilize existing SMS messaging or other messaging technology to contact the "dumb phone" of the consumer and request the entry of a PIN. Upon receipt of the PIN from the "dumb phone", the transaction can be authenticated and completed. This feature is entirely optional and may be omitted in one or more embodiments.

FIG. 4 is a block diagram of an exemplary tablet computing device or smart phone 10 or the like. Unit 10 includes a suitable processor; e.g., a microprocessor 402. A cellular transceiver module 404 coupled to processor 402 includes an antenna and appropriate circuitry to send and receive cellular telephone signals, e.g., 3G or 4G. A WiFi transceiver module 406 coupled to processor 402 includes an antenna and appropriate circuitry to allow unit 400 to connect to the Internet via a wireless network access point or hotspot. The skilled artisan will appreciate that "Wi-Fi" is a trademark of the Wi-Fi Alliance and the brand name for products using the IEEE 802.11 family of standards.

One or more embodiments include a wallet application 12 in memory 412 which when executed causes the processor 402 to implement at least a portion of the functionality described herein. Operating system 427 orchestrates the operation of unit 400. Apple's iOS is a non-limiting example of a suitable operating system; other non-limiting examples include Linux-based systems (registered mark of Linus Torvalds), Windows Phone (registered mark of Microsoft Corporation), and the like.

Touch screen 410 coupled to processor 402 is also generally indicative of a variety of input/output (I/O) devices such as a keypad, another type of display, a mouse or other pointing device, and so on, all of which may or may not be present in one or more embodiments. Audio module 418 coupled to processor 402 includes, for example, an audio coder/decoder (codec), speaker, headphone jack, microphone, and so on. Power management system 416 can include a battery charger, an interface to a battery, and so on. Memory 412 is coupled to processor 402. Memory 412 can include, for example, volatile memory such as RAM, and non-volatile memory such as ROM, flash, or any tangible computer-readable recordable storage medium which stores information in a non-transitory manner. Processor 402 will typically also have on-chip memory.

Offers 5994 are discussed below.

Thus, some embodiments may be implemented, for example, at least in part via an application that runs on a tablet or smart phone or the like and another application that runs on a remote server or the like.

Figure 5:
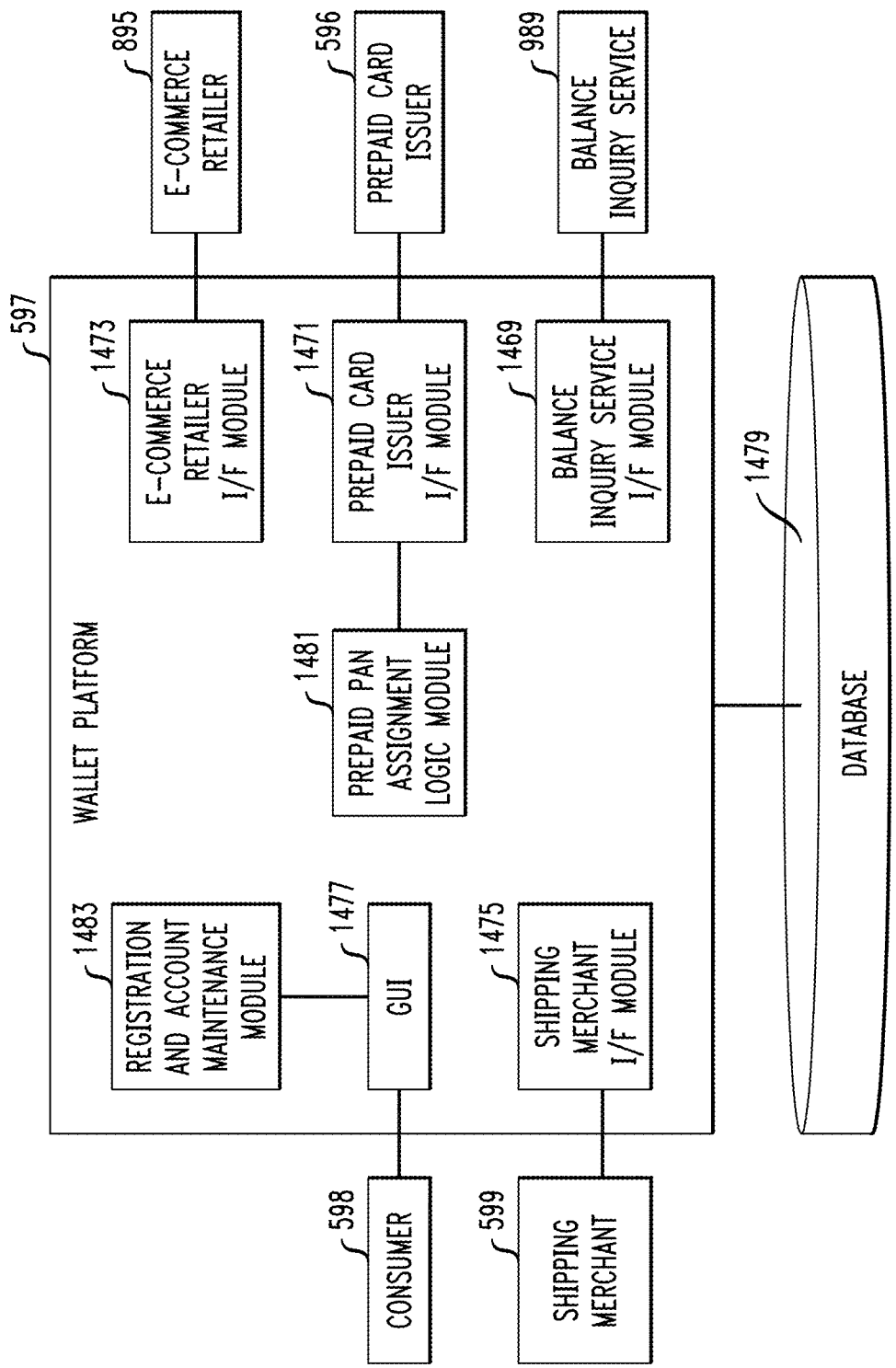
FIG. 5 is an exemplary software architecture diagram.

FIG. 5 shows an exemplary software architecture diagram. Wallet platform 597 includes executable code, stored in a non-transitory manner in a tangible computer-readable recordable storage medium, which, when loaded into the memory of one or more servers, causes one or more processors thereof to implement at least portions of the logic described herein. Database 1479 includes a suitable database program such as the Oracle DBMS, Access and SQL Server from Microsoft, DB2 from IBM and the Open source DBMS MySQL, stored in a non-transitory manner in a tangible computer-readable recordable storage medium, as well as persistent storage to store the records therein. The database program, when loaded into the memory of one or more servers, causes one or more processors thereof to implement the database(s) described herein (e.g., with pre-registration information). The various interface modules include executable code, stored in a non-transitory manner in a tangible computer-readable recordable storage medium, which, when loaded into the memory of one or more servers, causes one or more processors thereof to implement the interface functionality and communication flows described herein, included any needed data translation between the wallet platform and the external entities. GUI 1477 provides an interface to consumer 598; shipping merchant interface module 1475 provides an interface to shipping merchant 599; balance inquiry service interface module 1469 provides an interface to balance inquiry service 989; prepaid card issuer interface module 1471 provides an interface to prepaid card issuer 596; and e-commerce retailer interface module 1473 provides an interface to e-commerce retailer 895. Furthermore, registration and account maintenance module 1483 interfaces with consumer 598 via GUI 1477 to perform registration and maintenance functions; new data and/or updates can be stored in database 1479. In some instances, local PANs come from prepaid card issuer 596 via interface 1471; module 1481 determines what countries to obtain PANs for in accordance with the pertinent rule(s).

Figure 6:
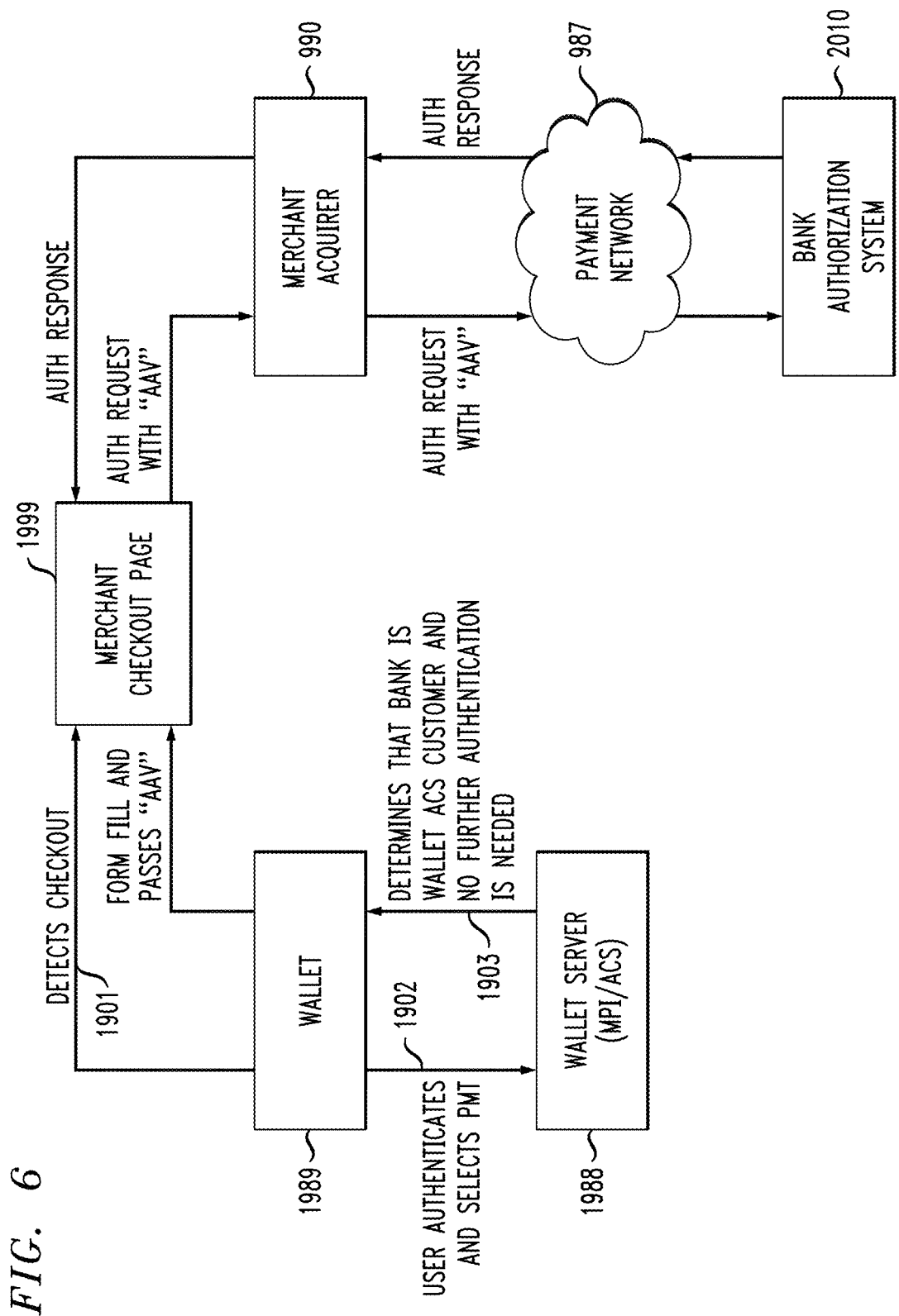
FIG. 6 is a flow chart showing an authentication system wherein features of a merchant plug-in (MPI) and an access control server (ACS) are incorporated into a wallet server.

Referring to FIG. 6, in some embodiments, the wallet 1989 detects checkout at the merchant 1999 at step 1901. The wallet 1989 then authenticates the user (step 1902), and payment details are selected (step 1902). The wallet server 1988 then determines that the bank is the wallet ACS (the bank's SecureCode® authentication server) customer, and that no further authentication is necessary (step 1903). Next, the wallet form fills the payment details, including the AAV (Accountholder Authentication Value), in the merchant page 1999. The merchant then authorizes the transaction in normal fashion (auth request with AAV to merchant acquirer 990). This is passed through payment network 987 to bank authorization system 2010. Merchant acquirer 990 receives the necessary approval (auth response) from system 2010 via network 987, and passes same back to page 1999. In some instances, network 987 is a network such as network 2008. System 2010 is typically run by or on behalf of the issuer, and thus has received the same reference character as the issuer 2010 in FIG. 2.

Figure 7:
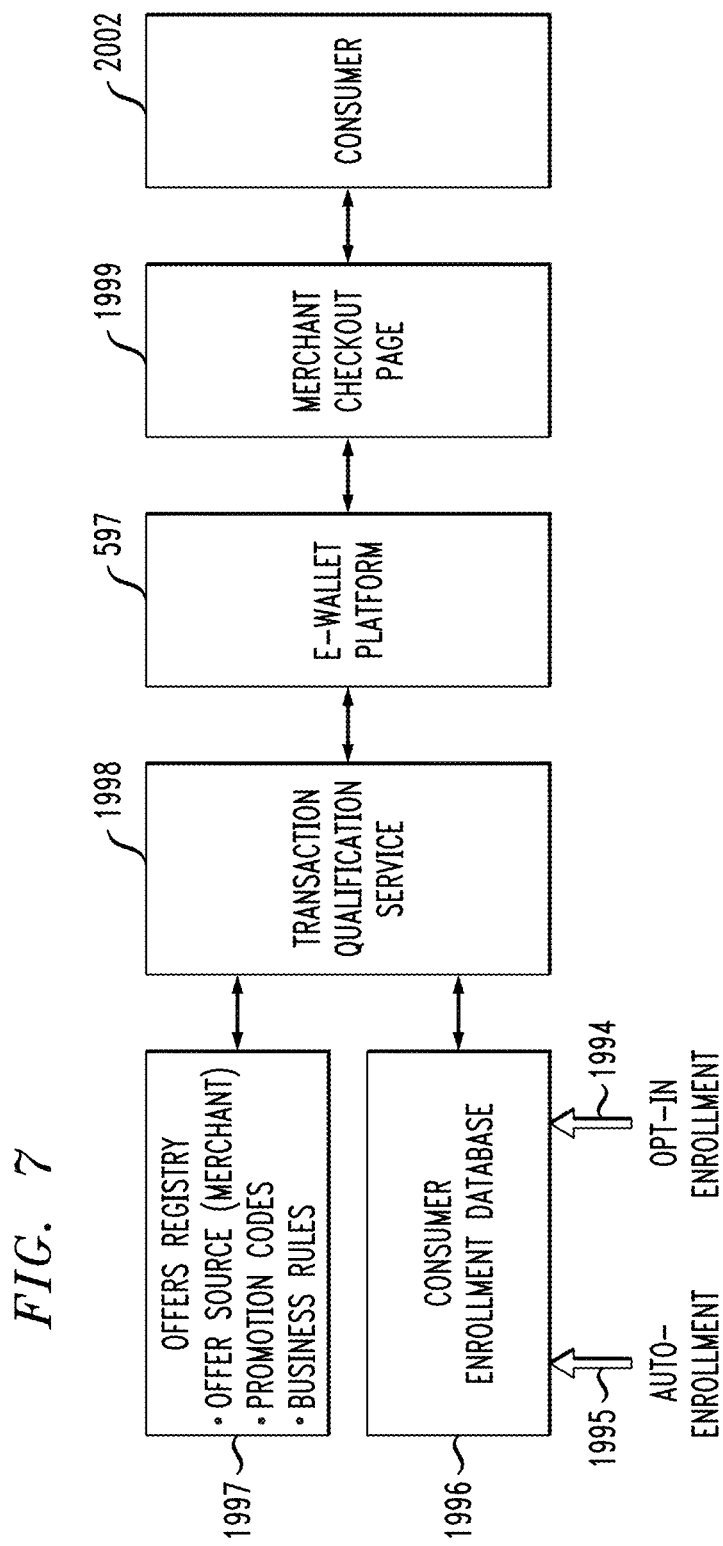
FIG. 7 is an exemplary system block diagram.

FIG. 7 pertains to aspects of consumer offers. There are two different ways for a consumer to be enrolled in consumer enrollment database 1996. As at 1995, auto-enrollment is possible, based, for example, on accounts that payment network operator (PNO) 2008 maintains; certain accounts may be segmented and enabled for participation. As at 1994, in another aspect, the consumer may be given the opportunity to opt in. This could be carried out, for example, by having PNO 2008 or some other entity carry out an analysis or check some other consumer database, to undertake an outreach, inviting one or more consumers to opt in. This could be selective (targeted) or open. In any event, privacy of the consumer should be respected such that some action should be required on the part of the consumer (registration, confirmation, or the like) before the consumer shares any information or receives any offers. In many cases, this can be carried out on-line or via mobile messaging, or using a clickable link in an e-mail. The consumer enrollment database 1996 manages all the registered consumers. It ultimately maps back to an e-wallet account; e.g., via credit or debit card account or through the wallet account itself.

Offers registry 1997 typically involves business-to-business interaction. The rules of the offer are determined by whoever provides the offer, whether a merchant, manufacturer, issuing bank, and so on. The appropriate entity provides the rules of the offer, the merchants at which the rules apply, a code range or some kind of identification scheme for the offer, and so on. A single identifier could be used for everyone to receive the offer; serialized identifiers could be provided, and so on. This information is stored in the offers registry 1997.

Transaction qualification service 1998 applies the rules in real time, based on registry 1997 and database 1996. Service 1998 applies the rules of the registered offer to transaction information coming through for the given consumer and determines if all the pieces are in place to qualify. Service 1998 then updates that particular consumer's registration and transaction records.

E-wallet platform 597 provides the interaction between the merchant and the consumer 2002 as to the transaction that is to be qualified. Consumer 2002 goes to merchant checkout page 1999 and when the consumer indicates that he or she wishes to pay with the e-wallet, he or she is re-routed to the e-wallet platform 597 and pertinent transaction information provided by the merchant is then run through the transaction qualification service 1998. If a promotion is applicable, this information is passed back to e-wallet platform 597, and when the consumer completes interaction with e-wallet platform 597, that information passes back to the merchant, as part of the interface between e-wallet platform 597 and the merchant. If the merchant wants to accept e-wallet platform 597, there will be certain messages the merchant will pass to e-wallet platform 597 and certain messages the merchant will receive back from e-wallet platform 597.

Figure 9:
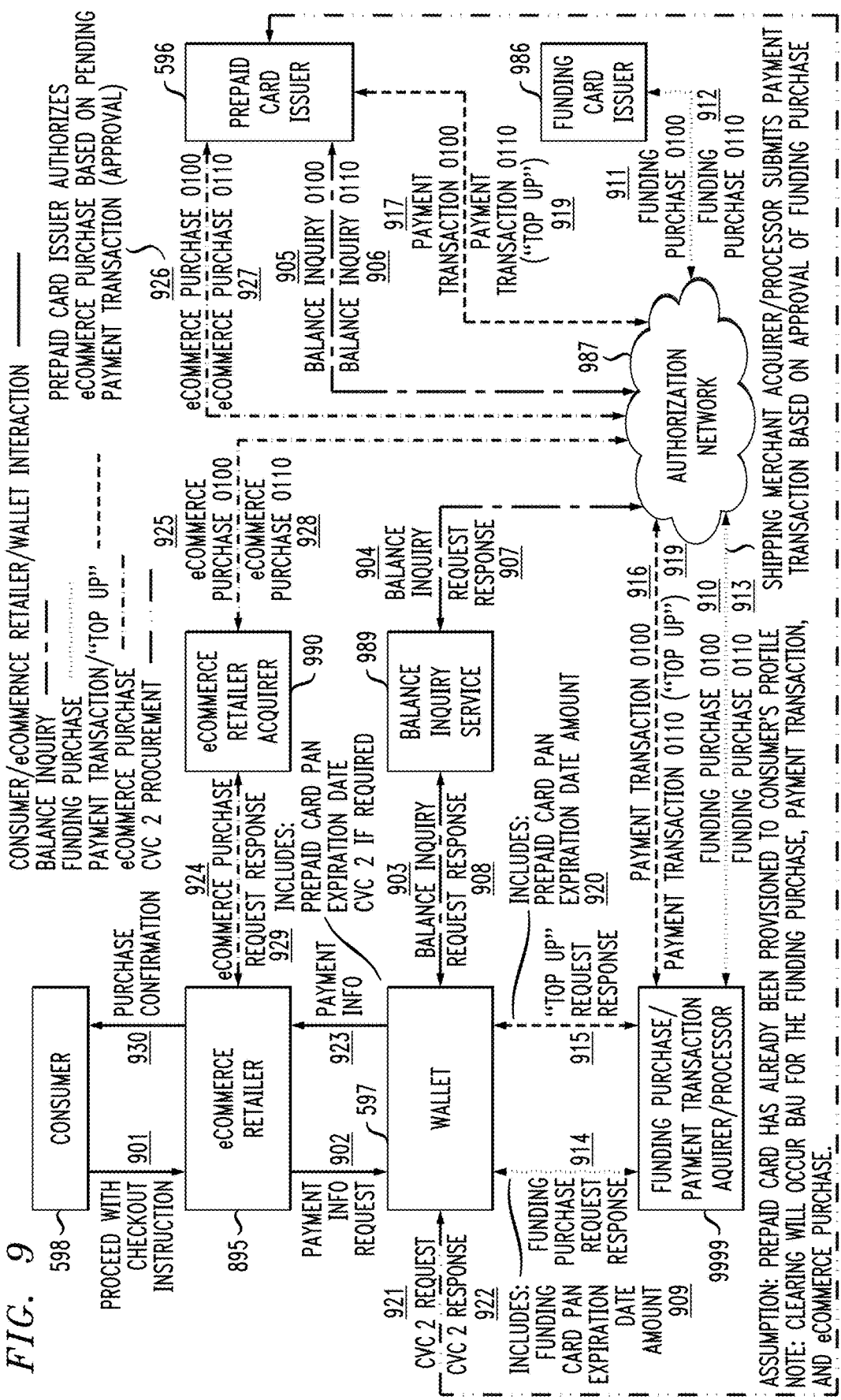
FIG. 9 depicts an exemplary transaction at an international merchant using a pre-paid card.

FIG. 9 depicts an exemplary transaction at an international merchant using an existing pre-paid card. At 901, the consumer 598 responds affirmatively to an inquiry on whether to proceed with checkout after being provided with fully landed costs. At 902, the e-commerce retailer 895 generates a call to the e-wallet 597 to retrieve payment method and confirm shipping address information. At 903, the e-wallet initiates a request to the balance inquiry service 989 to generate a balance inquiry to the prepaid card issuer 596 to determine the amount of funds remaining on the prepaid card. The e-wallet 597 provides the balance inquiry service 989 with the prepaid PAN associated with the e-commerce retailer country.

At 904, the balance inquiry service formats and sends a balance inquiry authorization request to the authorization network 987 (for example, network 2008) that is destined for the prepaid card issuer 596. At 905, the authorization network forwards the balance inquiry to the prepaid card issuer. At 906, the prepaid card issuer sends an authorization response for the balance inquiry with the amount of funds remaining on the prepaid card to the authorization network. At 907, the authorization network sends the authorization response to the balance inquiry service. At 908, the balance inquiry service provides the balance information to the e-wallet. At 909, the e-wallet generates a request to the funding purchase/payment transaction acquirer/processor 9999 to initiate a purchase against the default funding card associated with the consumer's profile for the amount that is the difference between the e-commerce purchase amount and the available amount on the prepaid card. E-wallet 597 provides the entity 9999 with the funding card PAN information and the amount.

Note that "0100" and "0110" refer to ISO 8583 messages "authorization request" and "authorization request response."

At 910, the entity 9999 formats and sends a purchase authorization request to the Authorization Network 987 that is destined for the funding card issuer 986. At 911, the authorization network forwards the purchase authorization request to the funding card issuer 986. At 912, the funding card issuer provides an approved response to the authorization request to the authorization network. At 913, the authorization network forwards the authorization response to the entity 9999. At 914, the entity 9999 forwards the authorization response to the wallet 597.

At 915, the e-wallet generates a request to the entity 9999 to initiate a payment transaction to "top up" funds to the prepaid card in the amount of the difference between the e-commerce purchase and remaining funds on the prepaid card (this is the same purchase amount that was approved by the funding card issuer 986). The e-wallet provides the entity 9999 with the prepaid PAN and the amount. The prepaid PAN is associated with the same country as the e-commerce retailer (e.g. US e-commerce retailer, US prepaid card). At 916, the entity 9999 formats and sends a payment transaction authorization request to the authorization network 987, that is destined for the prepaid card issuer 596.

At 917, the authorization network 987 forwards the payment transaction authorization request to the prepaid card issuer. At 918, the prepaid card issuer 596 provides an approved response to the authorization request to the authorization network 987. At 919, the authorization network forwards the authorization response to the entity 9999. At 920, the entity 9999 provides a response to the e-wallet indicating that the top-up was approved. Flows 921 and 922 show the CVC 2 request and response between the wallet and prepaid card issuer. In this regard, at the time of the purchase, once approval has been obtained from the funding card issuer, and top-up has been successfully accomplished, to make the purchase successful it is necessary to provide the merchant with all the details needed to move an authorization through. Thus, the merchant will need the CVC2 data. CVC2 data is often requested by the merchant to ensure that the person making an on-line transaction really has the card in his or her possession. In one or more embodiments, CVC2 data is not stored and so must be obtained from the prepaid card issuer. At 921 and 922, the CVC2 value is obtained for the specific prepaid card to be used in the purchase transaction. At 923, payment information including the prepaid card PAN, expiration date, and CVC 2 (if required) is provided by the wallet to the e-commerce retailer.

At 924, the e-commerce retailer 895 generates a request to its acquirer 990 to perform the e-commerce purchase against the prepaid card. At 925, the e-commerce retailer acquirer 990 formats and sends a purchase authorization request to the authorization network that is destined for the prepaid card issuer. At 926, the authorization network forwards the purchase authorization request to the prepaid card issuer 596. At 927, the prepaid card issuer 596 provides an approved response to the authorization request to the authorization network. At 928, the authorization network forwards the authorization response to the e-commerce retailer acquirer. At 929, the e-commerce retailer acquirer 990 forwards the authorization response to the e-commerce retailer. At 930, the e-commerce retailer provides purchase confirmation to the consumer 598.

The e-commerce retailer acquirer block 990 contemplates a bank in the same jurisdiction as the e-commerce retailer, as well as a server operated by or on behalf of the bank which may be located in any jurisdiction. The balance inquiry service block 989 contemplates a server with appropriate software which is configured to send a balance inquiry to the prepaid card issuer to determine how much is left on the card; such server is likely to be in the same jurisdiction as the e-wallet server, but could also be elsewhere. The prepaid card issuer block 596 contemplates a prepaid card issuer which is likely, but not necessarily, in the same jurisdiction as the e-commerce retailer, as well as a server run by or on behalf of the prepaid card issuer, with suitable software, which could be located in any jurisdiction. The funding card issuer block 986 contemplates a banking institution, most likely in the home country of the consumer, as well as a server run by or on behalf of such banking institution, with suitable software, which could be located in any jurisdiction. The authorization network 987 is typically a multinational network such as the BANKNET or VISANET networks discussed elsewhere, or payment processing networks of other operators. The funding purchase/payment transaction acquirer/processor block 9999 contemplates (i) an acquirer that handles the purchase on the card in the shopper's native country, as well as the top-up of the pre-paid card in the jurisdiction where the e-commerce retailer is located, as well as (ii) a server run by or on behalf of such acquirer, with suitable software. The server and acquirer could be in any jurisdiction(s) and could themselves be in the same or different jurisdictions. In some cases, the functionality of block 9999 could be split between two or more entities.

Due consideration of applicable legal and regulatory considerations and/or contractual obligations should be had, inasmuch as, in some embodiments, the merchant will be accepting a card and shipping to an address that are not technically the consumer's funding card and actual shipping address; furthermore, in some embodiments, there also is not a physical (prepaid or other) card being issued (it is virtual).

In those embodiments where such considerations are pertinent, due consideration should be given to addressing concerns of the shipping merchant acquirer and prepaid card issuer, with respect to their willingness to take on the risk of sending and/or approving a transaction before settlement has occurred. In some embodiments, the shipping merchant will initiate a payment transaction authorization request before settlement has occurred on the funding card purchase, and/or the prepaid card issuer will approve the e-commerce purchase before settlement has occurred on payment transaction.

In some cases, the prepaid card issuer will be able to restrict purchases on the prepaid card to only those occurring through the wallet—for example, will ensure billing and/or shipping address is the shipping merchant's warehouse. In other cases, an additional indicator will be required in the authorization request to indicate that the transaction was generated via the e-wallet. Other cases do not involve a separate prepaid card and in such cases, these considerations are not a concern.

Figure 10:
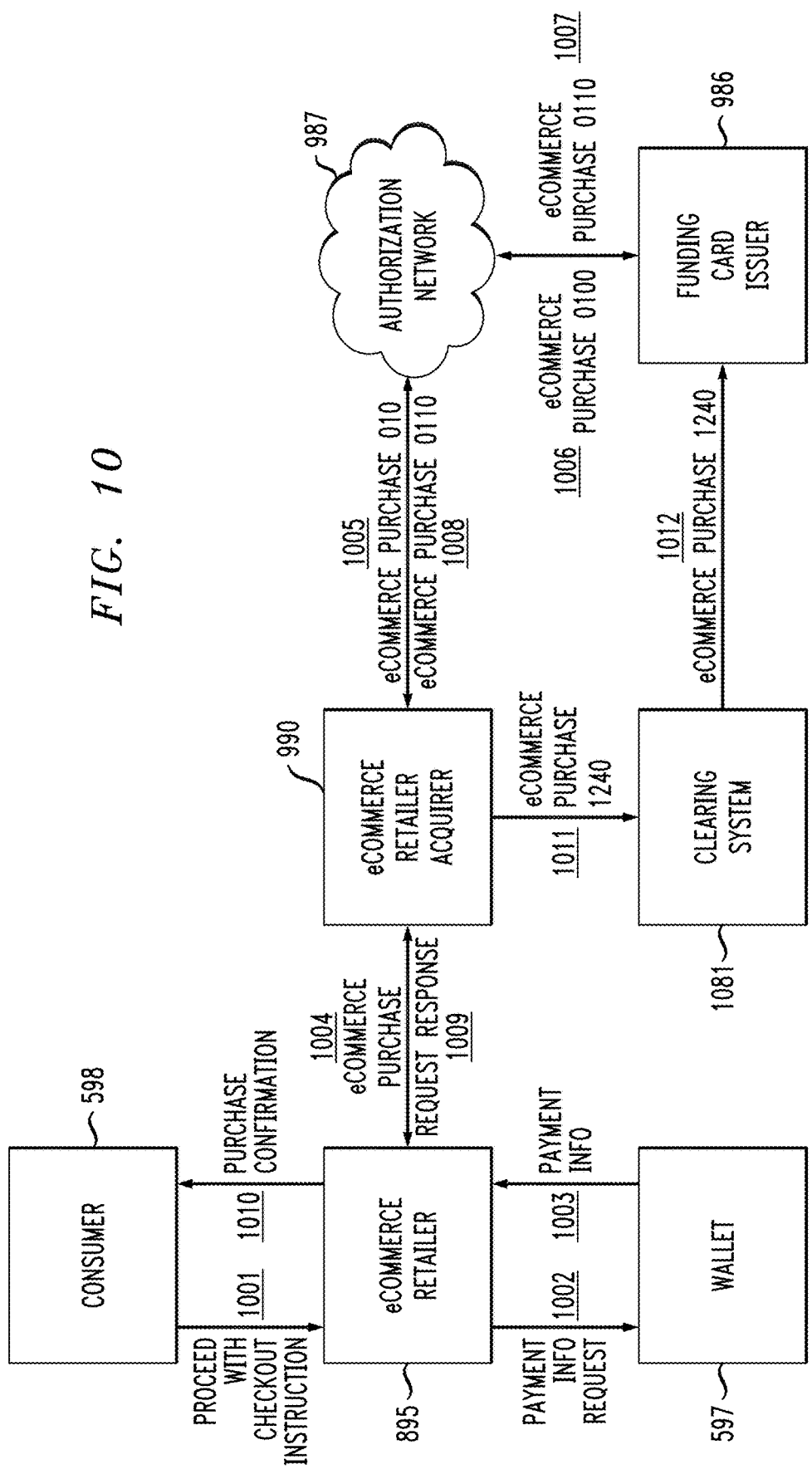
FIG. 10 depicts an exemplary transaction at an international merchant using a local funding card.

FIG. 10 depicts an exemplary transaction at an international merchant using a local funding card, wherein a merchant accepts foreign-issued cards. At 1001, the consumer 598 responds affirmatively to an inquiry on whether to proceed with checkout. At 1002, the e-commerce retailer 895 generates a call to the e-wallet to retrieve payment method and confirm shipping address information. At 1003, the e-wallet 597 provides payment information to the e-commerce retailer 895, including funding card PAN and expiration date. In one or more embodiments, the e-wallet does not store the funding card CVC 2, so if the e-commerce retailer requires it, the consumer will need to populate that field on the e-commerce retailer site. At 1004, the e-commerce retailer generates a request to its acquirer 990 to perform the e-commerce purchase against the funding card. At 1005, the e-commerce retailer acquirer 990 formats and sends a purchase authorization request to the authorization network 987 that is destined for the funding card issuer 986. At 1006, the authorization network 987 forwards the purchase authorization request to the funding card issuer 986. At 1007, the funding card issuer provides an approved response to the authorization request to the authorization network. At 1008, the authorization network forwards the authorization response to the e-commerce retailer acquirer 990. At 1009, the e-commerce retailer acquirer forwards the authorization response to the e-commerce retailer 895. At 1010, the e-commerce retailer provides purchase confirmation to the consumer. At 1011, the e-commerce retailer generates a clearing message (e.g., message type indicator (MTI) 1240) to the clearing system 1081 for the e-commerce purchase. At 1012, the clearing system sends a clearing message to the funding card issuer 986 for the e-commerce purchase. Clearing system block 1081 contemplates a business-as-usual clearing system and can be located, for example, in the USA or another jurisdiction. Again, some embodiments do not involve multijurisdictional aspects and/or a local prepaid funding card.

Some embodiments of the invention pertain to virtual card numbers for digital wallets. The following terminology is employed herein:

Virtual card number—a unique number (in at least some instances, 16 digits) that is linked in the back end to a Real Card Number (RCN). It can be set up with sets of rules, alerts and limits which allows tight and flexible management of payments Real Card Number (RCN)—number (in at least some instances, 16 digits) written on a physical card Digital wallet—host of the financial information (card numbers, addresses, etc.) of users to facilitate transactions with just a few clicks or interactions Card—A credit, debit or prepaid card Consumer—The end user who patronizes physical or online stores Merchant—An online or physical store Remote payments—Payments made using an internet connection using any suitable coming device: desktop, laptop, smart phone, tablet, and the like Proximity payments—Payments made using Near Field Communication Near field communication (NFC)—sets of standards for devices to use radio communication with each other by touching devices together or bringing them into close proximity, usually no more than a few centimeters (used herein for payment purposes)

Credit, debit and prepaid cards include a series of numbers which can be used to identify the issuing bank and the cardholder's bank account. A virtual card number (VCN) is a randomly generated series of numbers which does not contain any identifying information but is linked to a real card number (RCN).

A digital wallet is an electronic form of a physical wallet and houses various payment methods such as credit, debit and/or prepaid cards and/or electronic cash in the form of stored value.

One of the benefits currently being offered by digital wallets is concealing the consumer's RCN from merchants, thereby allowing consumers to make purchases from merchants that they would not be inclined to give their RCNs to. However, the consequence of hiding the consumer's RCN from the merchant is that the merchant does not know which bank's card is being used and any promotions associated with that particular bank's card are forgone.

By incorporating a VCN into a digital wallet, consumers are able to conceal their account information while revealing the bank that issued the card, thereby enjoying both the benefits of being able to purchase from merchants without giving them their RCNs while enjoying all promotions associated with using a particular bank's card.

Existing payment options will now be described. One current technique involves direct payment to the merchant via a credit, debit, or prepaid card. As seen in FIG. 11, the consumer is asked for the card information 8001, shipping address (here, store pickup 8002), and billing address 8003 and the like. Referring to FIG. 12, during the review of the payment, the consumer typically reviews all the information he or she has input in the previous page. The merchant has access to the information from the consumer, including the actual card number—RCN. This option is advantageous in that it does not require any form of registration, the consumer is entitled to any privileges his card accords, the merchant processes transactions through standard processes and receives his or her settlement in his or her bank account, and existing dispute and/or chargeback processes are available. On the other hand, the consumer faces the risk of revealing his or her card number and security code to the merchant, and the process is cumbersome in that it requires the consumer to fill in many fields of information.

Figure 13:
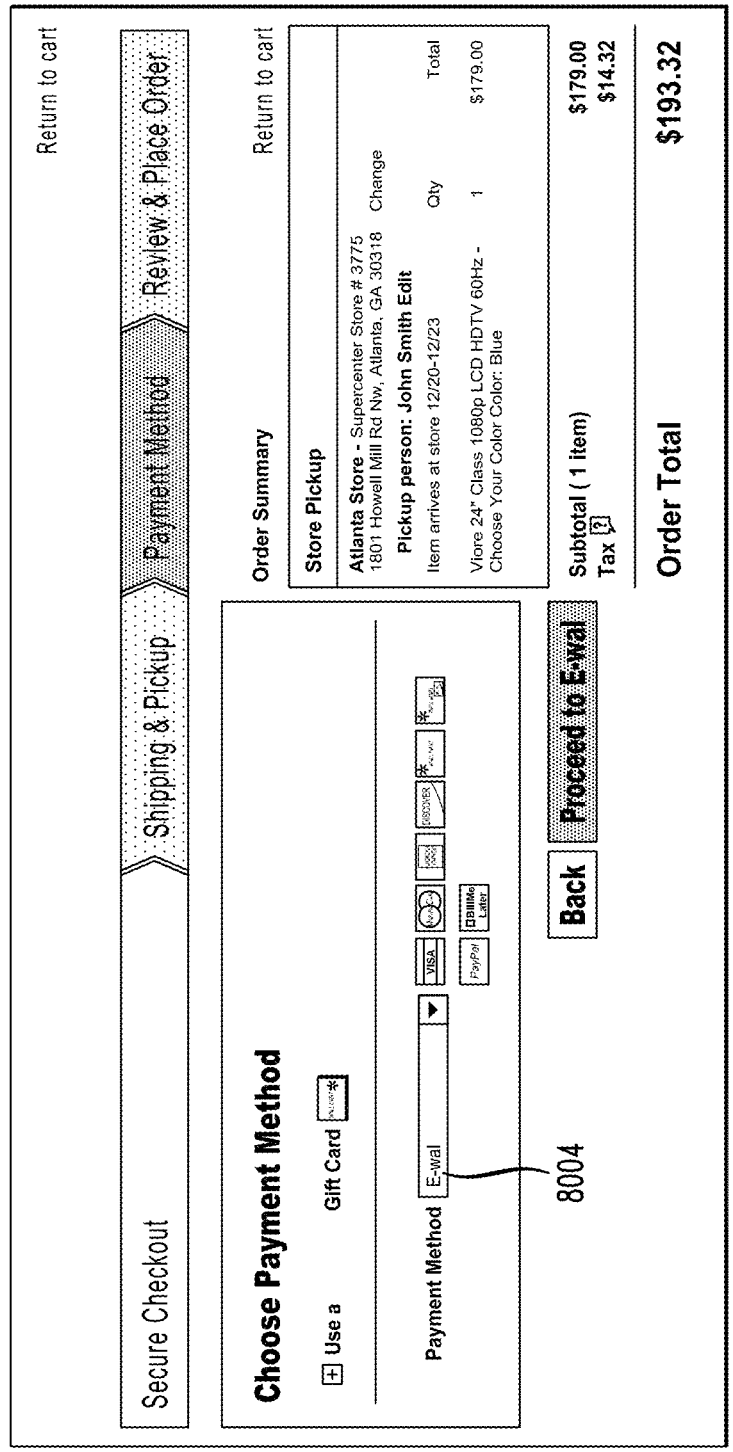
Figure 14:
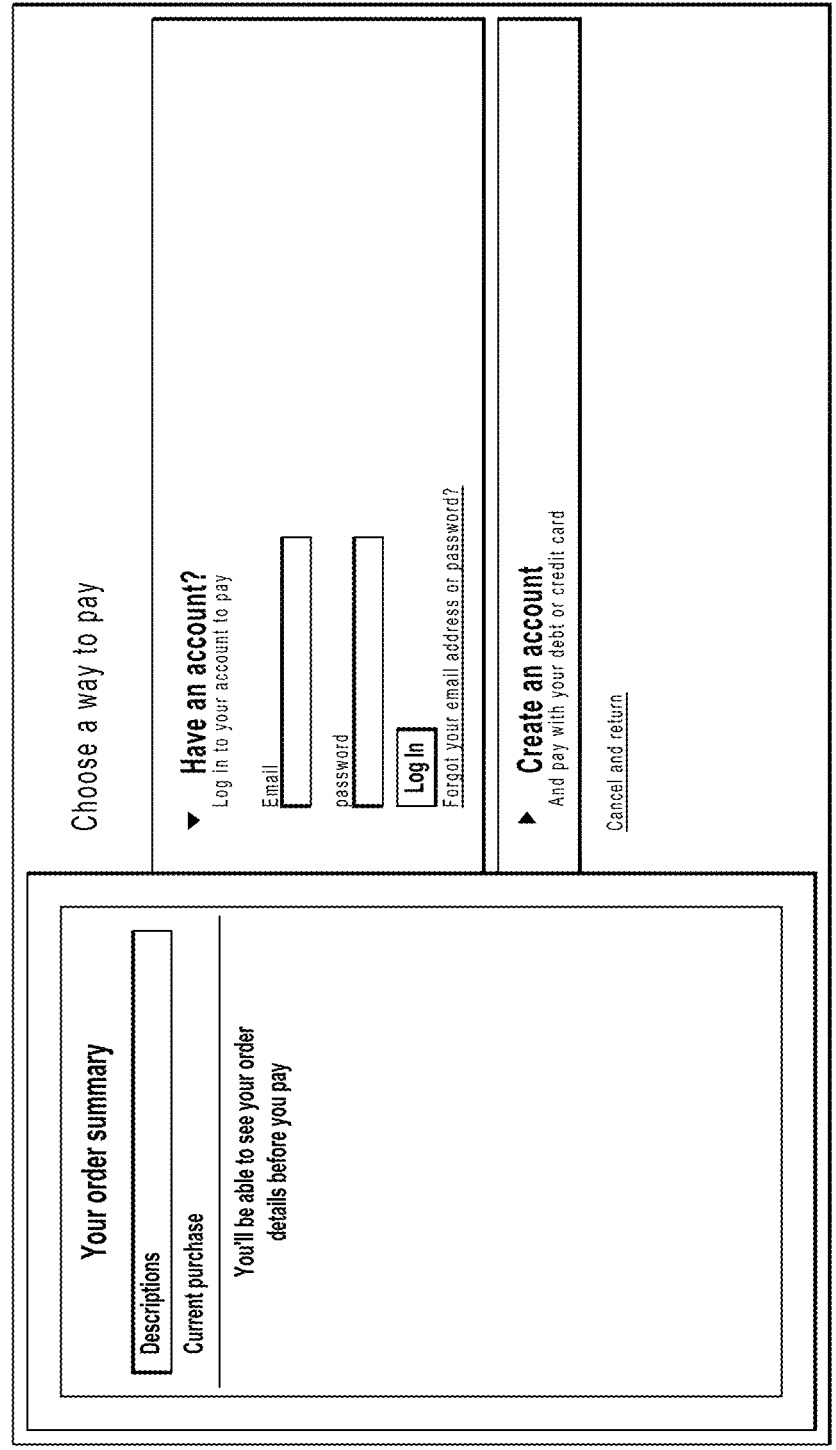

Another current technique involves payment made indirectly to the merchant via a digital wallet. As seen in FIG. 13, consumers are redirected to the wallet website (e.g., by selecting a wallet option "e-wal" 8004). In FIG. 14, the consumer logs in to his or her wallet account using his or her e-mail (or other username) and password, for example. In FIG. 15, the consumer reviews the card to be used for the purchase and clicks on the "continue" button 8005 to confirm payment and to be redirected to the merchant site. In FIG. 16, the consumer reviews his or her information. In this option, none of the RCN information is passed to the merchant. The merchant only receives a payment token. This option is advantageous in that consumers only need to log in instead of filling up fields of information, and in that consumers' card numbers and security codes are hidden from the merchant. On the other hand, consumers forgo any privileges their cards accord, the merchant receives payment in his or her wallet account not his or her bank account, and disputes and chargeback processes are different for merchants.

Figure 17:
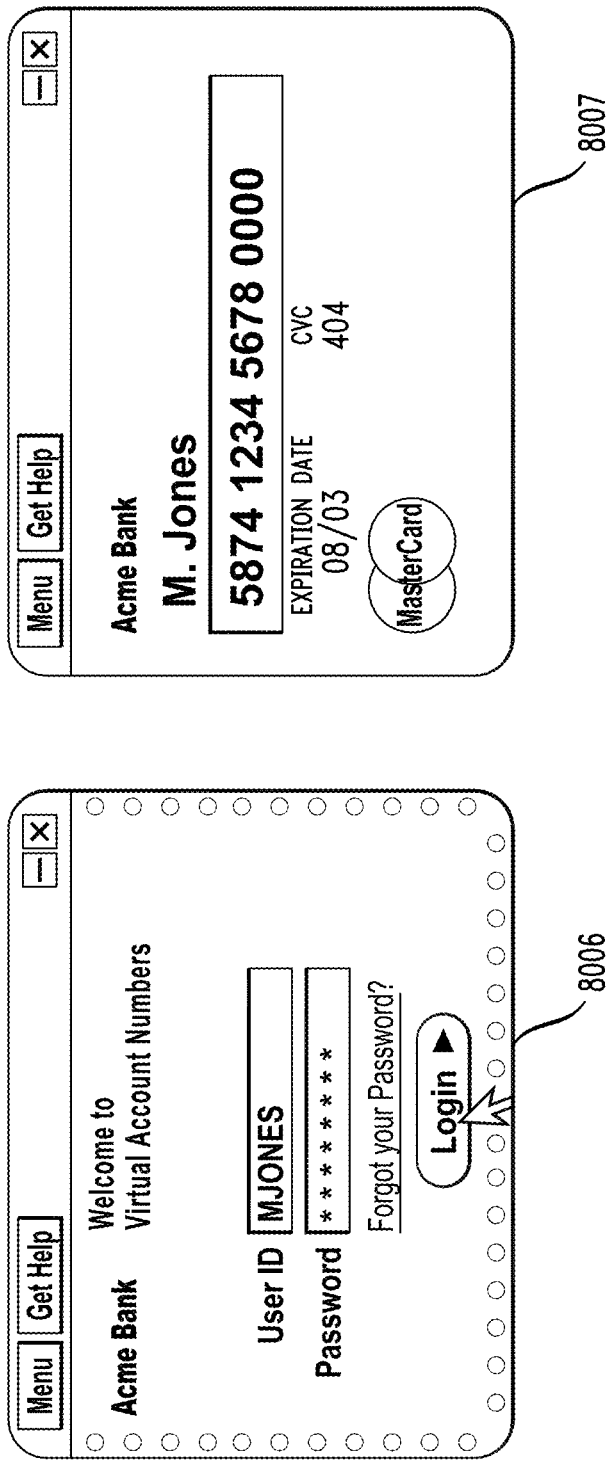

Still another current technique involves direct interaction with the merchant via a Virtual Card Number (also known as a Virtual Account Number). Here, the user logs in at 8006 in FIG. 17 with a user ID and password or the like, and at 8007 is provided with the virtual card number. In FIG. 18, the user will then enter the virtual card information from 8007 into the corresponding fields 8008. Advantageously, the consumer's real card number and security code are hidden from the merchant. On the other hand, there is a relatively unintuitive user experience wherein the consumer needs to leave the current transaction to go to his or her bank's website 8006 to generate a VCN 8007 (typically by swapping between windows or tabs of his or her browser); further, like the first current option, this is a cumbersome process that requires the consumer to fill in many fields of information.

Figure 20:
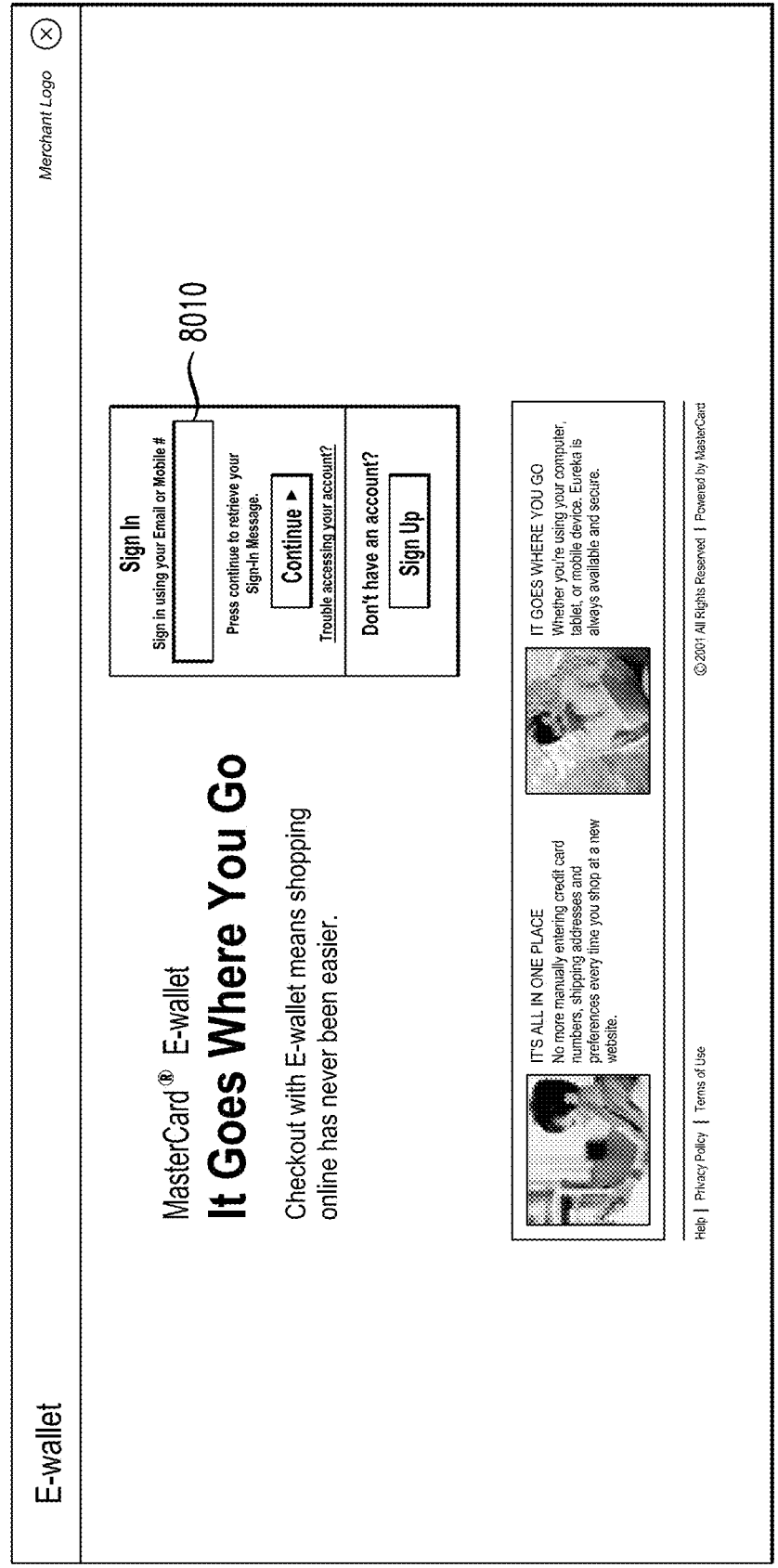
Figure 21:
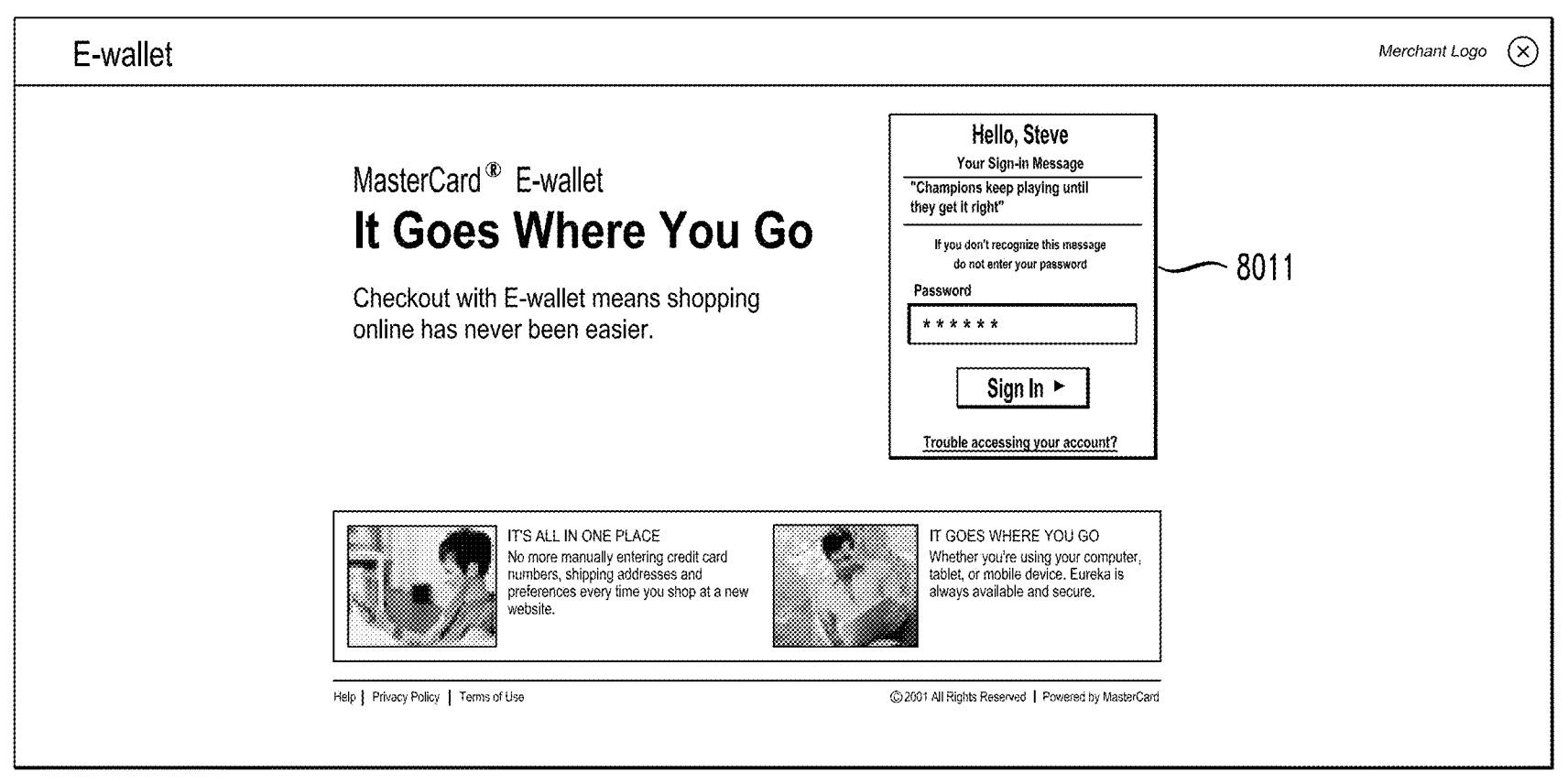
Figure 22:
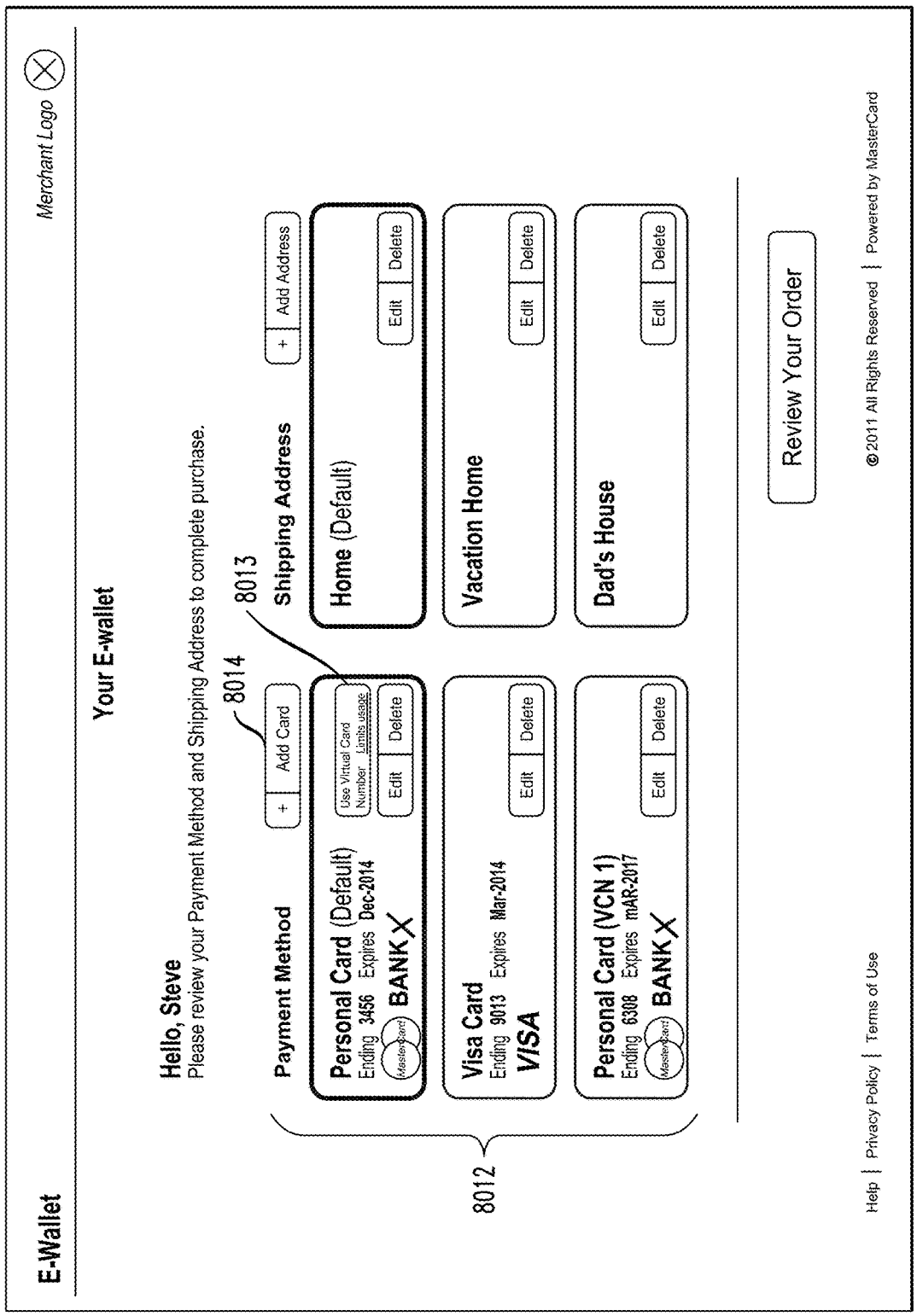

Referring now to FIG. 19, an exemplary sequence of steps in accordance with an embodiment of the invention will now be described, wherein the consumer makes remote payments via a VCN-enabled digital wallet. At 8009, the user selects the VCN-enabled digital wallet "E-wallet" as the payment option. The consumer is thus redirected from the merchant web site to the E-wallet web site. At 8010 in FIG. 20, the consumer signs in using his or her email address or the like, or signs up for an account if he or she does not already have one. At 8011 in FIG. 21, the consumer is greeted by name and a personal message of his or her choosing is displayed. If both the name and the personal message are correct, he or she proceeds with keying in his or her password. In FIG. 22, the consumer can select an RCN or VCN that is already in his or her wallet, as at 8012; create a VCN for a single transaction by clicking on the "Use VCN" button 8013 next to his or her RCN; or add a new a new RCN or VCN to his or her wallet by clicking on the "Add Card" button 8014. Optional functionality can be provided for adding and/or managing VCNs. If the consumer desires to manage the VCN rules, limits and alerts, he or she does so through the interface itself. In the right-hand column, various shipping address options can be provided, e.g., "Home (default)", "Vacation Home," and "Dad's House." FIG. 23 is a non-limiting example of such a management interface. As seen in FIG. 24, once the consumer has chosen the card he or she wishes to use, he or she will click on a "Review Your Order" button to be redirected back to the merchant site to complete his or her transaction; the merchant web site, at 8015, displays the VCN and not the RCN.

Advantageously, in this embodiment, consumers can generate a VCN to be used only for a specific transaction; consumers can create multiple VCNs to be used for different purposes and can specify the expiry date or the number of times that a VCN can be used; and/or consumers can set controls on their VCNs such as asking to be alerted or having the transaction declined if, for example, the transaction amount is beyond a stated limit, the amount spent on the VCN has reached its daily limit, and/or spending for a particular category has reached its limit.

In another aspect of the invention, proximity payments are made via NFC wallets. A virtual card number can be used for proximity payments in addition to remote payments via mobile payment technology. Instead of loading an actual credit card into the wallet, a VCN can be used instead when the consumer is wary of the merchant. Advantages of this aspect are similar to those discussed above for the remote payment aspect.

Figure 25:
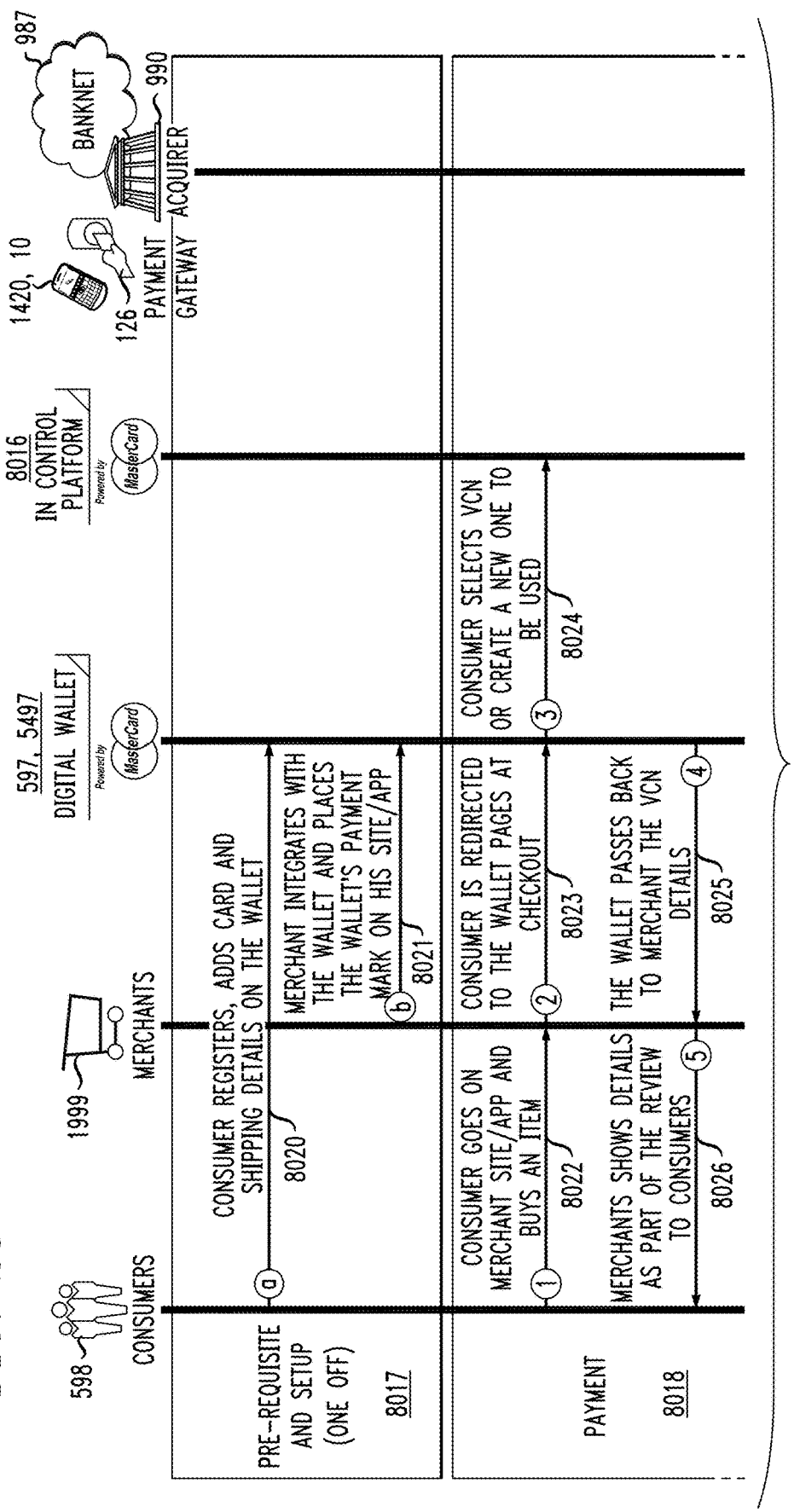
FIG. 25 is a data flow diagram for the process of FIGS. 19-24.
Figure 25:
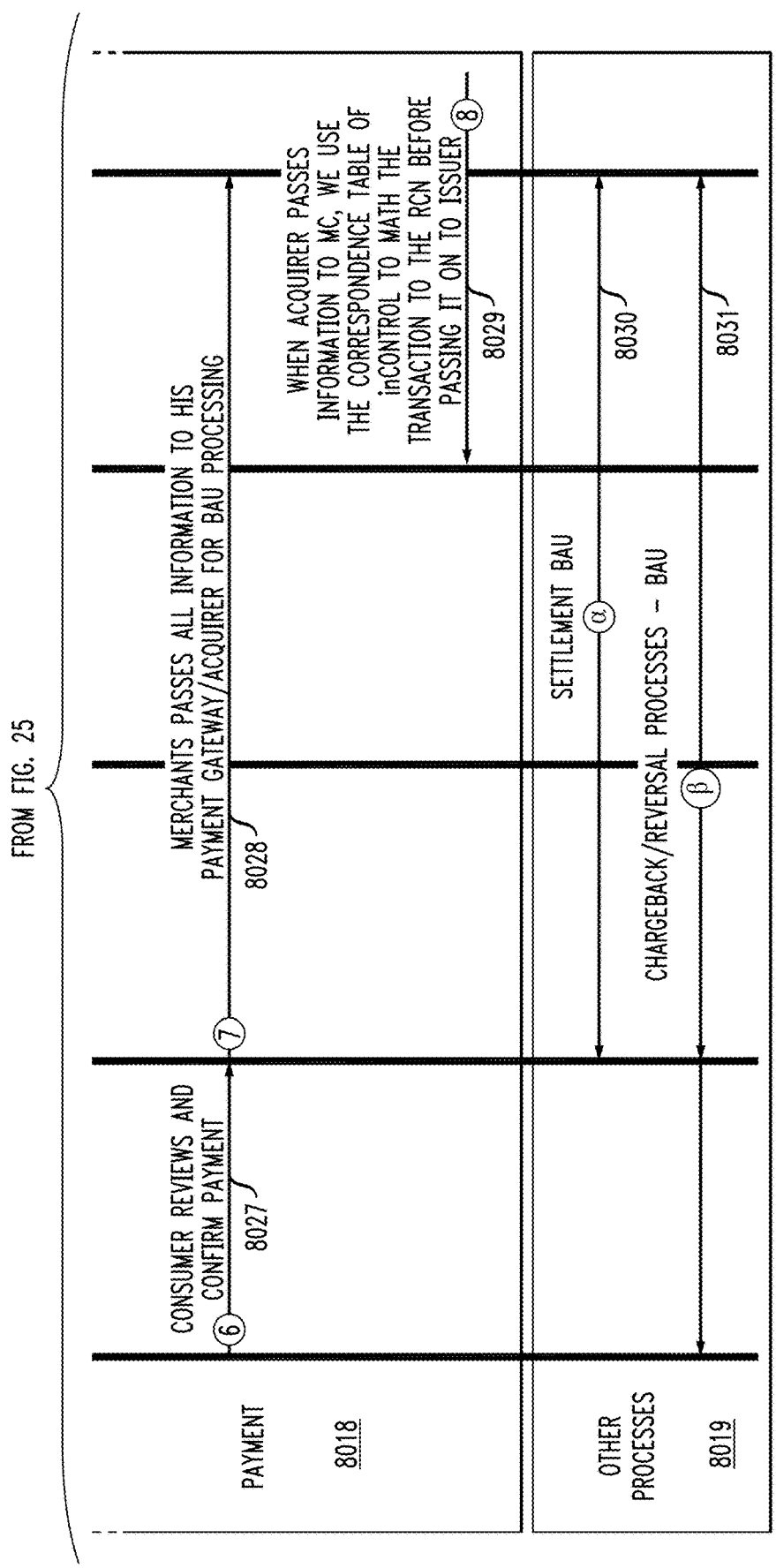

FIG. 25 shows an exemplary transaction flow. During a one-time pre-requisite and set-up process 8017, as seen at 8020, one or more consumers 598 register with digital wallet 597, and add card and shipping details on the wallet. Furthermore, as seen at 8021, merchant 1999 integrates with the wallet 597 and places the wallet's payment mark on the merchant's web site 1999. Note that reference character 1999 is used in FIG. 25 to refer to both the merchant and the merchant's web site. The steps 8020, 8021 can be carried out, for example, using module 1483 or 5483.

In a payment phase 8018, as seen at 8022, consumer 598 accesses the merchant's web site 1999, or accesses some other application of the merchant, and makes a purchase. As seen at 8023, the consumer is redirected to the wallet 597 at checkout. At step 8024, the consumer selects an existing VCN or creates a new VCN to be used. In step 8025, the wallet 597 passes the VCN details back to the merchant 1999. In step 8026, as part of the check-out review process, the details are shown to the consumer 598. In step 8027, the consumer 598 reviews the details and confirms payment. In step 8028, the merchant passes all the information to acquirer 990 which sends it to the issuer (not shown) over network 987. In step 8029, the operator of the network 987 uses MasterCard InControl® PAN (primary account number) mapping functionality 8016 to access a table or the like to map the VCN of the transaction to the corresponding RCN, before passing same to the issuer (registered mark of MasterCard International Incorporated, Purchase, N.Y. USA).

Other processes are shown at 8019. As seen at 8030, 8031, settlement and chargeback and/or reversal processes may be conventional, i.e., business as usual or "BAU."

In some cases, as discussed elsewhere herein, a suitable application 12 resides on a smart phone 1420, 10 or the like and such phone is presented to a terminal 126 or the like at a brick and mortar location. The application 12 includes or has access to one or more locally stored VCNs and/or one or more locally stored offers 5994.

Thus, one or more embodiments of the invention are directed to, and/or advantageously work in conjunction with, an electronic wallet (e-wallet), also known as a digital wallet. As noted, an e-wallet provides consumers with a secure and convenient way to pay for purchases from accepting on-line merchants. Upon registration, consumers may store their card, billing and shipping information on a site hosted by a suitable entity (for example, an operator of a payment network 2008), and may access that information to pay conveniently and securely across participating merchants. The e-wallet platform may deliver additional security with the use of "virtual" account numbers to mask cardholders' real information.

In some cases, the aforementioned use of "virtual" account numbers, also known as PAN mapping, can be, for example, a network service that an operator of a payment network 2008 (e.g., an entity such as MasterCard International Incorporated) provides to issuers; in other instances, issuers may elect to use their own solution. The PAN mapping process involves taking the original Primary Account Number (PAN) and issuing a pseudo-PAN (or virtual card number) in its place. This provides security against the possibility of the original PAN becoming compromised. A non-limiting example of PAN mapping is that offered under the "one time use number" feature of Master-Card International Incorporated's inControl™ payment solutions platform. The skilled artisan will be familiar with a variety of PAN mapping techniques, and, given the teachings herein, will be able to adapt same to one or more embodiments of the invention. For example, the payment network operator may create a translation table wherein external-facing instances of the number present the pseudo-PAN while internal-facing instances present the actual PAN. Commercially available PAN-mapping solutions which may be adapted to embodiments of the invention, given the teachings herein, include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

For the avoidance of doubt, it is to be emphasized that MasterCard International Incorporated's inControl™ payment solutions platform is a non-limiting example, and many different techniques can be used to provide the "virtual number" described elsewhere herein, whether PAN mapping as described in the Flitcroft et al. patents or otherwise.

It should be noted that the person of ordinary skill in the art will be familiar with e-wallets per se, and, given the teachings herein, will be able to adapt same for implementing one or more embodiments of the invention. Non-limiting examples of known e-wallets include the PayPal service (mark of PayPal subsidiary of eBay, Inc., San Jose, Calif., USA); the Checkout by Amazon service (mark of Amazon.com, Inc., Seattle, Wash., USA); and the Google Checkout service (mark of Google, Inc. Mountain View, Calif., USA).

One or more embodiments advantageously employ a virtual card number inside the convenient user experience offered by an e-wallet. As discussed, a virtual card number advantageously offers an incremental level of security and trust from consumers (particularly in cross-border use cases where consumers are not familiar with the merchant that they are buying from); the possibility of implementing alerts, limits (time, amounts and number of transactions, merchant category, etc.); and/or risk management. On the other hand, a virtual card number is inconvenient in that it provides a cumbersome user experience where the consumer needs to swap between his or her virtual card number generator (browser, desktop plug-in, etc.) and his or her payment experience (merchant site).

As also discussed, the wallet offers the advantages that the consumer pays via mouse clicks or the like without even pulling his or her cards from his or her wallet (nor leaving the merchant's website); however, it is inconvenient in that the consumer needs to trust the merchant where the wallet application passes the card number to the merchant for processing; and the wallet may or may not offer a level of risk management that can offer liability shift for merchants.

Advantageously, one or more embodiments integrate a virtual card number and an e-wallet. In one or more embodiments, merchants do not need to change any integration to employ the e-wallet with virtual card number. Furthermore, in one or more embodiments, the difference between the merchant getting paid with a virtual card number or a real card number is transparent to the merchant.

In one or more embodiments, consumers are able to select, during their payment experience, when they want to use a VCN for a specific transaction, using only a few mouse clicks or the like. Pertinent use cases for one or more embodiments include the case where the consumer desires to have better control over alerts and/or limits for a particular card number or when he or she lacks trust in the merchants or country that he or she is buying from.

Figure 26:
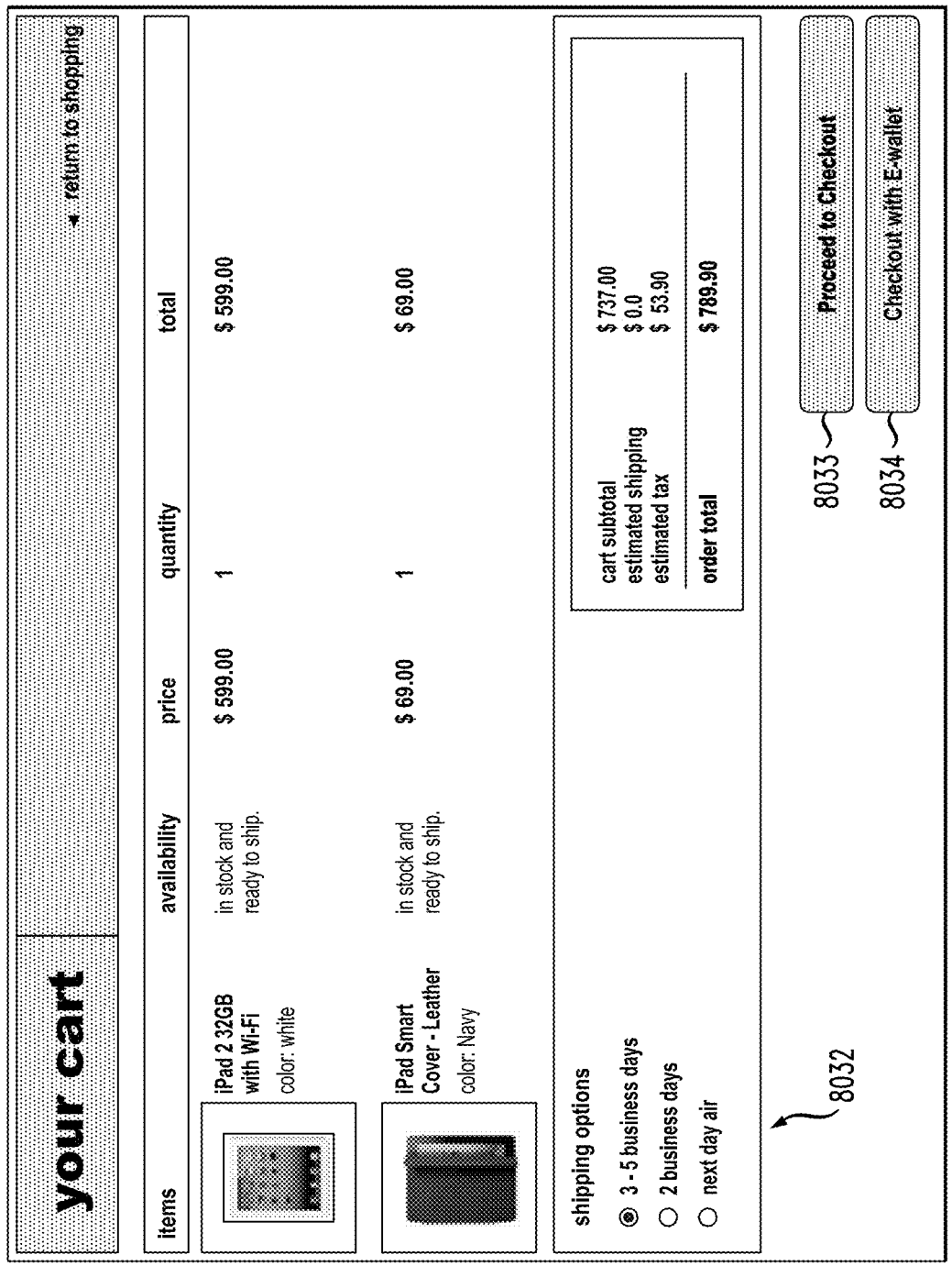
Figure 27:
Figure 28:
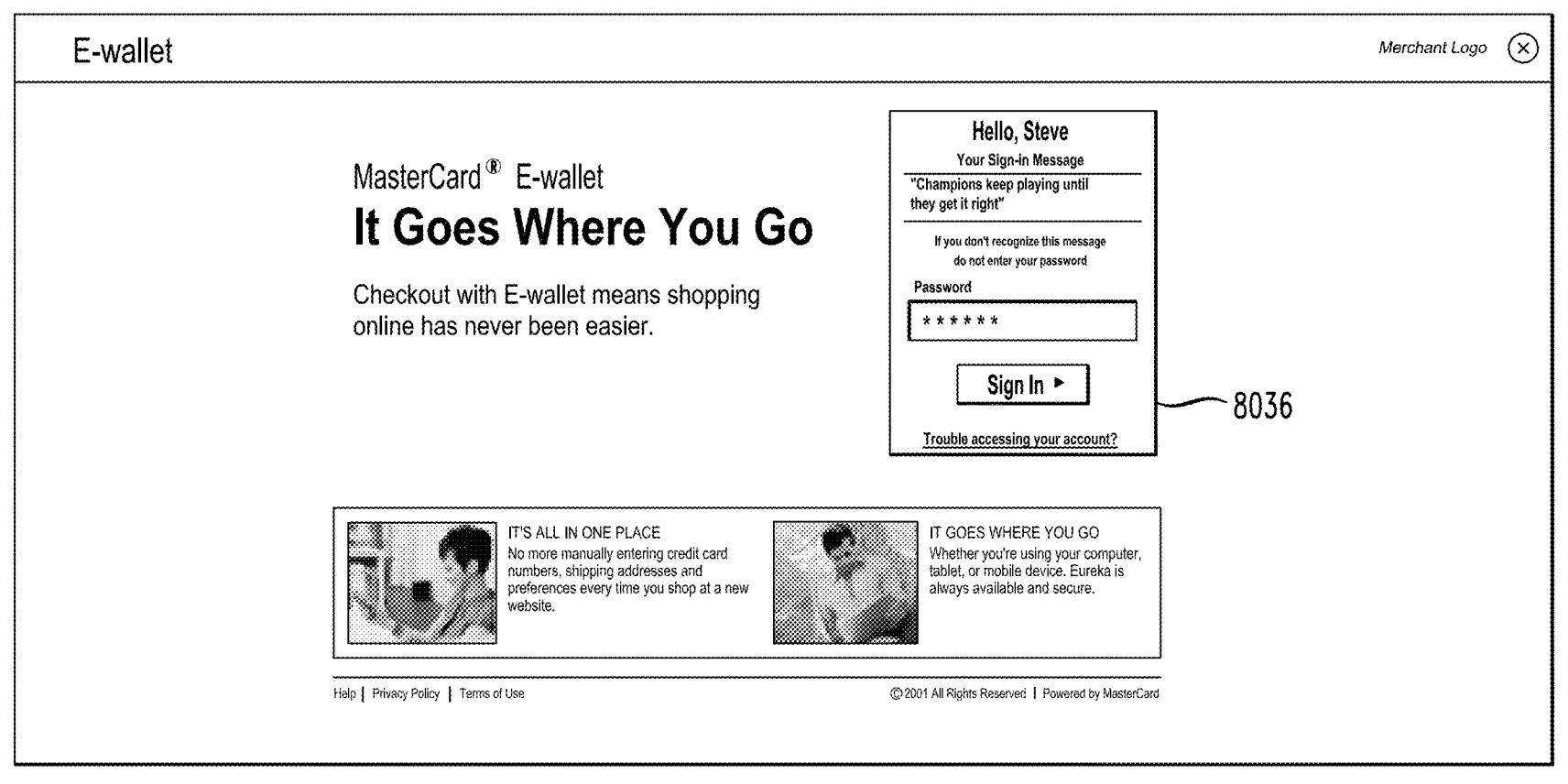
Figure 29:
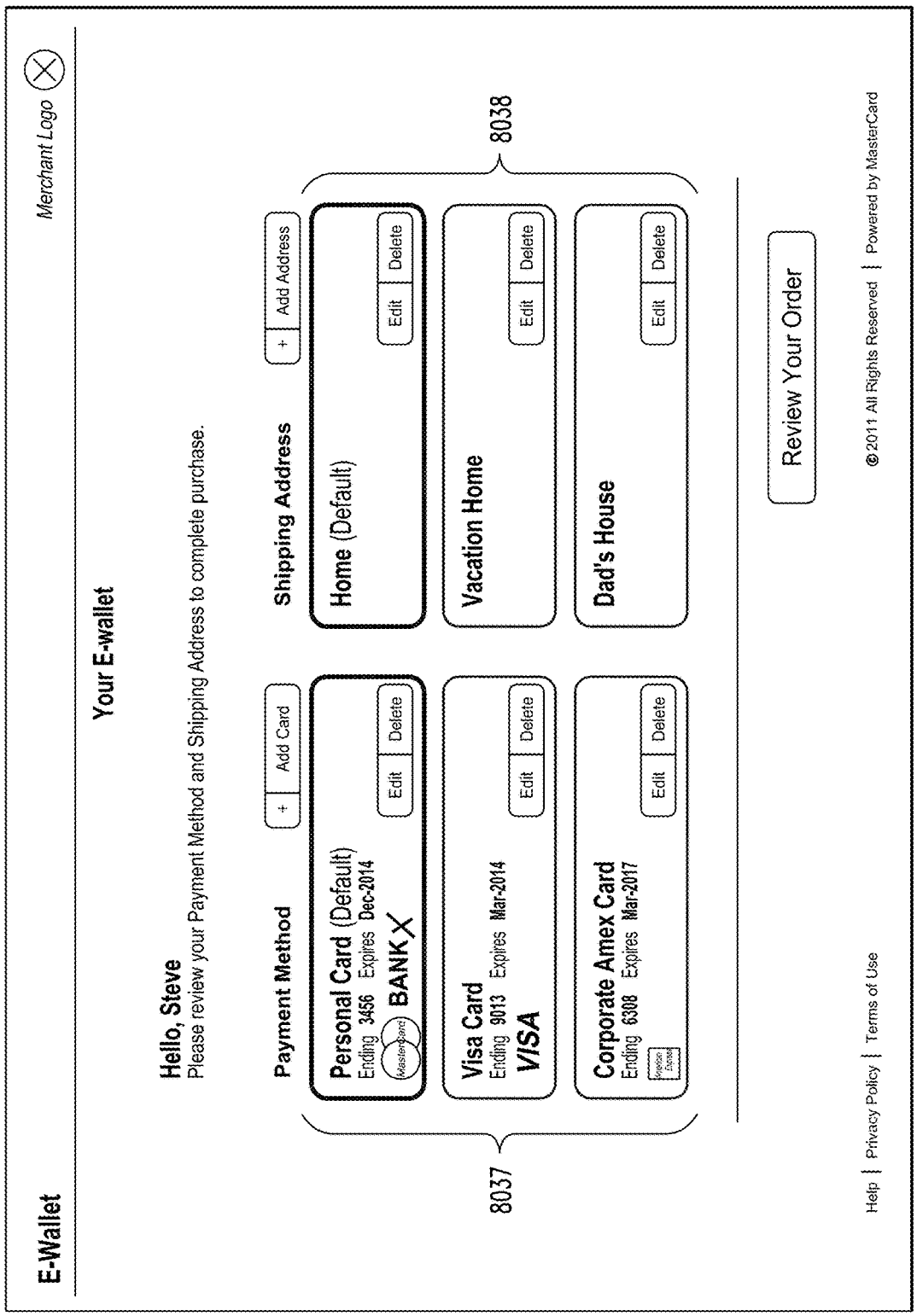
Figure 30:
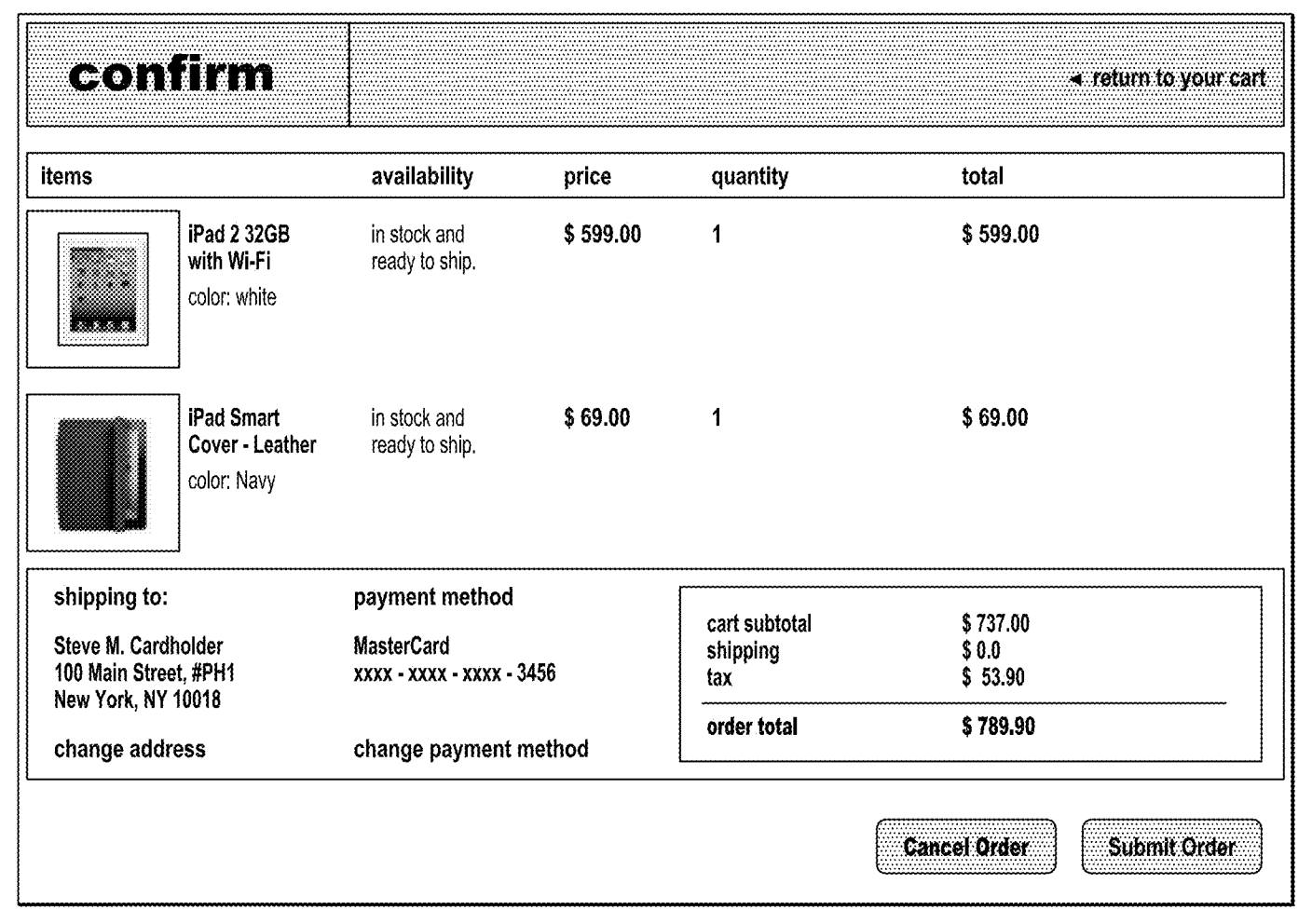

Consider now a current wallet payment experience. As seen in FIG. 26, the user has several items in his or her shopping cart and is afforded an opportunity, at 8032, to select a desired shipping option, as well as an option for a desired payment method, e.g., conventional checkout 8033 or an E-wallet checkout 8034. In FIG. 27, at 8035, the user identifies himself or herself to the wallet using credentials; e.g., e-mail address or mobile phone number. In FIG. 28, at 8036, the user enters his or her password. In FIG. 29, the user selects from among several different payment cards, at 8037, and from among several different shipping addresses, at 8038. In the right-hand column, various shipping address options can be provided, e.g., "Home (default)", "Vacation Home," and "Dad's House." In FIG. 30, the user returns to the merchant site and confirms the details. In FIG. 31, a payment complete page is displayed to the user.

Payment Experience with VCN Imbedded in the Wallet

Figure 32:
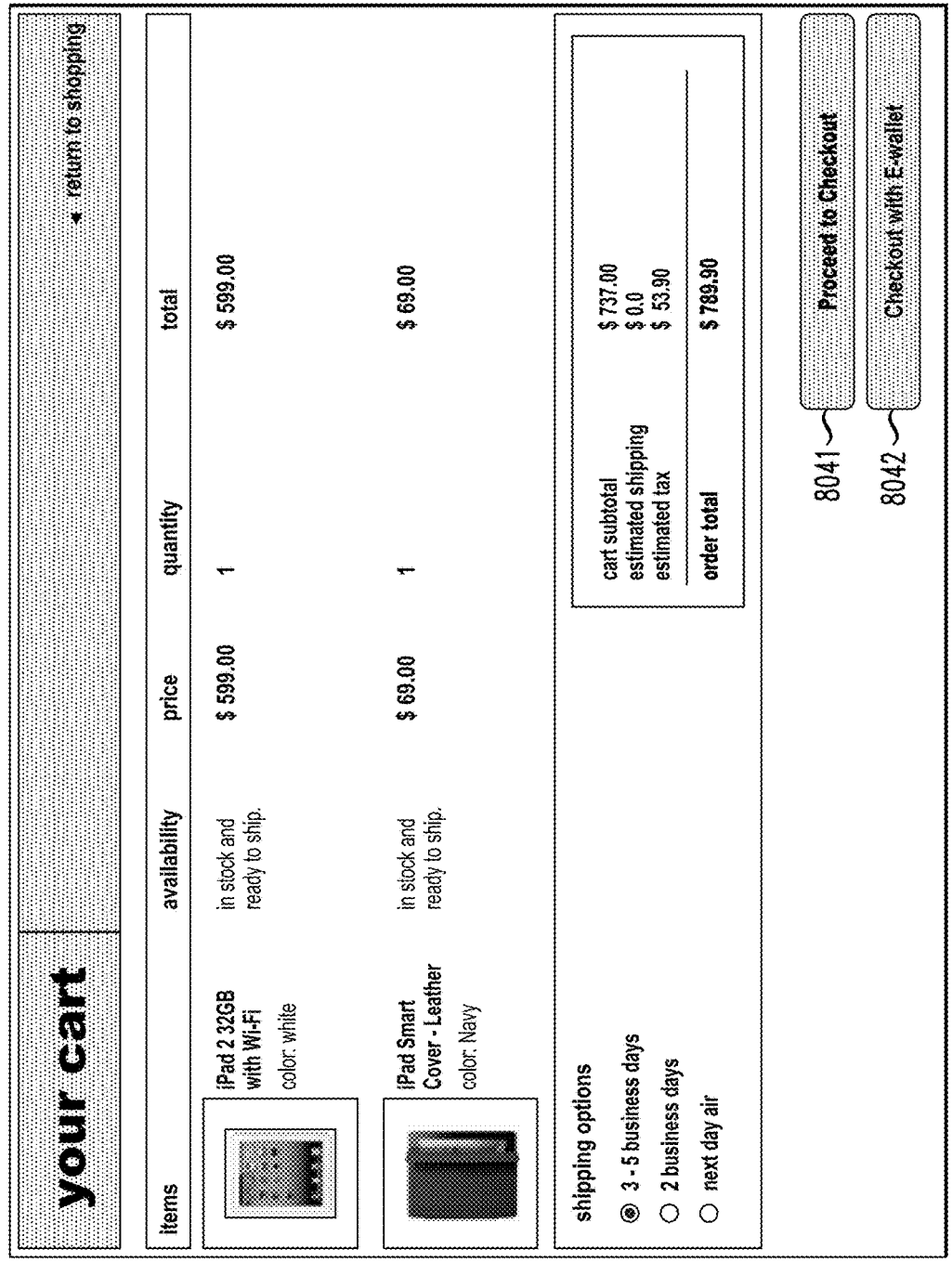
Figure 33:
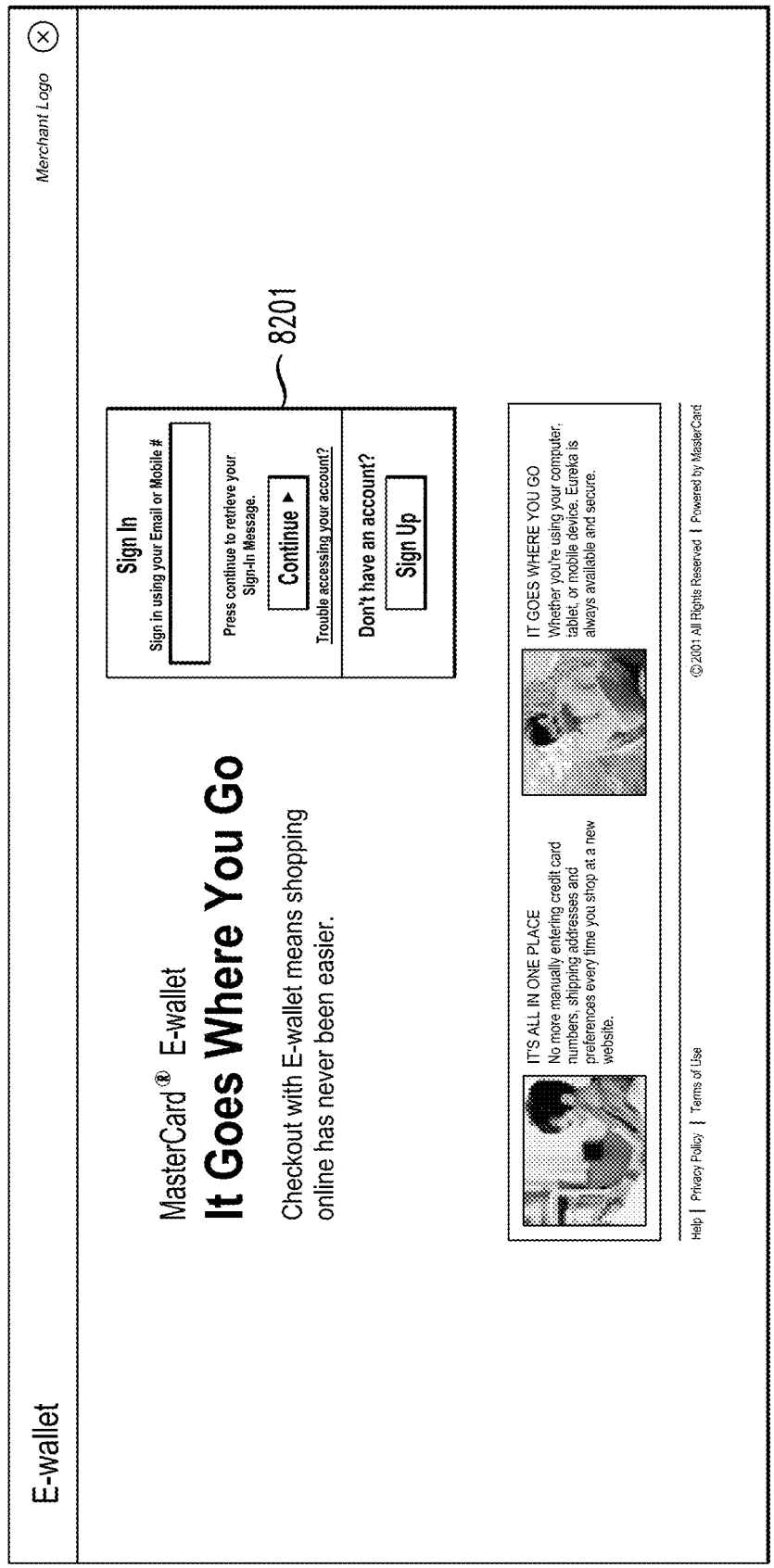
Figure 34:
Figure 35:
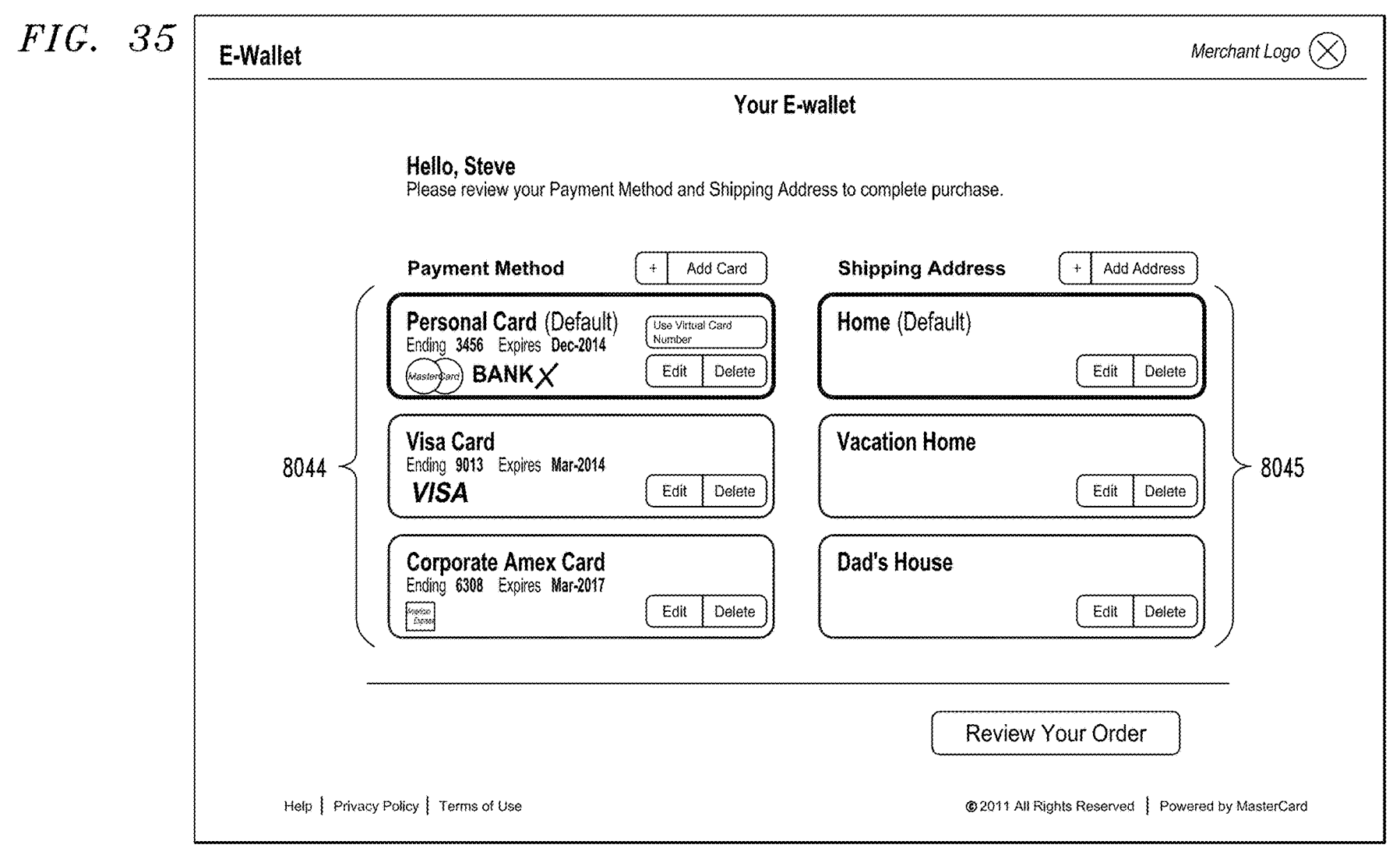
Figure 36:
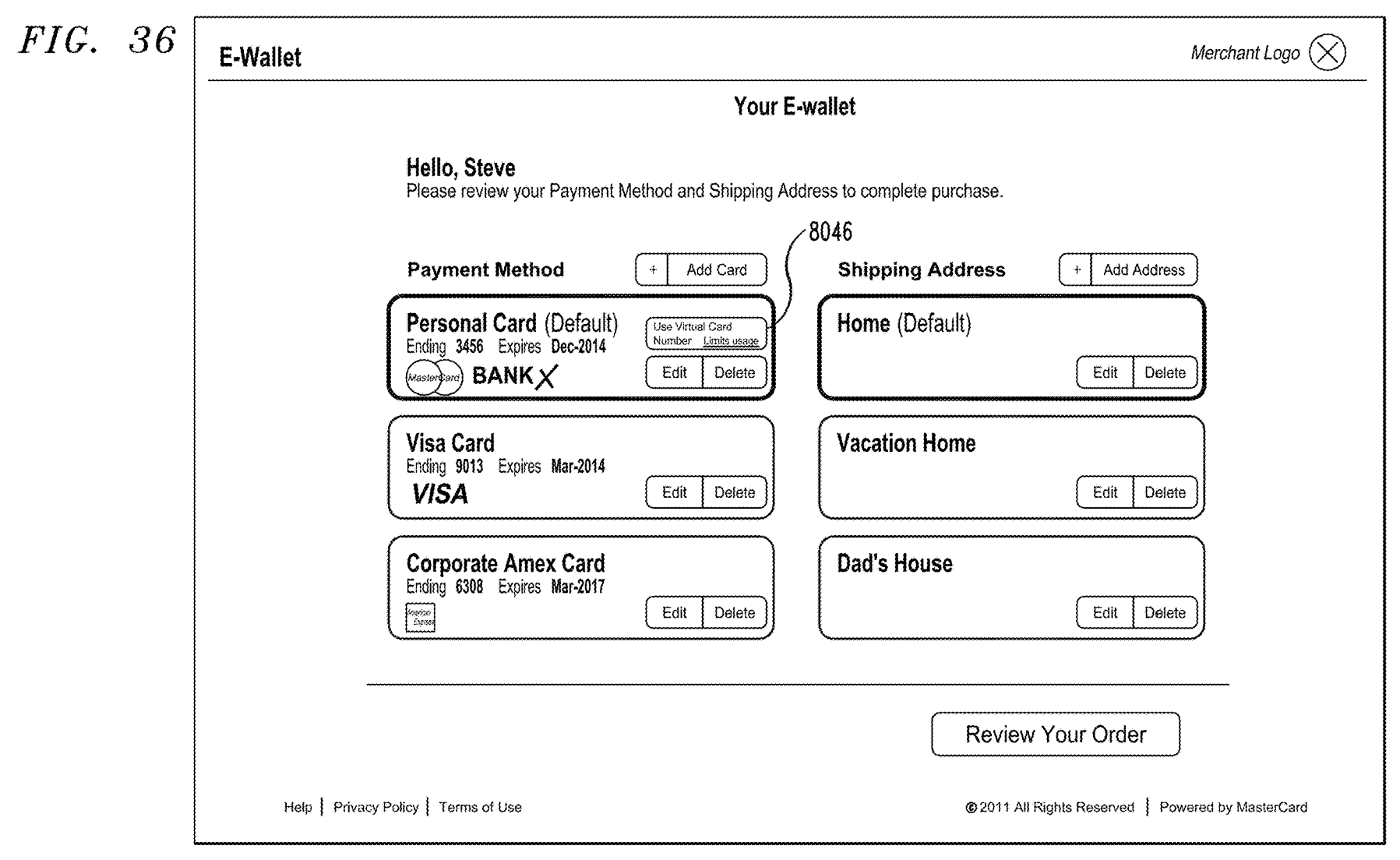

With attention now to FIG. 32, in a first step, the user is at a shopping cart screen designated generally as 8039, has the option, shown at 8040, to select from several different shipping options, and is also afforded payment method selection options 8041 (conventional) and 8042 (E-wallet). In FIG. 33, at 8201, the user identifies himself or herself to the wallet using credentials; e.g., e-mail address or mobile phone number. In FIG. 34, at 8043, the user enters his or her password. In FIG. 35, the user selects from among several different payment cards, at 8044, and from among several different shipping addresses, at 8045. In FIG. 36, the user chooses to use a VCN for the given transaction, as seen at 8046. In FIG. 37, the user optionally chooses to change limit and/or alert parameters for the VCN, using the MASTERCARD INCONTROL® platform or the like (registered mark of MasterCard International Incorporated, Purchase, N.Y., USA; functionality allows customers to establish customized spend management controls). As seen at 8047, the user may set a dollar limit for a single transaction or for spending in a certain period of time, and may choose to decline transactions that are over the limit or to receive an alert regarding same. As seen at 8048, the user may set a dollar limit for spending in a certain category in a certain period of time, and may choose to decline transactions that are over the limit or to receive an alert regarding same. As seen in FIG. 38, the user returns to the merchant site and confirms the details. In FIG. 39, a payment complete page is displayed to the user. Note that in general, some embodiments involve leaving the merchant web site and returning thereto, while others involve a seamless experience wherein a wallet or the like is closely integrated with the merchant web site via an API or the like.

Cross Border Shipping for Digital Wallets

In another aspect, one or more embodiments pertain to cross-border shipping for digital wallets.

Many foreign consumers now have a strong desire to shop overseas in the US and the UK. The US and UK are perceived as providing more options, better pricing, and a more pleasant experience in shopping. Many consumers go to the US on shopping sprees from all over the world.

In addition, broadband capability has been increasing around the world, often growing 150% on a yearly basis. There is also a stronger middle class in rapidly developing nations such as Brazil, India, China, and Russia. Consumers from these jurisdictions are finding their way to merchant web sites in the US and UK. 19% of all the browsing done on US e-merchants today is from consumers in other countries. However, US merchants for the most part do not accept foreign cards due to liability concerns. About 40% do accept foreign cards online; however, they accept foreign cards from only a handful of countries; say, 10-30 countries. Even when they do accept foreign cards, they typically do not ship overseas. Thus, there are barriers to both acceptance and fulfillment for foreigners wishing to purchase from US e-merchants.

Even for a US merchant that does ship all over the world, overseas shoppers have transparency issues as they may not be advised what taxes, customs duties, and the like will be due when the order arrives in their particular country; in some instances, they may not even be aware of the shipping charges.

As used in this discussion, the "domestic address" is the consumer's address in his or her country of residence; the "overseas address" is the consumer's address in the country of the merchant; "domestic shipping" is shipping from the merchant's warehouse to the consumer's overseas address; and "overseas shipping" is shipping from the consumer's overseas address to the domestic address.

Lower prices and the availability of the product are driving consumers to go online to purchase products from overseas. However, a commonly encountered problem is that merchants do not provide international shipping, typically offering only domestic shipping.

Currently, service providers (also referred to as logistics providers, logistics partners, or shipping merchants) such as Borderlinx offer a solution to this problem by providing consumers with an overseas address that the merchant can ship the consumer's purchased good to. Goods shipped to the overseas address can be stored free of charge for 30 days in order to accumulate goods and ship one large package instead of many smaller packages. Goods can also be combined with those of family and friends to create a larger package. Once the consumer requests the package to be shipped from his or her overseas address to his or her domestic address, the fully landed costs (including taxes and duties) are calculated and the consumer is able to make full and final payment for the cross border shipping service.

However, there are several limitations to this service as follows:

Consumers will not know the cost of overseas shipping at the time of purchasing their goods as this service is provided by a third party and not the merchant.

Consumers have to wait several days to finalize their transactions as they have to wait for their goods to arrive at their overseas address before they can arrange shipping to their domestic address.

Consumers have to go to two different websites on two separate days to complete their transactions as they have to deal with two parties—the merchant and the service provider.

Advantageously, one or more embodiments improve the consumer experience by integrating the merchant with the service provider. In at least some instances, using information from the merchant regarding the weight of the goods and the size of the packaging together with the service provider's shipping charges, an exemplary embodiment of an e-wallet provides consumers with the cost of shipping at the time of purchase. Consumers are therefore able to arrange overseas shipment without having to wait for their goods to be delivered to their domestic addresses; furthermore, they only need to transact with one entity, namely, the e-wallet.

Furthermore, in one or more embodiments, an e-wallet in accordance with aspects of the invention allows consumers to compare prices across service providers in order to ship their goods at the lowest cost.

Even further, in one or more embodiments, an e-wallet is provided by an entity such as an operator of payment network 2008; such entity in turn preserves the value added features of an international shipping service provider such as bundling goods or repacking in order to lower shipping cost.

Referring now to FIG. 40, in a current approach to shipping options, using an international shipping service provider, consumers register on the service provider's website and are given an address 8049 in the country of the merchant. As seen in FIG. 41, the user enters his or her billing address. As seen in FIG. 42, when the user selects a shipping option, he or she uses his or her domestic address as his or her billing address, and the overseas address that he or she was given as his or her shipping address, as at 8050.

Figure 43:
Figure 46:
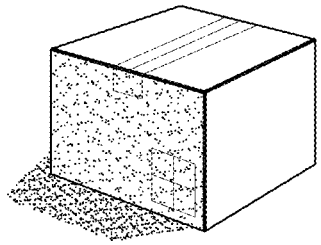

In FIG. 43, the consumer selects the domestic shipping method. Here, the consumer chooses "standard ground." In FIG. 44, the consumer selects a payment method—here, the "E-Wal" electronic wallet is chosen. In FIG. 45, the consumer reviews his or her order and confirms his or her purchase via "submit order" button 8051. Then, in FIG. 46, once the package arrives at the overseas address, the consumer selects his or her overseas shipping method and makes payment for the overseas shipping. Here, the user has chosen 2-day shipping.

The current approach just discussed has the advantage that consumers follow the same purchasing process that they are familiar with, can consolidate packages and ship one large package instead of many small packages, and can repack their packages to reduce shipping charges. On the other hand, in this current approach, consumers do not know the cost of overseas shipping at the time of purchase, consumers have to wait till the package arrives at their overseas address to arrange overseas shipping, and consumers have to transact with the merchant and the international shipping service provider independently.

Figure 48:
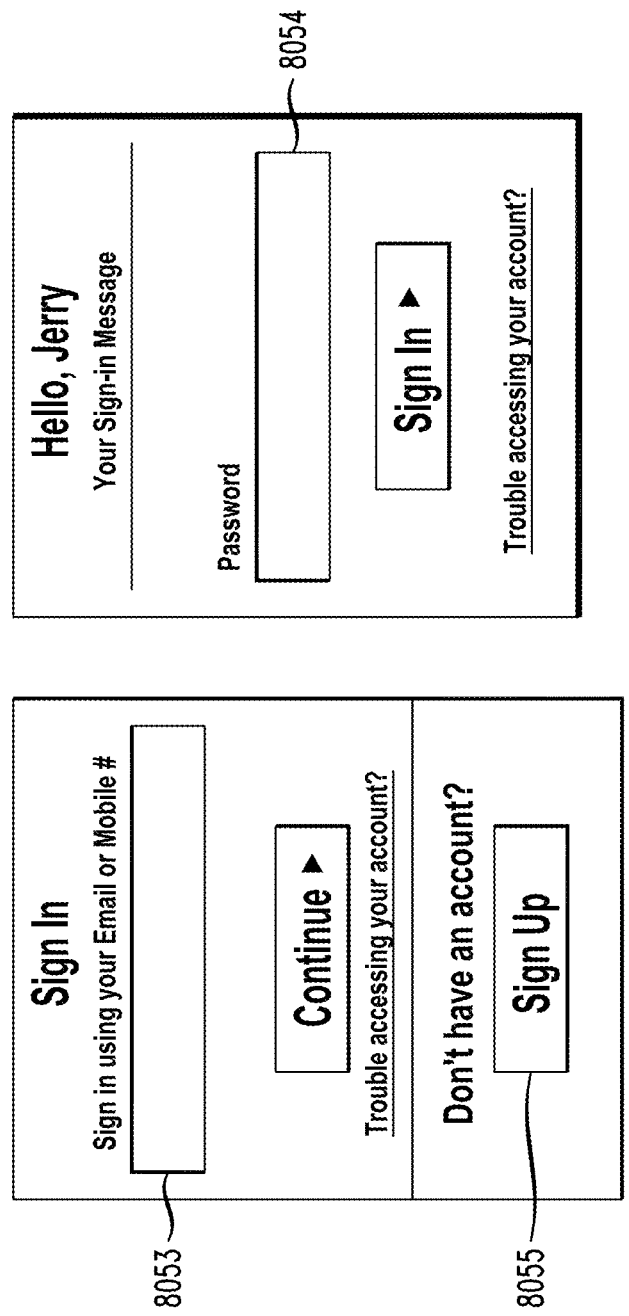
Figure 49:
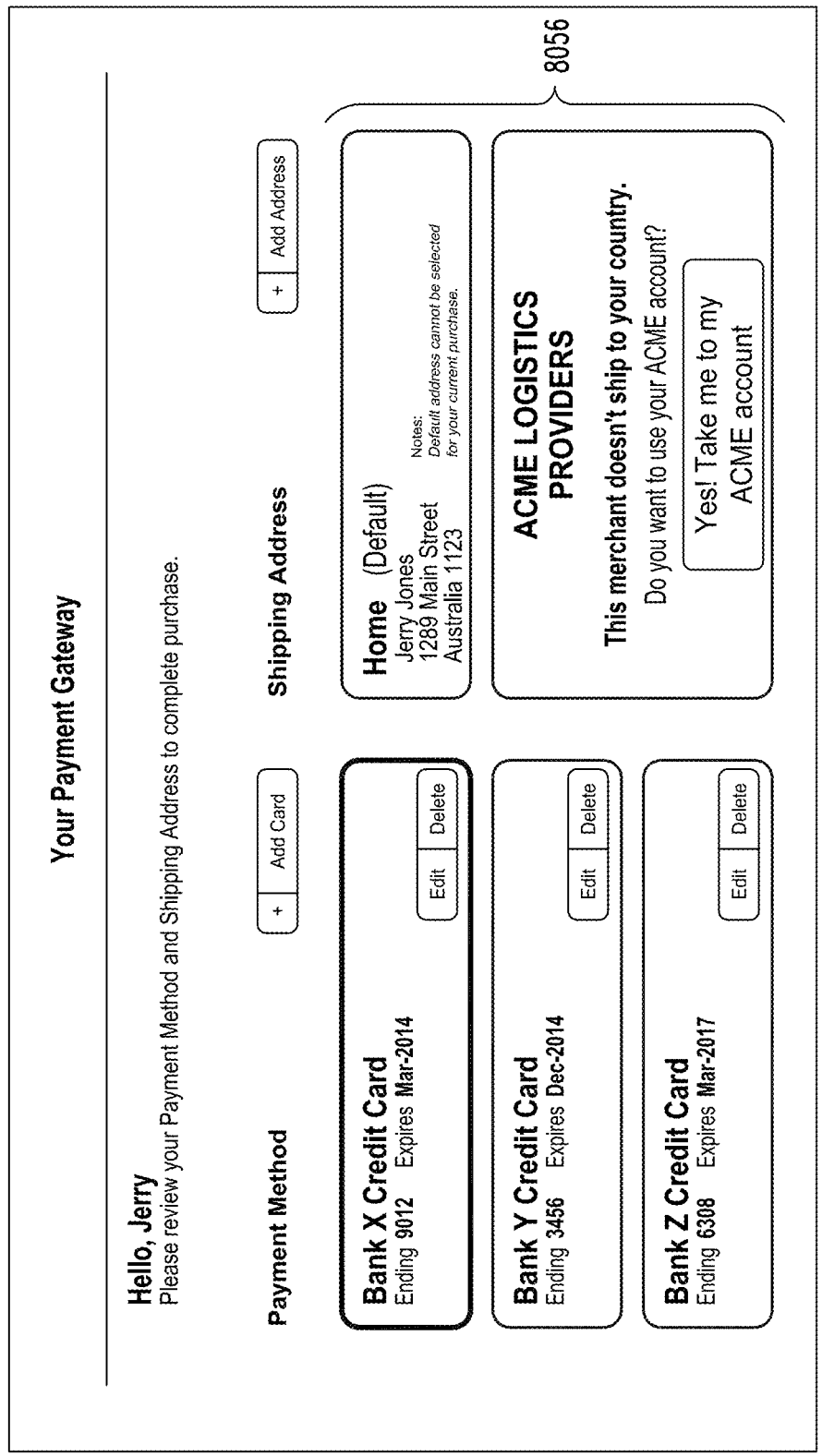
Figure 50:
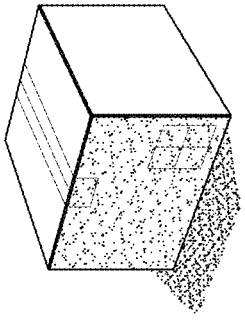

Consider now an exemplary approach in accordance with an aspect of the invention. Referring to FIG. 47, using an e-wallet in accordance with an aspect of the invention, the consumer selects the "E-wallet" as his or her payment method, as seen at 8052. In FIG. 48, the consumer is re-directed to the "E-wallet" web site where he or she uses his or her credentials to log in (e.g., sign on at 8053 using e-mail or mobile phone number as an ID and then enter password at 8054). If not already registered, at 8055 the consumer is afforded an option to sign up. In FIG. 49, the E-wallet determines whether the merchant will ship to the user's domestic address. If not, as seen at 8056, the e-wallet provides the option to the consumer to use an international shipping service offered by "Acme Logistics Providers." In FIG. 50, the E-wallet determines the cost of cross border shipping and presents several options 8057 for the consumer to choose from. The first option is shipping speed. The second option is the shipping charges by various international shipping providers and the merchant themselves if applicable. The user can confirm his or her selection at 8058. Optionally, if consumers wish to consolidate their goods, they also have the option, as at 8059, to ship domestically to their overseas addresses (e.g., warehouse). In FIG. 51, the consumer reviews the shipping charges before proceeding to reviewing his or her order (button 8060) and making payment. Local shipping charges apply for domestic shipping while both local shipping and overseas shipping charges apply for overseas shipping. In one or more embodiments, the domestic shipping charge is based on the consumer's selection at the merchant's website.

Advantageously, in this approach, consumers do not need to go through the inconvenience of filling in their billing addresses, shipping addresses or credit card information as their digital wallets already have this information. Furthermore, consumers know how much the total shipping charges will be before deciding if they wish to proceed with a purchase. As more international shipping services are added to the E-wallet, consumers are able to compare shipping prices across various service providers. Consumers have the flexibility of concluding the transaction immediately or consolidating packages at their overseas addresses.

FIG. 52 compares current techniques 8071 with a sequence of steps 8072 in accordance with an embodiment of the invention. In step 8073, the consumer visits the merchant's web site. In step 8074, the user adds goods to his or her cart. In step 8075, the user navigates to his or her shopping cart to check out. These steps are common to both approaches 8071, 8072. In the current technique, at 8076, the user inputs his or her billing and shipping addresses. At 8077, he or she selects the domestic shipping method. In step 8078, he or she selects the payment option. In step 8079, he or she reviews and confirms his or her order. In step 8080, the consumer must typically wait a certain number of days ("X") for the goods to be delivered to the overseas address. In step 8081, the consumer receives a delivery notification from the logistics provider (e.g., ACME). In step 8082, he or she logs in to the logistics provider's web site. In step 8083, the consumer decides whether to ship now or to bundle with other goods. In step 8084, the consumer confirms and makes payment.

In a sequence of steps 8072 in accordance with an embodiment of the invention, at step 8085, the user selects the domestic shipping method. In step 8086, he or she selects the E-wallet as his or her payment option. In step 8087, the user logs in to the E-wallet. In step 8088, the user selects the credit card to be used for payment and the shipping address. In step 8089, the user selects the shipping cost and pace (i.e., whether to ship now or to bundle). In step 8090, the consumer reviews and confirms the order.

In FIG. 52, it will be appreciated that steps 8073-8079, 8085, and 8086 pertain to the merchant's web site; steps 8087-8090 pertain to the E-wallet; and steps 8081-8084 pertain to the logistics provider.

Figure 53:
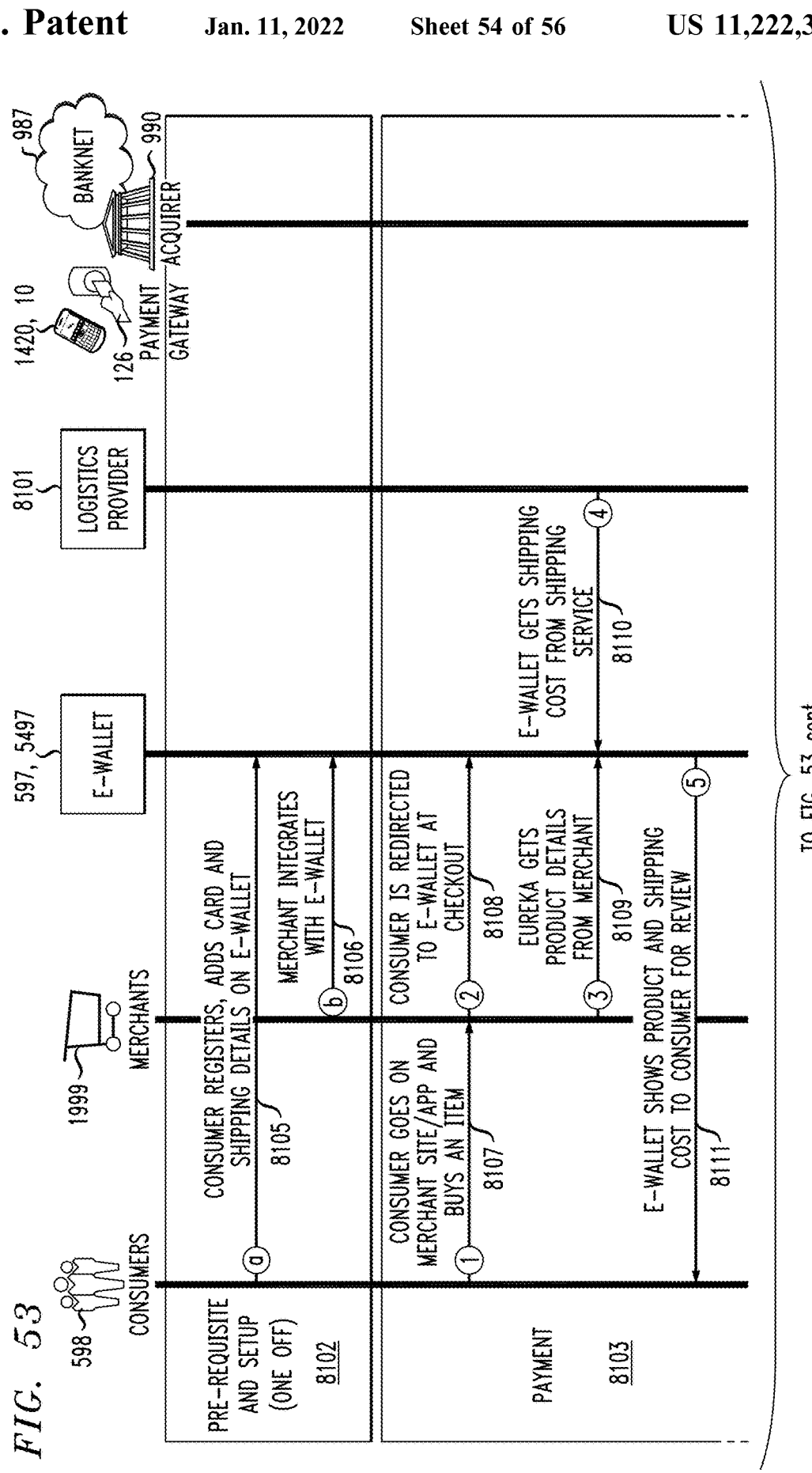
FIG. 53 is a data flow diagram for the process of FIGS. 47-51.
Figure 53:
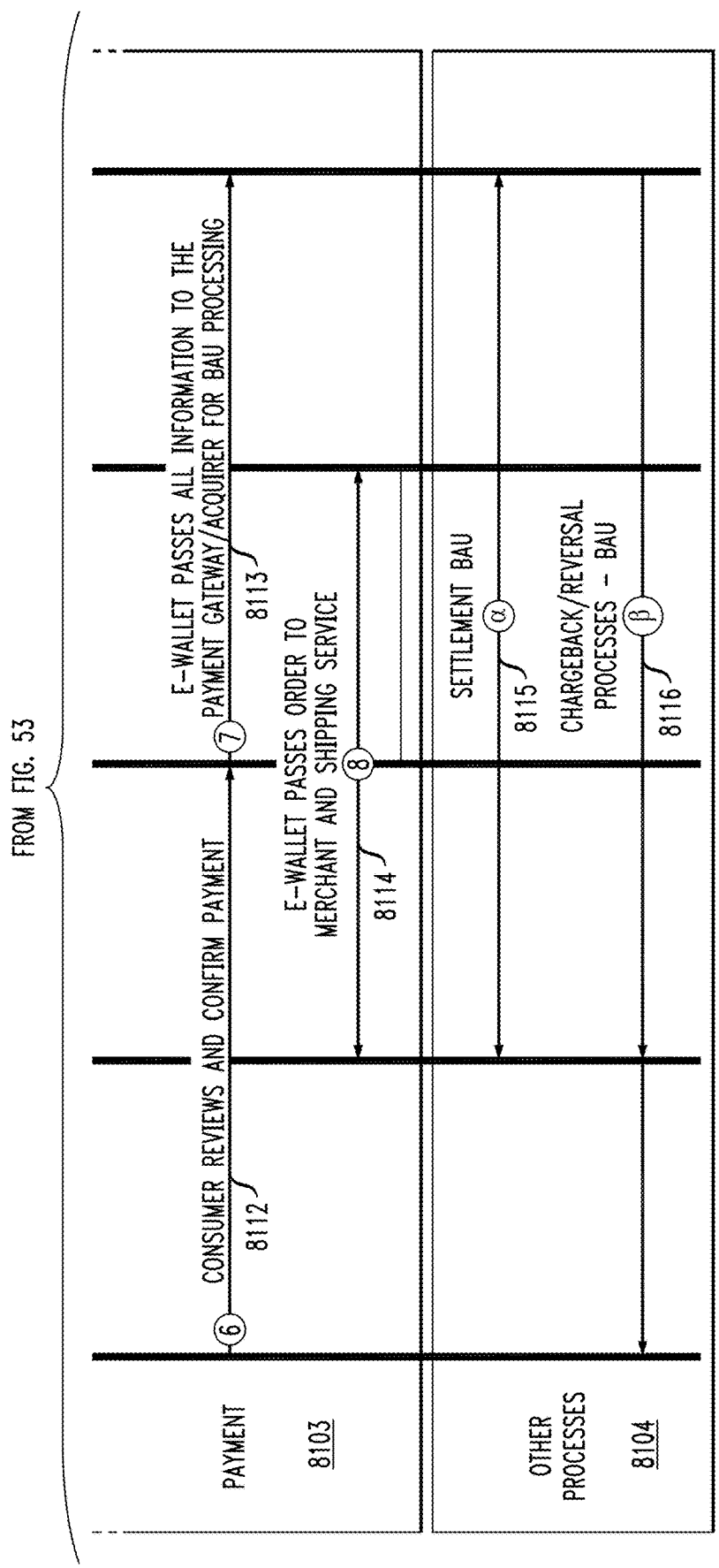

FIG. 53 presents an exemplary transaction flow. During a one-time pre-requisite and set-up process 8102, as seen at 8105, one or more consumers 598 register with digital wallet 597, and add card and shipping details on the wallet. Furthermore, as seen at 8106, merchant 1999 integrates with the wallet 597. Note that reference character 1999 is used in FIG. 53 to refer to both the merchant and the merchant's web site. The steps 8105, 8106 can be carried out, for example, using module 1483, 5483, with assistance from a GUI 1477, 5477 in at least some cases.

In a payment phase 8103, as seen at 8107, consumer 598 accesses the merchant's web site 1999, or accesses some other application of the merchant, and makes a purchase. As seen at 8108, the consumer is redirected to the wallet 597 at checkout. In step 8109, the e-wallet 597 obtains the product details from the merchant 1999. In step 8110, the e-wallet 597 obtains the shipping cost from the logistics provider 8101. In step 8111, the e-wallet 597 shows the product and shipping costs to the consumer 598 for review. In step 8112, the consumer 598 reviews the details and confirms payment. In step 8113, the e-wallet passes all the information to the acquirer 990 for business as usual ("BAU") processing via network 987. In step 8114, the e-wallet 597 passes the order to both the merchant 1999 and the logistics provider 8101.

Other processes are shown at 8104. As seen at 8115, 8116, settlement and chargeback and/or reversal processes may be conventional, i.e., BAU.

In some cases, as discussed elsewhere herein, a suitable application 12 resides on a smart phone 1420, 10 or the like and such phone is presented to a terminal 126 or the like at a brick and mortar location. The application 12 includes or has access to one or more locally stored VCNs and/or one or more locally stored offers 5994.

FIG. 54 shows an alternative exemplary software architecture diagram. Unless otherwise indicated, elements therein have a similar functionality to elements on FIG. 5 (corresponding portions of the wallet and database have had their reference characters incremented by four thousand). Wallet platform 5497 includes executable code, stored in a non-transitory manner in a tangible computer-readable recordable storage medium, which, when loaded into the memory of one or more servers, causes one or more processors thereof to implement at least portions of the logic described herein. Database 5479 includes a suitable database program such as the Oracle DBMS, Access and SQL Server from Microsoft, DB2 from IBM and the Open source DBMS MySQL, stored in a non-transitory manner in a tangible computer-readable recordable storage medium, as well as persistent storage to store the records therein. The database program, when loaded into the memory of one or more servers, causes one or more processors thereof to implement the database(s) described herein (e.g., with pre-registration information). The various interface modules include executable code, stored in a non-transitory manner in a tangible computer-readable recordable storage medium, which, when loaded into the memory of one or more servers, causes one or more processors thereof to implement the interface functionality and communication flows described herein, included any needed data translation between the wallet platform and the external entities. GUI 5477 provides an interface to consumer 598; optional shipping merchant interface module 5475 provides an interface to shipping merchant 599; e-commerce retailer interface module 5473 provides an interface to e-commerce retailer 895. Furthermore, registration module 5483 interfaces with consumer 598 via GUI 5477 to perform registration and (optionally) maintenance functions; new data and/or updates can be stored in database 5479.

API 5999 is exposed to e-commerce retailer to allow integration of a web site of retailer 895 with platform 5497. Optional PAN mapping engine 5998 (optional in the sense that in some cases a PAN mapping engine external to the wallet 5497 can be employed) converts between VCNs and RCNs (e.g., via techniques disclosed in the Flitcroft patents); optional app store 5996 (optional in the sense that in some cases an app store external to the wallet 5497 can be employed, and completely optional in embodiments not using smart phones or the like) makes app 12 available for download (the term "store" does not necessarily imply a fee). Payment method engine 5997 allows the electronic wallet platform 5497 to affording consumers an option to select from multiple methods to pay for a transaction. The multiple methods (including one or more VCNs) are based, at least in part, on the registration information. This information can be stored in database 5479 and accessed and selected by engine 5997. Optional shipping engine 5995 determines shipping options; for example, based on data in database 5497 and/or based on a real-time link with one or more shipping companies. Engine 5995 also optionally calculates sizes and shapes of shipments and determines packaging requirements.

Comparison Aspects

Some embodiments provide a comparison of prices across shipping services and merchant shipping. For example, in some cases, for both domestic and cross border shipping, the E-wallet provides consumers with several options. For domestic shipping, consumers have the choice between the shipping options offered by the merchant and other shipping services that operate domestically such as the postal service. For overseas shipping, consumers have several shipping services to choose from such as Borderlinx and Comgateway. Based on these options, consumers can find a combination of price, speed, reliability, and so on that is as close to their ideal as possible.

In another aspect, offers and incentives to use a specific funding source may be available. In some instances, the e-wallet aggregates various payment methods such as credit cards and mobile phone billing. Within each payment method, there can also be several options such as credit cards from various issuers and payment service providers. The e-wallet applies any relevant promotions across and within funding sources; displays to the consumer determine which funding source in the consumer's wallet provides the consumer with the lowest price option. Consumers are also able to view the price using each of their funding sources, with the associated promotions, thus creating the price differential.

In still another aspect, issuer promotions are passed through to the consumer regardless of the PAN mapping technique used (e.g., VCN or virtual prepaid card). In order for consumers to receive the promotions offered by their credit card issuers, the virtual card needs to either have the same bank identification number (BIN) as the real card or be mapped to the real card. The e-wallet can provide this functionality when either the VCN or virtual prepaid card is used.

In a further aspect, using a virtual card number (VCN) as a complement or replacement to the virtual prepaid card, the e-wallet can potentially use VCNs for both cross border and domestic transactions.

In addition, the consumer experience can be varied in several ways, such as having the e-wallet appear as a pop up window, wherein the consumer completes the transaction on the merchant site or wherein the consumer is redirected to the e-wallet site after checking out from the merchant site, completing the transaction on the wallet site.

In a still further aspect, in some embodiments, a "best deal card selector" is provided. In this aspect, the consumer registers credit cards (generally understood to include also debit, prepaid, and/or stored value cards in at least some cases) from various financial institutions onto his or her e-wallet. Each credit card comes with promotions that apply to selected merchants. When making a payment at one of these selected merchants, the consumer selects a credit card to use within his or her e-wallet and places his or her mobile phone over the proximity card reader. The e-wallet detects the merchant and checks for promotions associated with that merchant across all the payment cards in the wallet. If a better offer is found (in terms of paying the lowest price or otherwise (e.g., points or rewards)), the transaction is paused and an alert is sent to the consumer informing him or her about the better offer with the option to change the card used for payment. The consumer either chooses to continue with the current card or chooses a new card and places the mobile phone over the proximity card reader to complete the transaction.

Recapitulation

Given the discussion thus far, it will be appreciated that, in general terms, an exemplary method, according to an aspect of the invention, includes the step of obtaining, at an electronic wallet platform 5497, registration information for a plurality of consumers 598. This step can be carried out, for example, using registration module 5483, in at least some cases, via GUI 5477. Another step includes providing a mechanism to integrate the electronic wallet platform with a plurality of merchants 1999 (an e-commerce retailer 895 is a non-limiting example of a merchant). This step can be carried out, for example, by exposing an API 5999 to the merchants.

A further step includes, via the electronic wallet platform 5497, affording a given one of the consumers an option to select from multiple methods to pay for a transaction with a given one of the merchants 1999. The multiple methods are based, at least in part, on the registration information. At least one of the multiple methods includes a virtual card number (VCN). As used herein, and as noted above, a virtual card number (VCN) is a randomly generated series of numbers which does not contain any identifying information but is linked to a real card number (RCN). Confusion should be avoided with the terminology "virtual card" as may be used in the case where an RCN is stored in some kind of device and a transaction occurs without a physical card corresponding to the RCN being present, yet where the RCN is supplied to the merchant. The step discussed in this paragraph can be carried out, for example, directly with the consumer via GUI 5477 or through the intermediary of the merchant, using e-commerce retailer interface module 5473; in either case, with the assistance of payment method engine 5997. An example screen is shown in FIG. 35.

A still further step includes obtaining, from the given one of the consumers, a selection of the virtual card number for payment for the transaction. The step discussed in this paragraph can be carried out, for example, directly with the consumer via GUI 5477 or through the intermediary of the merchant, using e-commerce retailer interface module 5473; in either case, with the assistance of payment method engine 5997. An example screen is shown in FIG. 36.

An even further step includes providing the given one of the merchants with the virtual card number. This step can be carried out, for example, by exposing API 5999 to the merchant. This facilitates the merchant being paid for the transaction. The given one of the merchants is provided with the virtual card number and the amount of the transaction is charged against an actual card number, not provided to the merchant, to which the virtual card number is linked.

Some embodiments further include intercepting an authorization request, from the given one of the merchants, for an amount of the transaction to be charged against the virtual card number; translating the virtual card number into an actual card number which is not provided to the merchant; and passing the authorization request to an issuer, with the actual card number therein. These steps can be carried out, for example, with an account number mapping engine 5998 within a payment network (e.g., 2008).

Figure 8:
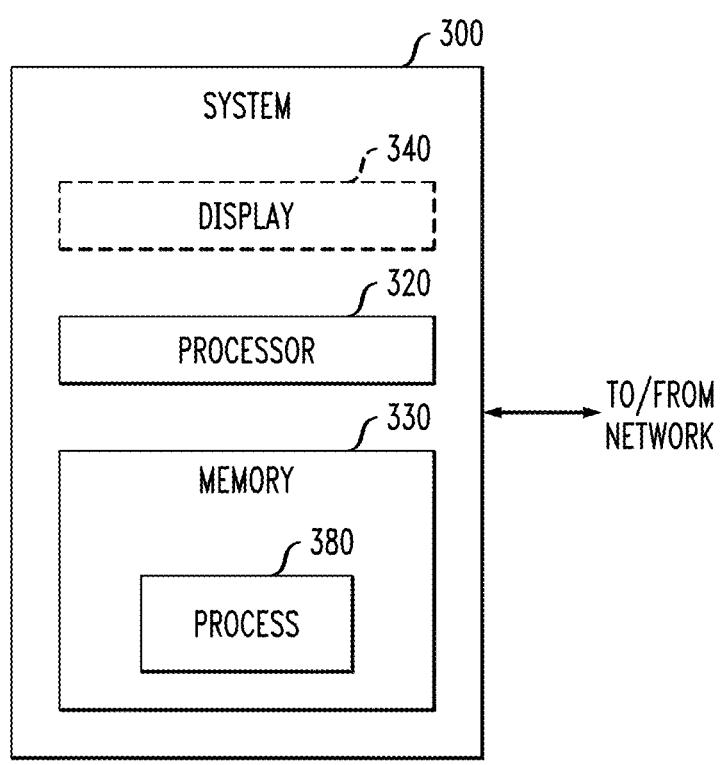
FIG. 8 is a block diagram of an exemplary computer system useful in one or more embodiments of the invention.

In some instances, the transaction includes an online transaction at a web site of the given one of the merchants 1999, and the selection of the virtual card number is obtained at the electronic wallet platform from a computing device of the given one of the consumers (e.g., a PC or laptop generally represented by system 300 in FIG. 8).

In some cases, a further step includes providing a system. The system includes distinct software modules. Each of the distinct software modules is embodied on a non-transitory computer-readable storage medium. The distinct software modules include a registration module 5483, a user interface module 5477, an application program interface 5999, and a payment method engine module 5997. The steps are then carried out or otherwise facilitated by the modules, as set forth above. In some cases, the distinct software modules further include an account number mapping engine module 5998, and further steps include intercepting an authorization request, from the given one of the merchants, for an amount of the transaction to be charged against the virtual card number, by executing the account number mapping engine module on the at least one hardware processor; translating the virtual card number into an actual card number which is not provided to the merchant, by executing the account number mapping engine module on the at least one hardware processor; and passing the authorization request to an issuer, with the actual card number therein, by executing the account number mapping engine module on the at least one hardware processor.

It is worth noting that the wallet can pop-up at the merchant web site or the consumer can be redirected to the e-wallet site.

One or more embodiments thus contemplate an apparatus, such as a server on which electronic wallet platform 5497 runs, including a memory, and at least one processor, coupled to the memory, and operative to carry out any one, some, or all of the method steps just described. In one or more embodiments, distinct software modules stored in a non-transitory storage medium, when loaded in to the memory, configure the at least one processor to be operative to carry out any one, some, or all of the method steps just described. As noted, the modules can include a registration module 5483, a user interface module 5477, an application program interface 5999, a payment method engine module 5997, and optionally, an account number mapping engine module 5998 and/or an e-commerce retailer interface module 5473.

In some instances, the transaction includes the given one of the consumers presenting a payment device (e.g., a "smart" phone 10), having an electronic wallet application 12 thereon, at a point-of-sale terminal 124, 126 of the given one of the merchants, and the virtual card number is provided to the merchant via communication between the payment device and the point-of-sale terminal of the given one of the merchants (e.g., via NFC). In such cases, an exemplary method includes the step of obtaining, at an electronic wallet platform, registration information for a plurality of consumers. Registration can be carried out, for example, using registration module 5483 and UI 5477. A further step includes making available to the consumers a secure application for portable devices of the consumers which affords the consumers an option to select from multiple methods to pay for transactions with merchants. The multiple methods are based, at least in part, on the registration information. At least one of the multiple methods includes a virtual card number. This step can be carried out, for example, using application store 5996. The terminology "store" does not necessarily imply that a fee is charged to download the application. The VCN(s) may by provided along with the application download or may be generated and downloaded at a later time.

It should be noted that a VCN is a payment method that is based, at least in part, on registration information in the sense that the registration information allows linking with the actual card number. Of course, the VCN itself, in at least some instances, can be dynamically created (i.e., the actual VCN may be created dynamically after the registration process). Nevertheless, with this understanding, the VCN is still understood to be based, at least in part, on the registration information.

A further step includes intercepting an authorization request, from a given one of the merchants, for an amount of a given one of the transactions to be charged against a given one of the virtual card numbers. The given one of the transactions includes a given one of the consumers presenting a given one of the portable devices, having the secure application thereon, at a point-of-sale terminal of the given one of the merchants. The virtual card number was provided to the merchant via communication between the given one of the portable devices and the point-of-sale terminal of the given one of the merchants. This step can be carried out, for example, with the account number mapping engine 5998 within the payment network (e.g., 2008).

Still further steps include translating the given one of the virtual card numbers into an actual card number which is not provided to the given one of the merchants; and passing the authorization request to an issuer, with the actual card number therein. These steps can be carried out, for example, with the account number mapping engine 5998 within the payment network (e.g., 2008).

In some cases, a further step includes providing a system. The system includes distinct software modules. Each of the distinct software modules is embodied on a non-transitory computer-readable storage medium. The distinct software modules include a registration module 5483, a user interface module 5477, an application store module 5996, and an account number mapping engine module 5998. The steps are then carried out or otherwise facilitated by the modules, as set forth above.

One or more embodiments thus contemplate an apparatus, such as a server on which electronic wallet platform 5497 runs, including a memory, and at least one processor, coupled to the memory, and operative to carry out any one, some, or all of the method steps just described. In one or more embodiments, distinct software modules stored in a non-transitory storage medium, when loaded in to the memory, configure the at least one processor to be operative to carry out any one, some, or all of the method steps just described. As noted, the modules can include a registration module 5483, a user interface module 5477, an application store module 5996, and an account number mapping engine module 5998.

Given the discussion thus far, it will be appreciated that, in general terms, one or more embodiments contemplate an exemplary method of providing a secure on-line shopping experience at an e-commerce retailer located in a first country to a plurality of consumers in at least one country other than the first country. The consumers have physical addresses (domestic addresses) in the at least one country other than the first country.

An optional step includes obtaining, at an electronic wallet server 597, from the plurality of consumers 598, registration information. The registration information in turn includes at least name, physical address in the at least one country other than the first country, and funding payment card account information. The aforementioned optional registration step can be carried out, for example, by interaction between the wallet platform 597 and consumer 598, facilitated by a suitable consumer user interface such as graphical user interface (GUI) 1477. GUI 1477 may include, for example, HTML served out from a server or servers on which platform 597 runs to a browser on a machine of consumer 598. The registration information can be stored in database 1479. Registration and account maintenance module 1483 also takes part in the registration (and account maintenance) process, interfacing with the consumer via GUI 1477. Optionally, the registration includes obtaining the information via one of a browser using a secure socket layer and a secure hypertext transfer protocol uniform resource locator, and the registration information is stored in database 1479 in an encrypted manner accessible to the electronic wallet server but shielded from the e-commerce retailer.

A further step includes facilitating assigning, to the plurality of consumers, local shipping addresses (overseas addresses) in the first country. This step may be carried out, for example, by shipping merchant interface module 1475.

A still further step includes obtaining, at the electronic wallet server, in connection with an on-line shopping session of a given one of the consumers at the e-commerce retailer 895, a request, from the e-commerce retailer, for a corresponding one of the local shipping addresses assigned to the given one of the consumers; and an even further step includes supplying the corresponding one of the local shipping addresses to the e-commerce retailer in response to the request therefor. These steps may be carried out, for example, by e-commerce retailer interface module 1473 interfacing with database 1479.

An even further step includes obtaining, at the electronic wallet server, in connection with the on-line shopping session of the given one of the consumers at the e-commerce retailer, product information and an indication of a desired form of shipping from the e-commerce retailer to the corresponding one of the local shipping addresses (domestic shipping). This step can be carried out in a variety of ways. In some cases, this information is provided to the wallet 597 from the e-commerce retailer 895, and the steps are carried out by the e-commerce retailer interface module 1473. On the other hand, in some cases, this information comes from the consumer 598 via a suitable consumer user interface such as GUI 1477.

Another step includes obtaining, at the electronic wallet server, in connection with the on-line shopping session of the given one of the consumers at the e-commerce retailer, an indication of a desired form of shipping from the corresponding one of the local shipping addresses to a corresponding one of the physical addresses in the at least one country other than the first country (overseas shipping). This step can also be carried out in a variety of ways. In some cases, this information is provided to the wallet 597 from the e-commerce retailer 895, and the steps are carried out by the e-commerce retailer interface module 1473. However, in other instances, this information comes from the consumer 598 via a suitable consumer user interface such as GUI 1477.

It is worth noting at this point that in some cases, interaction between consumer 598 and retailer 895 is used to specify the desired form of shipping from the e-commerce retailer 895 to the shipping merchant 599. Retailer 895 then provides this information to wallet 597. Fully landed cost includes, inter alia, costs for shipment from warehouse of merchant 895 to shipping merchant's warehouse 599, as well as costs for shipping from the shipping merchant's warehouse 599 to the consumer's physical address in his or her home country. However, retailer 895 typically does not care how shipment occurs from the shipping merchant's warehouse 599 to the consumer's physical address in his or her home country. Thus, in some cases, the wallet 597 obtains product information and local shipping information from e-commerce retailer 895. In some instances, the actual shipment from shipping merchant 599 to the consumer's physical address in his or her home country happens once it is known that the goods have been shipped from retailer 895 to warehouse 599. In some cases, the steps discussed just above are directed to an estimate for shipment from shipping merchant 599 to the consumer's physical address in his or her home country, used to develop an estimated fully landed cost. For purposes of estimating the fully landed cost, in a non-limiting example, consumer 598 interacts directly with wallet 597 via user interface 1477 or the like, to indicate how he or she wants the goods shipped to his or her home country from shipping merchant 599. As noted, however, in some cases the retailer 895 acts as an intermediary.

Yet another step includes dispatching, from the electronic wallet server, an indication, destined for the given one of the consumers, of an estimated fully landed cost associated with the on-line shopping session. The estimated fully landed cost is based at least upon the product information, the indication of the desired form of shipping from the e-commerce retailer to the corresponding one of the local shipping addresses, and the indication of the desired form of shipping from the corresponding one of the local shipping addresses to the corresponding one of the physical addresses in the at least one country other than the first country. This step may be carried out, for example, via user interface 1477 or the like (e.g., GUI 1477 serves HTML code to the consumer's machine that causes another window to pop up thereon); however, in some cases the retailer 895 acts as an intermediary.

An additional step includes dispatching, from the electronic wallet server 597, shipping option information, destined for the given one of the consumers 598. The shipping option information provides at least two options for one or both of the shipments, i.e., the shipment from the e-commerce retailer to the corresponding one of the local shipping addresses, and the shipment from the corresponding one of the local shipping addresses to the corresponding one of the physical addresses in the at least one country other than the first country.

The indication of the desired form of shipping from the e-commerce retailer to the corresponding one of the local shipping addresses, or the indication of the desired form of shipping from the corresponding one of the local shipping addresses to the corresponding one of the physical addresses in the at least one country other than the first country, or both, as the case may be, is responsive to the shipping option information.

In one or more embodiments, the shipping option information includes at least one of cost and speed information for each of the at least two options.

Cross border shipping is currently an inconvenience to both the consumer and the merchant. From the consumer perspective, it involves having to deal with the merchant and cross border shipping service individually as the two entities do not have a relationship with each other. From a merchant perspective, cross border shipping is prohibitively expensive when dealing with low volumes and far more complex than domestic shipping due to differing regulations, taxes, insurance cost, etc. One or more embodiments advantageously solve both the merchant and consumer problem by integrating with a worldwide shipping provider and negotiating affordable rates by aggregating the volumes of multiple merchants. Merchants can log into their wallet accounts and select which countries their current logistics providers ship to and which countries they are willing to ship to. When a consumer is redirected to the wallet from the merchant site, the wallet compares the consumer's shipping address with both lists to determine if a cross border shipping service is required. If such a service is required, the wallet retrieves the shipping options and rates from the cross border shipping service and presents them to the consumer based on the rules preset by the merchant, or sends the rates to the merchant if no rules have been preset. Once the wallet receives confirmation from the merchant that the transaction was successful, the wallet passes an invoice and instructions on how to fulfill the order (shipping labels, pickup times & locations etc.) from the logistics provider to the merchant.

One or more embodiments advantageously address one or more of the following technical issues:
  Creating a process flow where the wallet is the pass-through between the merchant and logistics provider;
  Creating the shipping functions in the merchant account that allow merchants to select their preferences;

Creating the comparison function in the wallet transaction flow that allows the wallet to compare the consumer's data with the merchant's preferences.

Given the discussion thus far, it will be appreciated that, in general terms, still another exemplary method includes the step 8108 of obtaining, at an electronic wallet server 5497, product information in connection with an on-line shopping session of a consumer 598 with an e-commerce retailer 1999. This step can be carried out, for example, using e-commerce retailer interface module 5473. A further step 8111 includes dispatching, from the electronic wallet server, shipping option information, destined for the consumer, providing at least two options for shipping goods, associated with the product information, from the e-commerce retailer to the consumer. This step can be carried out, for example, using e-commerce retailer interface module 5473 and shipping engine module 5995. An even further step 8112 includes obtaining, at the electronic wallet server, in connection with the on-line shopping session, an indication of a desired form of shipping from the e-commerce retailer to the consumer. The indication is based on the shipping option information. This step can be carried out, for example, using e-commerce retailer interface module 5473 and/or GUI 5477.

In some embodiments, a third party provides alternative shipping methods beyond what the merchant will make available. This includes the all-domestic case and the cross-border case. Where the merchant outsources the shipping, some merchant integration may be appropriate. A choice can be provided with respect to domestic shipping, either because the whole transaction is in one country, or as to the first (domestic) part of an international transaction. If choice is only from the shipping merchant 599 to the consumer, merchant integration with retailer 895 is typically not required. The third party can be a shipping merchant 5999, the operator of platform 5497 (e.g., the operator of a payment network 2008), or the like.

Again, in one or more embodiments, the shipping option information includes at least one of cost and speed information for each of the at least two options.

In some cases, an additional step includes providing a system, wherein the system includes distinct software modules. Each of the distinct software modules is embodied on a non-transitory computer-readable storage medium. The distinct software modules include at least an e-commerce retailer interface module 5473 and a shipping engine module 5995. The steps are then carried out or otherwise facilitated by the modules, as set forth above.

The wallet interface can pop-up at the merchant web site or the consumer can be redirected to the e-wallet site; therefore last step can be implemented either by the interface module 5473 or GUI 5477.

One or more embodiments thus contemplate an apparatus, such as a server on which electronic wallet platform 5497 runs, including a memory, and at least one processor, coupled to the memory, and operative to carry out any one, some, or all of the method steps just described. In one or more embodiments, distinct software modules stored in a non-transitory storage medium, when loaded in to the memory, configure the at least one processor to be operative to carry out any one, some, or all of the method steps just described. As noted, the modules can include an e-commerce retailer interface module 5473 and a shipping engine module 5995, and optionally a GUI module 5477.

Furthermore with regard to domestic shipping for the merchant, consider the following scenarios:

1. The merchant has yet to engage a logistics company (e.g., a start-up merchant);
2. The merchant's logistics company provides limited coverage domestically;
3. a logistics partner associated with the e-wallet, payment network operator, or the like, provides value added service that the merchant's logistics company does not.

When redirecting the consumers to wallet, in one or more embodiments, the merchants indicate if they provide domestic shipping and if there are cities or states that they are currently unable to ship to. Along with this information, the merchant also provides the wallet with an estimate of the package dimensions and weight.

When the wallet receives a consumer from a merchant site without domestic shipping, it calculates the rates for the different shipping options and presents them to the merchant. The merchant can then amend the rate before passing same back to the wallet to be presented to the consumer. Alternatively, the merchant can log into the merchant's wallet account and set pricing rules such as having a standard rate for a particular country or adding an x % surcharge on top of the logistics company's rate. Once the consumer has selected his or her preferred shipping option, he or she proceeds to pay for the merchant's goods & for the shipping cost. Once the wallet receives confirmation from the merchant that the transaction was successful, the wallet passes an invoice and instructions on how to fulfill the order (shipping labels, pickup times & locations etc.) from the logistics provider to the merchant.

When the wallet receives a consumer from a merchant site with limited domestic shipping coverage, it will compare the consumer's shipping address with the merchant's list of areas not covered. If the merchant is unable to ship to the consumer's address, the same process is initiated as in the case when the merchant does not have domestic shipping.

If a merchant already has complete domestic shipping but would like to use the wallet-based shipping due to lower prices or value added services such as insurance or pick up services, the merchant can select under which circumstances it would like to use the wallet shipping service by logging into the merchant's account in the wallet. Examples of such circumstances could be when the item to be shipped is fragile or when the value of the items exceeds a certain amount. With these settings integrated, the wallet will, in one or more embodiments, initiate domestic shipping when any of these conditions are met.

Merchants typically do not disseminate the weight and dimensions of their packages to other parties in the payment process. Large merchants have their own inventory management system and small or medium sized merchants set their own shipping charges or check the rate with the shipping service. In order for merchants (especially small and medium sized merchants) to send over volumetric data, they would have to come up with their own internal system for estimating the volumetric dimensions of the packaging needed for the products that the consumer has ordered. This is relatively straightforward when the products are identical or very similar in dimensions such as an order of multiple t-shirts. However, when different types of products are involved such as a belt, shoes, jeans and t-shirt, estimating the volumetric dimensions of the packaging accurately becomes far more challenging and is usually overestimated.

One or more embodiments address this issue by providing such a system for the merchants.

Given the discussion thus far, and referring to FIG. 7, it will be appreciated that, in general terms, an even further exemplary method includes the step of obtaining, by an electronic wallet platform 597, transaction data pertaining to a transaction between a consumer 2002 and a merchant 1999 for provision of at least one of goods and services. The transaction data can include, for example, a PAN and/or other account number and/or other identifying indicia of a cardholder; data pertaining to the merchant (e.g., merchant category code or MCC), amount of the transaction, time and/or place of the transaction; where available, item-level data from a scanner 134, and so on. The electronic wallet platform has at least first and second funding sources available. This step can be carried out, for example, using e-commerce retailer interface module 5473. A further step includes dispatching, from the electronic wallet platform 597, based on the transaction data, a first cost scenario for the transaction based on use of the first one of the funding sources and a second cost scenario for the transaction based on use of the second one of the funding sources. The first and second cost scenarios are destined for the consumer 2002. This step can be carried out, for example, using an offer comparison module; a non-limiting example thereof is that formed by elements 1997, 1998 in FIG. 7. An even further step includes obtaining, at the electronic wallet platform 597, from the consumer 2002, a selection, from among the at least first and second funding sources, based on the first and second cost scenarios. This step can be carried out, for example, using e-commerce retailer interface module 5473 and/or GUI 5477. A still further step includes providing the merchant an account number associated with the selected funding source. This step can be carried out, for example, using API 5999.

For example, one funding source might yield thirty frequent flier points; another might yield a 1% discount. This aspect can be server based or implemented via a smart phone application, for example. In the latter case, a database (e.g., offers 5994 in memory 412) stores the discount locally on the phone after the consumer opts-in to downloading offers to his or her phone—in some cases, all representative offers are stored in a central location such as registry 1997, displayed to the consumer, and the consumer picks what he or she wants to locally store on his or her smart phone or the like.

In some instances, the first and second cost scenarios are determined based on different promotions available with use of the at least first and second funding sources (e.g., one card in the wallet offers a promotion and another doesn't; or they both offer promotions but the promotions differ).

In some cases, at least one of the payment options includes a virtual card number; the consumer selects the virtual card number; the merchant is provided with the virtual card number; and an authorization message for an amount of the transaction is sent to an issuer with an actual card number not provided to the merchant. In such cases, one or more embodiments determine at least a pertinent one of the first and second cost scenarios based on the actual card number, advantageously allowing the consumer to obtain a promotion or other benefit from the RCN while only divulging the VCN to the merchant. The notation "at least a pertinent one of the first and second cost scenarios" accounts for the case wherein one cost scenario is based on a VCN while another is based on an RCN and so any pertinent offers would already be known, as well as the case where both cost scenarios involve VCNs.

A point of sale (POS) device is typically designed to read only one card at a time. Therefore, mobile wallets typically require the consumers to activate the card they wish to use before presenting their mobile phones to the POS. In order to compare discounts across cards, the POS first has to detect the inactive cards on the mobile wallet then pass on the discounts for those inactive cards with the mobile wallet. Another current issue is the time taken to complete this process of comparing inactive cards. As an increasing number of cards are added to the wallet, the time taken for comparison increases. Since a transaction has to be completed in a fixed amount of time, this restricts the number of cards that can be compared within that timeframe. Finally, passing over the data for all the discounts on the cards stored in a consumer's wallet is likely to be error prone as a lot of information is being passed.

In some cases, the cards being compared are cards of an identical brand, e.g., MasterCard cards. In some cases, the wallet addresses this issue by creating an offers database and having the offers for the cards stored in the consumers' wallets downloaded onto their mobile phones, as seen at 5994; for example, whenever one of the consumers adds a card. In at least some instances, periodic updating occurs, automatically or manually, at the consumer's request. Of course, in alternative embodiments, this information can be retrieved from an external database.

In some cases, in order for a merchant to detect what type of card is being used, the first 8 digits of the virtual card number typically need to be the same as the real card number. However, a virtual card number is usually a randomly generated number thereby making the issuer of the card unrecognizable to the merchant. In some cases, the wallet solves this problem through an offers database. Before passing the transaction to the issuer for authorization, the wallet compares the real card number with the offers database and applies any applicable discounts. After the issuer authorizes the transaction, the wallet sends the updated amount along with the details of the discount applied to the issuer.

In some cases, an additional step includes providing a system, wherein the system includes distinct software modules. Each of the distinct software modules is embodied on a non-transitory computer-readable storage medium. The distinct software modules include at least an e-commerce retailer interface module 5473 and an offer comparison module (e.g. 1997, 1998), and an application program interface 5999. The steps are then carried out or otherwise facilitated by the modules, as set forth above.

One or more embodiments thus contemplate an apparatus, such as a server on which electronic wallet platform 5497 runs, including a memory, and at least one processor, coupled to the memory, and operative to carry out any one, some, or all of the method steps just described. In one or more embodiments, distinct software modules stored in a non-transitory storage medium, when loaded in to the memory, configure the at least one processor to be operative to carry out any one, some, or all of the method steps just described. As noted, the modules can include an e-commerce retailer interface module 5473 and an offer comparison module (e.g. 1997, 1998), and an application program interface 5999, and optionally a GUI module 5477.

In yet another aspect, a method includes the step of obtaining, by an electronic wallet mobile application 12, transaction data pertaining to a transaction between a consumer and a merchant for provision of at least one of goods and services (non-limiting examples of transaction data are provided above). The electronic wallet mobile application has at least first and second funding sources available. A further step includes determining, by the electronic wallet mobile application, based on the transaction data, a first cost scenario for the transaction based on use of the first one of the funding sources and a second cost scenario for the transaction based on use of the second one of the funding sources (e.g., by comparing offers 5994 downloaded into memory 412). A still further step includes obtaining, at the electronic wallet mobile application, from the consumer, a selection, from among the at least first and second funding sources, based on the first and second cost scenarios (e.g., via interaction with screen 410). An even further step includes providing the merchant an account number associated with the selected funding source (e.g., via antenna 1800). In some instances, a further optional step includes downloading to the electronic wallet mobile application at least first and second offers 5994. The first and second cost scenarios are based on the first and second offers.

"Cost scenarios" should be broadly understood to include direct total cost comparison, the possibility of receiving a free gift in one scenario but not another; the possibility of different free gifts being available in different scenarios, the possibility of coupons being offered in some scenarios but not others; the possibility of different coupons being offered in different scenarios, and so on.

From the perspective of one or more servers, steps include downloading the application, VCNs, and offers to the smart phone or the like, and intercepting an "auth" request with the VCN and converting same to the RCN.

One or more embodiments thus contemplate an apparatus, such as a mobile phone 10, including a memory, and at least one processor, coupled to the memory, and operative to carry out any one, some, or all of the method steps just described. In one or more embodiments, one or more distinct software modules stored in a non-transitory storage medium, when loaded in to the memory, configure the at least one processor to be operative to carry out any one, some, or all of the method steps just described. As noted, the modules can include wallet app 12.

As noted, one or more embodiments of the invention or elements thereof can be implemented in the form of a system (or apparatus) including a memory and at least one processor that is coupled to the memory and operative to perform or otherwise facilitate exemplary method steps. Examples include a server 300 or smart phone 10 or the like.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126; a reader 132; payment devices such as cards 102, 112; a host, server, and/or processing center 140, 142, 144 (optionally with data warehouse 154) of a merchant, issuer, acquirer, processor, or operator of a network 2008 operating according to a payment system standard (and/or specification), as well as smart phone 10, a wallet server running wallet platform 597 or 5497, or other server(s). Firmware might be employed, for example, in connection with payment devices such as cards 102, 112 and reader 132. Firmware provides a number of basic functions (e.g., display, print, accept keystrokes) that in themselves do not provide the final end-use application, but rather are building blocks; software links the building blocks together to deliver a usable solution.

FIG. 8 is a block diagram of a system 300 that can implement part or all of one or more aspects or processes of the invention. As shown in FIG. 8, memory 330 configures the processor 320 (which could correspond, e.g., to processor portions 106, 116, 130; processors of remote hosts in centers 140, 142, 144; processors of servers implementing the wallet platform(s) or other blocks shown in the figures, and the like) to implement one or more aspects of the methods, steps, and functions disclosed herein (collectively, shown as process 380 in FIG. 8). Different method steps can be performed by different processors. The memory 330 could be distributed or local and the processor 320 could be distributed or singular. The memory 330 could be implemented as an electrical, magnetic or optical memory, or any combination of these or other types of storage devices (including memory portions as described above with respect to cards 102, 112); memory 412 of smart phone 10 may be similar, for example). It should be noted that if distributed processors are employed, each distributed processor that makes up processor 320 generally contains its own addressable memory space. It should also be noted that some or all of computer system 300 can be incorporated into an application-specific or general-use integrated circuit. For example, one or more method steps could be implemented in hardware in an ASIC rather than using firmware. Display 340 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a non-transitory recordable medium, examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 140, 142, 144, 597, 5497 (i.e., physical machine(s) on which e-wallet platform and its associated interface and/or database modules run), 2004, 2006, 2008, 2010; processor 402; or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention can make use of computer technology with appropriate instructions to implement method steps described herein as being performed by one or more processors. The various platforms can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 300 as shown in FIG. 8) running a server program. It will be understood that such a physical server may or may not include a display, keyboard, or other input/output components. A "host" includes a physical data processing system (for example, system 300 as shown in FIG. 8) running an appropriate program. It will be understood that such a host may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include modules to implement the functional blocks shown in FIGS. 5 and/or 54; the application 12; and so on. The blocks may be implemented by the software modules together with corresponding memories and one or more processors. The modules can run, for example on one or more hardware processors of one or more e-wallet servers; in general, all could run on the same server, each could run on a separate server, and so on. Blocks 1479, 5479 in some instances, could run on one or more database servers. In a preferred but non-limiting approach, element 597, 5497 includes a software platform while the interface modules include code to carry out the indicated functionality as well as any required translation functionality to interface with the external systems. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 987, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, JavaScript or other ECMAScript based scripting languages, and the like (an exemplary and non-limiting list), and can also make use of, for example, Extensible Markup Language (XML), JSON, name/value pairs, known application programs such as relational database applications, spreadsheets, and the like. The computers can be programmed to implement the logic depicted in the flow charts and other figures. At least some messages, in at least some instances, can be in accordance with ISO 8583.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of operating an electronic wallet platform running on a server, the method comprising the steps of:
   obtaining, at said electronic wallet platform, registration information for a plurality of consumers, wherein said registration information includes an actual card number;
   making an interface module of said electronic wallet platform available to a plurality of merchants, wherein during an online purchase with a given one of said merchants, said interface module redirects a customer browser to said electronic wallet platform;
   upon said customer browser being redirected to said electronic wallet platform, said electronic wallet platform causing said customer browser to afford an option to select from multiple methods, including a virtual card number generated prior to said redirection, to pay for a transaction with said given one of said merchants, said multiple methods being based, at least in part, on said registration information;
   obtaining, from said customer browser, a selection of said virtual card number for payment for said transaction, wherein said virtual card number requires a mapping to said actual card number to complete said transaction and is constrained by at least one spend management control defined by said consumer for said virtual card number prior to said redirection; and
   transmitting, via a computer network, said virtual card number to said given one of said merchants via said interface module of said electronic wallet platform, said virtual card number facilitating payment in connection with said transaction.

2. The method of claim 1, further comprising:
   intercepting an authorization request, from said given one of said merchants, for an amount of said transaction to be charged against said virtual card number;
   translating said virtual card number into said actual card number which is not provided to said merchant; and
   passing said authorization request to an issuer, with said actual card number therein.

3. The method of claim 2, wherein:
   said transaction comprises an online transaction at a web site of said given one of said merchants; and said selection of said virtual card number is obtained, via an Internet communication, at said electronic wallet platform from a computing device of said given one of said consumers.

4. The method of claim 1, further comprising providing a system, wherein the system comprises distinct software modules, each of the distinct software modules being embodied on a non-transitory computer-readable storage medium, and wherein the distinct software modules comprise a registration module, a user interface module, said interface module, and a payment method engine module; wherein:
  said obtaining of said registration information is carried out by said registration module and said user interface module executing on at least one hardware processor;
  said providing of said mechanism comprises exposing said interface module to said merchants;
  said affording said given one of said consumers said option is carried out by said payment method engine module and said user interface module executing on said at least one hardware processor;
  said obtaining, from said given one of said consumers, of said selection of said virtual card number for payment for said transaction is carried out by said payment method engine module and said user interface module executing on said at least one hardware processor; and
  said transmission of said given one of said merchants with said virtual card number comprises exposing said interface module to said given one of said merchants.

5. The method of claim 4, wherein said distinct software modules further comprise an account number mapping engine module, further comprising:
  intercepting an authorization request, from said given one of said merchants, for an amount of said transaction to be charged against said virtual card number, by executing said account number mapping engine module on said at least one hardware processor;
  translating said virtual card number into said actual card number which is not provided to said merchant, by executing said account number mapping engine module on said at least one hardware processor; and
  passing said authorization request to an issuer, with said actual card number therein, by executing said account number mapping engine module on said at least one hardware processor.

6. A wallet platform server apparatus comprising:
  a memory; and
  at least one processor, coupled to said memory, said at least one processor being operative to:
    obtain registration information for a plurality of consumers, wherein said registration information includes an actual card number;
    integrate with a plurality of merchants via an interface module of said wallet platform server apparatus, wherein during an online purchase with a given one of said merchants, said interface module redirects a customer browser to said wallet platform server apparatus;
    upon said customer browser being redirected to said wallet platform apparatus, said wallet platform apparatus causing said customer browser to afford an option to select from multiple methods, including a virtual card number generated prior to said redirection, to pay for a transaction with said given one of said merchants, said multiple methods being based, at least in part, on said registration information;
    obtain, from said customer browser, a selection of said virtual card number for payment for said transaction, wherein said virtual card number requires a mapping to said actual card number to complete said transaction and is constrained by at least one spend management control defined by said consumer for said virtual card number prior to said redirection; and
    transmit, via a computer network, said virtual card number to said given one of said merchants via said interface module of said wallet platform server apparatus, said virtual card number facilitating payment in connection with said transaction.

7. The wallet platform server apparatus of claim 6, wherein said at least one processor is further operative to:
  intercept an authorization request, from said given one of said merchants, for an amount of said transaction to be charged against said virtual card number;
  translate said virtual card number into said actual card number which is not provided to said merchant; and
  pass said authorization request to an issuer, with said actual card number therein.

8. The wallet platform server apparatus of claim 7, wherein:
  said transaction comprises an online transaction at a web site of said given one of said merchants; and
  said selection of said virtual card number is obtained, via an Internet communication, at said electronic wallet platform from a computing device of said given one of said consumers.

9. The wallet platform server apparatus of claim 6, further comprising a plurality of distinct software modules embodied on a non-transitory computer-readable storage medium, wherein the distinct software modules comprise a registration module, a user interface module, said interface module, and a payment method engine module, and wherein:
  said registration module and said user interface module, when loaded into said memory, configure said at least one processor to be operative to obtain said registration information for said plurality of consumers;
  said interface module, when exposed to said merchants, permits said at least one processor to integrate with said plurality of merchants;
  said payment method engine module and said user interface module, when loaded into said memory, configure said at least one processor to be operative to afford said given one of said consumers said option;
  said payment method engine module and said user interface module, when loaded into said memory, configure said at least one processor to be operative to obtain, from said given one of said consumers, said selection of said virtual card number; and
  said interface module, when exposed to said merchants, permits said at least one processor to transmit said given one of said merchants with said virtual card number.

10. The wallet platform server apparatus of claim 9, wherein said distinct software modules further comprise an account number mapping engine module, and wherein said account number mapping engine module, when loaded into said memory, configures said at least one processor to be further operative to:
  intercept an authorization request, from said given one of said merchants, for an amount of said transaction to be charged against said virtual card number;
  translate said virtual card number into said actual card number which is not provided to said merchant; and pass said authorization request to an issuer, with said actual card number therein.

11. An apparatus comprising:
means for obtaining, at an electronic wallet platform, registration information for a plurality of consumers, wherein said registration information includes an actual card number;
means for making an interface module of said electronic wallet platform available to a plurality of merchants, wherein during an online purchase with a given one of said merchants, said interface module redirects a customer browser to said electronic wallet platform;
means for, upon said customer browser being redirected to said electronic wallet platform, causing said customer browser to afford an option to select from multiple methods, including a virtual card number generated prior to said redirection, to pay for a transaction with said given one of said merchants, said multiple methods being based, at least in part, on said registration information;
means for obtaining, from said customer browser, a selection of said virtual card number for payment for said transaction, wherein said virtual card number requires a mapping to said actual card number to complete said transaction and is constrained by at least one spend management control defined by said consumer for said virtual card number prior to said redirection; and
means for transmitting, via said interface module and a computer network, said virtual card number to said given one of said merchants via said interface module of said electronic wallet platform, said virtual card number facilitating payment in connection with said transaction.

12. A computer program product comprising a non-transitory computer readable recordable storage medium having computer readable program code embodied therewith, said computer readable program code comprising:
computer readable program code configured to obtain registration information for a plurality of consumers, wherein said registration information includes an actual card number;
computer readable program code configured to integrate with a plurality of merchants via an interface module of said wallet platform server apparatus, wherein during an online purchase with a given one of said merchants, said interface module redirects a customer browser to said electronic wallet platform;
computer readable program code configured to, upon said customer browser being redirected to said wallet platform apparatus, cause said customer browser to afford an option to select from multiple methods, including a virtual card number generated prior to said redirection, to pay for a transaction with the given one of said merchants, said multiple methods being based, at least in part, on said registration information;
computer readable program code configured to obtain, from said customer browser, a selection of said virtual card number for payment for said transaction, wherein said virtual card number requires a mapping to said actual card number to complete said transaction and is constrained by at least one spend management control defined by said consumer for said virtual card number prior to said redirection; and
computer readable program code configured to transmit, via a computer network, said virtual card number to said given one of said merchants via said interface module of said wallet platform server apparatus, said virtual card number facilitating payment in connection with said transaction.

13. The method of claim 1, further comprising:
wherein affording said option to select from multiple methods to pay for said transaction further comprises causing at least one issuer promotion associated with said actual card number to be displayed by a computing device of said given one of said consumers; and
wherein transmitting said virtual card number further comprises causing at least one issuer promotion to be applied to said transaction on a basis of an identity of an issuer of said actual card number, wherein said virtual card number reveals said identity of said issuer of said actual card number.

14. The wallet platform server apparatus of claim 6, wherein said at least one processor is further operative to:
cause, in affording said option to select from multiple methods to pay for said transaction further comprises, at least one issuer promotion associated with said actual card number to be displayed by a computing device of said given one of said consumers; and
cause, in transmitting said virtual card number, at least one issuer promotion to be applied to said transaction on a basis of an identity of an issuer of said actual card number, wherein said virtual card number reveals said identity of said issuer of said actual card number.

* * * * *